(12) United States Patent
Lau et al.

(10) Patent No.: US 12,033,419 B2
(45) Date of Patent: Jul. 9, 2024

(54) ELECTRONIC DEVICE FOR AUTOMATED USER IDENTIFICATION

(71) Applicant: Amazon Technologies, Inc., Seattle, WA (US)

(72) Inventors: Howie Ho Wai Lau, Seattle, WA (US); Jennifer Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/688,105

(22) Filed: Mar. 7, 2022

(65) Prior Publication Data

US 2022/0262156 A1   Aug. 18, 2022

Related U.S. Application Data

(63) Continuation of application No. 16/914,809, filed on Jun. 29, 2020, now Pat. No. 11,270,102.

(51) Int. Cl.
*G06K 9/00* (2022.01)
*G06F 18/25* (2023.01)
(Continued)

(52) U.S. Cl.
CPC .......... *G06V 40/107* (2022.01); *G06F 18/253* (2023.01); *G06V 40/50* (2022.01); *G06V 40/67* (2022.01); *G06Q 30/0609* (2013.01)

(58) Field of Classification Search
CPC ...... G06V 40/107; G06V 40/50; G06V 40/67; G06K 9/629; G06Q 30/0609
See application file for complete search history.

(56) References Cited

U.S. PATENT DOCUMENTS 9,117,106 B2   8/2015   Dedeoglu et al.
9,235,928 B2   1/2016   Medioni et al.
(Continued)

FOREIGN PATENT DOCUMENTS

CN   209015177 U   6/2019
EP   3076334 A1   10/2016
(Continued)

OTHER PUBLICATIONS

The International Preliminary Report on Patentability for PCT Application No. PCT/US20/52729, dated Apr. 7, 2022.
(Continued)

*Primary Examiner* — Dhaval V Patel
(74) *Attorney, Agent, or Firm* — Lee & Hayes, P.C.

(57) ABSTRACT

This disclosure describes techniques for providing instructions when receiving biometric data associated with a user. For instance, an electronic device may detect a portion of a user, such as a hand. The electronic device may then determine locations of the portion of the user relative to the electronic device. Based on the locations, the electronic device may cause a visual indicator to provide instructions to the user for placing the portion of the user at a target location relative to the electronic device. For example, the visual indicator may emit light indicating that the portion of the user is off-centered, angled, too low, and/or too high. After providing the instructions and determining that the portion of the user is at the target location, the electronic device may capture at least an image of the portion of the user and use the image to identify an account.

20 Claims, 23 Drawing Sheets

(51) Int. Cl.
  *G06V 40/10* (2022.01)
  *G06V 40/50* (2022.01)
  *G06V 40/60* (2022.01)
  *G06Q 30/0601* (2023.01)

(56) References Cited

U.S. PATENT DOCUMENTS

| | | | |
|---|---|---|---|
| 9,473,747 | B2 | 10/2016 | Kobres et al. |
| 10,127,438 | B1 | 11/2018 | Fisher et al. |
| 10,133,933 | B1 | 11/2018 | Fisher et al. |
| 2004/0264742 | A1 | 12/2004 | Zhang et al. |
| 2008/0107309 | A1 | 5/2008 | Cerni |
| 2010/0127069 | A1 | 5/2010 | Henton, Sr. |
| 2011/0274318 | A1* | 11/2011 | Shindo .................. G06V 40/11 382/115 |
| 2012/0013436 | A1 | 1/2012 | Niinuma |
| 2012/0078764 | A1 | 3/2012 | Ross et al. |
| 2013/0284806 | A1 | 10/2013 | Margalit |
| 2015/0012426 | A1 | 1/2015 | Purves et al. |
| 2015/0252980 | A1* | 9/2015 | Maeda ............... G06V 40/1312 362/235 |
| 2016/0232401 | A1 | 8/2016 | Hoyos et al. |
| 2017/0169202 | A1 | 6/2017 | Duggan et al. |
| 2017/0255815 | A1 | 9/2017 | Matsunami |
| 2017/0256073 | A1 | 9/2017 | Borenstein et al. |
| 2018/0078282 | A1 | 3/2018 | Takemoto |
| 2018/0144178 | A1 | 5/2018 | Han et al. |
| 2018/0157336 | A1 | 6/2018 | Harris et al. |
| 2018/0181737 | A1 | 6/2018 | Tussy |
| 2019/0018506 | A1 | 1/2019 | Bernstein et al. |
| 2020/0320321 | A1 | 10/2020 | Yang et al. |
| 2021/0097547 | A1 | 4/2021 | Stockman et al. |
| 2021/0201001 | A1 | 7/2021 | Hu et al. |
| 2021/0406531 | A1 | 12/2021 | Lau et al. |

FOREIGN PATENT DOCUMENTS

| | | |
|---|---|---|
| ES | 2338092 A1 | 5/2010 |
| JP | 2008071158 | 3/2008 |
| JP | 2015121904 A | 7/2015 |
| JP | 2015106386 | 6/2016 |
| WO | WO2013020577 A2 | 2/2013 |
| WO | WO2019114814 A1 | 6/2019 |
| WO | 2019162957 A1 | 8/2019 |

OTHER PUBLICATIONS

Office Action for U.S. Appl. No. 16/585,328, dated Aug. 1, 2022, Inventor N. Stockman, "Electronic Device for Automated User Identification", 19 pages.

Office Action for U.S. Appl. No. 16/585,328, dated Feb. 22, 2022, Stockman, "Electronic Device for Automated User Identification", 34 pages.

The PCT Search Report and Written Opinion dated Jan. 12, 2021 for PCT application No. PCT/US20/52729, 15 pages.

The International Search Report and Written Opinion for PCT Application No. PCT/US21/39327, dated Oct. 15, 2021.

Office Action for U.S. Appl. No. 16/585,328, dated Jan. 6, 2023, Nichole Stockman, "Electronic Device for Automated User Identification", 24 pages.

The United Kingdom Office Action dated Mar. 31, 2023 for United Kingdom patent application No. 2203911.9, a foreign counterpart of U.S. Appl. No. 16/585,328, 2 pages.

The Japanese Office Action dated Apr. 14, 2023 for Japanese patent application No. 2022-517779, a foreign counterpart for U.S. Appl. No. 16/585,328, 6 pages.

Office Action for U.S. Appl. No. 16/585,328, dated Jul. 3, 2023, Stockman, "Electronic Device for Automated User Identification", 27 Pages.

Great Britain Office Action dated Oct. 26, 2023 for Great Britain Application No. 2203911.9, a foreign counterpart to U.S. Appl. No. 16/585,328, 6 pages.

Japanese Office Action dated Sep. 13, 2023 for Japanese Patent Application No. 2022-567905, a foreign counterpart to U.S. Pat. No. 11,270,102, 17 pages.

\* cited by examiner

ELECTRONIC DEVICE FOR AUTOMATED USER IDENTIFICATION

CROSS-REFERENCE TO RELATED APPLICATION

This application is a continuation of U.S. patent application Ser. No. 16/914,809, filed on Jun. 29, 2020. The entire contents of which are hereby incorporated by reference as if fully set forth.

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
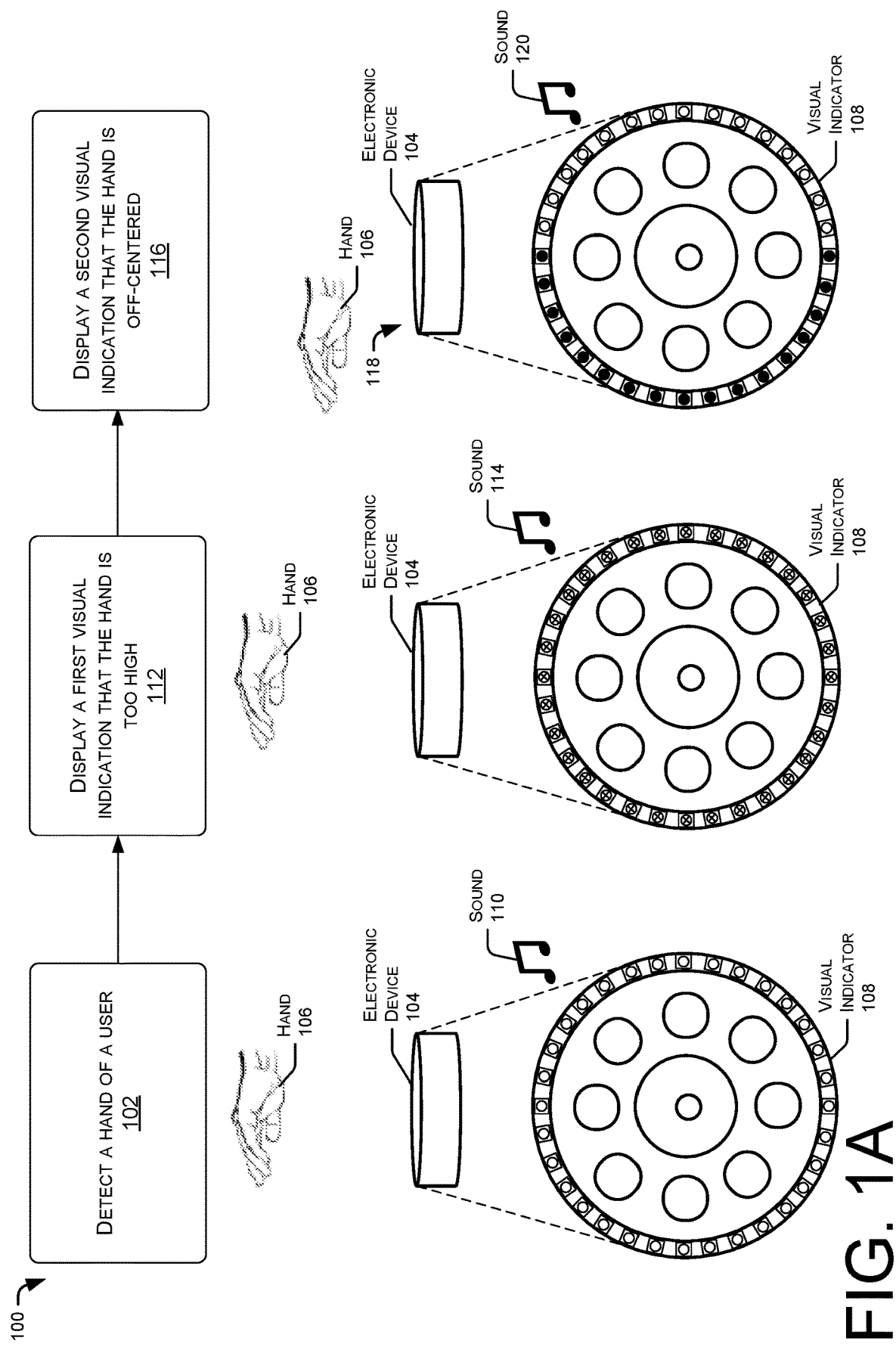
FIGS. 1A-1B collectively illustrate an example process for providing instructions when capturing biometric data.

This disclosure is directed to an electronic device for identifying users using biometric-recognition techniques. For instance, the electronic device may include a visual indicator that directs a user to place a hand at a target location relative to the electronic device. To direct the user, the electronic device may include one or more sensors, such as one or more distance sensors and/or imaging devices, that determine the location of the hand relative to the electronic device. The electronic device may then cause the visual indicator to provide instructions to the user for moving the hand to the target location. Once at the target location, the electronic device may use an imaging device to generate image data representing the hand (e.g., representing the palm of the hand). The electronic device may then analyze feature data generated using the image data, with respect to data stored in association with an account of the user, to identify the user.

For more details, the electronic device may include the visual indicator that instructs the user to place his or her hand at the target location relative to the electronic device. As described herein, the target location relative to the electronic device may include both a target vertical distance (e.g., z-direction) relative to the electronic device and a target horizontal location (e.g., x-direction and y-direction) relative to the electronic device. In some examples, the target vertical distance may be associated with a distance above the electronic device, such as eight-five millimeters above the electronic device. However, in other examples, the target vertical distance may be associated with any other distance above the electronic device. Additionally, in some examples, the target horizontal location may be associated with the middle of the electronic device, both in the x-direction and the y-direction.

In some instances, the target vertical distance and/or the target horizontal location may also allow for some offset when capturing the biometric data. For example, the target vertical distance may allow for the hand to be located within a range above the electronic device (e.g., between seventy-five millimeters and ninety-five millimeters above the electronic device). Additionally, the target horizontal location may allow for the hand to be offset by a distance (e.g., twenty millimeters) in the x-direction and/or offset by a distance (e.g., twenty millimeters) the y-direction. In some instances, the distance in the x-direction is the same as the distance in the y-direction. In other instances, the distance in the x-direction is different than the distance in the y-direction.

In some instances, the visual indicator may include light emitters arranged in pattern on a surface of the electronic device. The pattern may include, but is not limited to, a circle, a triangle, a square, a pentagon, a hexagon, and/or any other pattern. For example, the visual indicator may include a light ring located on the surface of the electronic device. Additionally, or alternatively, in some instances, the visual indicator may include a display that is shaped like the pattern on the surface of the electronic device. In either instance, the electronic device uses the visual indicator to provide instructions to the user for placing the hand of the user at the target location relative to the electronic device.

For example, the electronic device may initially cause the visual indicator to provide a first visual indication that the electronic device is not detecting a hand of the user. In some instances, the first visual indication may include the visual indicator being turned off. For example, if the visual indicator includes light emitters arranged in a pattern on the surface of the electronic device, the first visual indication may include causing the light emitters to refrain from emitting light. Additionally, or alternatively, in some instances, the first visual indication may include the visual indicator outputting a specific color, pattern, and/or brightness of light. For example, and again if the visual indicator includes light emitters arranged in a pattern on the surface of the electronic device, the first visual indication may include causing the light emitters to emit a specific color of light, such as white.

While displaying the first visual indication, the electronic device may detect the user's hand using the distance sensor (s) and/or the imaging device(s) (e.g., cameras). The electronic device may then use the distance sensor(s) and/or the imaging device(s) to determine locations of the hand relative to the electronic device. In some instances, the electronic device may determine the locations of the user's hand at set time intervals. For instance, the electronic device may determine the locations of the user's hand every millisecond, second, and/or the like. In some instances, such as when the electronic device is using the imaging device(s) to determine the locations, the electronic device may determine the locations of the hand using each frame represented by the image data, every other frame represented by the image data, every fifth frame represented by the image data, and/or the like.

In some instances, the electronic device may initially determine the vertical distance of the hand relative to the electronic device. For example, the electronic device may use the distance sensor(s) to determine the vertical distance. The electronic device may then analyze the vertical distance of the hand with respect to the target vertical distance. For example, the electronic device may determine if the vertical distance of the hand is within the vertical range associated with the target vertical distance. If the electronic device determines that the vertical distance of the hand is outside of the target vertical distance (e.g., lower or higher than the vertical range) for the electronic device, the electronic device may use the visual indicator to provide instructions to the user.

For a first example, if the electronic device determines that the vertical distance to the user's hand is greater than the target vertical distance, then the electronic device may cause the visual indicator to present a second visual indication that the hand is too high. In some instances, the second visual indication may include the visual indicator flashing a light pattern. For example, and again if the visual indicator includes light emitters arranged in a pattern on the surface of the electronic device, the second visual indication may include causing the light emitters pulsate light at a given frequency. Additionally, or alternatively, in some instances, the second visual indication may include the visual indicator outputting a specific color and/or brightness of light. For example, and again if the visual indicator includes light emitters arranged in a pattern on the surface of the electronic device, the second visual indication may include causing the light emitters to emit a specific color of light, such as red.

For a second example, if the electronic device determines that the vertical distance to the user's hand is less than the target vertical distance, then the electronic device may cause the visual indicator to present a third visual indication that the hand is too low. In some instances, the third visual indication may include the visual indicator outputting a specific color of light. For example, and again if the visual indicator includes light emitters arranged in a pattern on the surface of the electronic device, the third visual indication may include causing the light emitters to emit a specific color of light, such as red. Additionally, or alternatively, in some instances, the third visual indication may include the visual indicator flashing a pattern and/or changing a brightness of light. For example, and again if the visual indicator includes light emitters arranged in a pattern on the surface of the electronic device, the third visual indication may include causing the light emitters pulsate at a given frequency. Additionally, or alternatively, in some instances, The electronic device may continue to perform these processes until the electronic device determines that the vertical distance of the hand is at the target vertical distance (e.g., within the vertical range). In some instances, based on the determination, the electronic device may cause the visual indicator to present a fourth visual indication that the hand is located at the target vertical location. In some instances, the fourth visual indication may include the visual indicator outputting a specific color of light. For example, and again if the visual indicator includes light emitters arranged in a pattern on the surface of the electronic device, the fourth visual indication may include causing the light emitters to emit a specific color of light, such as blue. Additionally, or alternatively, in some instances, the fourth visual indication may include the visual indicator flashing a light pattern and/or changing a brightness of light. For example, and again if the visual indicator includes light emitters arranged in a pattern on the surface of the electronic device, the fourth visual indication may include causing the light emitters pulsate light at a given frequency.

The electronic device may then provide the user with instructions for centering the hand (e.g., the palm of the hand) over the electronic device. For example, the electronic device may determine the horizontal location of the hand with respect to the electronic device. In some instances, the electronic device determines the horizontal location using the distance sensor(s). For instance, each distance sensor may be associated with a respective horizontal location (e.g., horizontal position) over the electronic device. For example, if the electronic device includes eight distance sensors, then a first distance sensor may be associated with a front location, a second distance sensor may be associated with a front-right location, a third distance sensor may be associated with a right location, a fourth distance sensor may be associated with a back-right location, a fifth distance sensor may be associated with a back location, a sixth distance sensor may be associated with a back-left location, a seventh distance sensor may be associated with a left location, and an eighth distance sensor may be associated with an front-left location. In this example, front/back may be associated with the y-direction and left/right may be associated with the x-direction.

The electronic device may then use the distance sensors to determine the horizontal location of the hand with respect to the electronic device. For a first example, the electronic device may determine that the horizontal location of the hand is to the left of the target horizontal location when only the seventh distance sensor (and/or only the sixth, seventh, and eighth distance sensors) detect the hand. For a second example, the electronic device may determine that the horizontal location of the hand is forward of the target horizontal location when only the first distance sensor (and/or only the first, second, and eighth distance sensors) detect the hand. Still, for a third example, the electronic device may determine that the horizontal location of the hand is at the target horizontal location when all of the distance sensors detect the hand.

Additionally, or alternatively, in some instances, the electronic device may determine the horizontal location of the user's hand using the imaging device(s). For example, and as described in more detail below, the electronic device may use one or more trained models to generate feature data using the image data depicting the user's hand. The feature data may indicate at least attributes associated with the hand, such as, but not limited to, various location(s) on the palm, a location of the center of the palm, location(s) on the fingers (e.g., the start of the fingers, the knuckle locations on the fingers, intersections between the fingers, etc.), location(s) on the thumb, a direction of the hand, a pose of the hand, an orientation of the hand, and/or any other attributes associated with the hand. Using the feature data, the electronic device may determine the horizontal location of the user's hand relative to the electronic device. For example, the electronic device may use the center of the palm to determine the horizontal location of the user's hand with respect to the imaging component.

The electronic device may provide instructions to the user to help the user place the hand at the target horizontal location. For instance, if the horizontal location of the hand is to a side (e.g., the left) of the target horizontal location, then the electronic device may cause the visual indicator to present a fifth visual indication that the hand is to the side of the target horizontal location. For a first example, and again if the visual indicator includes light emitters arranged in a pattern on the surface of the electronic device, the fifth visual indication may include causing the light emitters located on the side to emit light while causing the light emitters not located on the side to refrain from emitting light. For a second example, and again if the visual indicator includes light emitters arranged in a pattern on the surface of the electronic device, the fifth visual indication may include causing the light emitters located on the side to emit a first color of light (e.g., blue) while causing the light emitters not located on the side to emit a second, different color of light (e.g., red).

In some instances, while the electronic device is providing instructions to the user for placing the hand at the target horizontal location, the electronic device may also provide instructions that help the user keep the hand approximately flat (e.g., horizontal) with respect to the electronic device. For instance, if a portion of the hand, such as the fingers, falls outside of the target vertical distance, then the electronic device may cause the visual indicator to present a sixth visual indication that the portion of the hand is too low or too high. For a first example, and again if the visual indicator includes light emitters arranged in a pattern on the surface of the electronic device, the sixth visual indication may include causing the light emitters located on the side at which the portion of the hand is located to refrain from emitting light while causing the light emitters not located on the side to emit light. For a second example, and again if the visual indicator includes light emitters arranged in a pattern on the surface of the electronic device, the sixth visual indication may include causing the light emitters located on the side at which the portion of the hand is located to emit a first color of light (e.g., red) while causing the light emitters not located on the side to emit a second, different color of light (e.g., blue).

The electronic device may continue to provide the instructions to the user until the electronic device detects that the hand of the user is proximate to the target location (e.g., the target vertical distance and the target horizontal location). After the electronic device detects that the user's hand is located proximate to the target location, the electronic device may cause the visual indicator to present a seventh visual indication that the hand is located at the target location. For example, and again if the visual indicator includes light emitters arranged in a pattern on the surface of the electronic device, the seventh visual indication may include causing the light emitters to emit a color of light, a light pattern, or a brightness of light. Additionally, in instances where the user has already enrolled with a user-recognition system, the user-recognition system may perform the processes described herein to identify the user profile associated with the user. In instances where the user has yet to enroll with the user-recognition system, the electronic device may provide one or more additional instructions for receiving additional information for enrolling with the user-recognition system.

For example, and as described below, users may enroll with the user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, conditions of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of an electronic device located in the facility, or the like in order to be identified by the user-recognition system.

To utilize the user-recognition system, a user may request to be enrolled by interacting with the electronic device positioned in a facility. For example, the user may select an enroll option on a display of the electronic device, issue a voice or GUI-based command requesting to be enrolled, insert a user ID card into the electronic device, and/or simply present their hand or palm before the electronic device to prompt the enrollment process.

Upon requesting to be enrolled in the user-recognition system, the electronic device may, with permission and/or upon explicit request by the user, begin collecting various types of biometric data, and/or other data, for the user. For example, the electronic device may include the imaging device(s) that begin capturing image data (e.g., an individual image, a sequence of images, a video, etc.) of at least a portion of the user, such as a palm of the user, a face of the user, or the like. In the example of the palm, and as discussed above, the electronic device may request that the user move their hand to different angles and/or orientations as the electronic device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the electronic device may determine a user account with which the user is registered in various ways, such as by requesting that the user insert a personal ID card (e.g., driver's license), scan a barcode that may be presented on a display of a phone of the user, login with his or her login credentials, and so forth.

Once the electronic device has obtained the image data representing the palm or other portion of the user, the electronic device may utilize this data to enroll the user with the user-recognition system. In some examples, the user-recognition system may be implemented entirely on the electronic device, which may include the software, firmware, and/or hardware components to implement the techniques described herein. However, in some examples, the user-recognition system may be implemented according to a split architecture where the electronic device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the electronic device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at an electronic device, the feature data stored in the enrollment database may be compared with the feature data generated from the subsequent image data to identify a user profile for the user represented in the subsequent image data and audio data.

In this way, the user may be enrolled for use of the user-recognition system such that, after completing subsequent shopping sessions, the user may checkout by placing his or her palm over an imaging component of an electronic device to allow the user-recognition system to automatically recognize the user. The electronic device may detect the presence of the user (e.g., detect the palm, detect a face, detect the speech utterance, detect a touch input via a touch display, etc.), and begin streaming image data and audio data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

Additionally, although the techniques described above include the electronic device determining the locations of the hand, in other examples, the backend devices may determine the locations of the hand. For example, the electronic device may send the sensor data generated using the one or more sensors to the backend devices. The backend devices may then perform the processes described herein, with respect to the electronic device, to determine the locations of the hand. Additionally, the backend devices may send, to the electronic device, data indicating the locations of the hand. The electronic device may then use the data to update the user interfaces when providing the instructions to the user.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
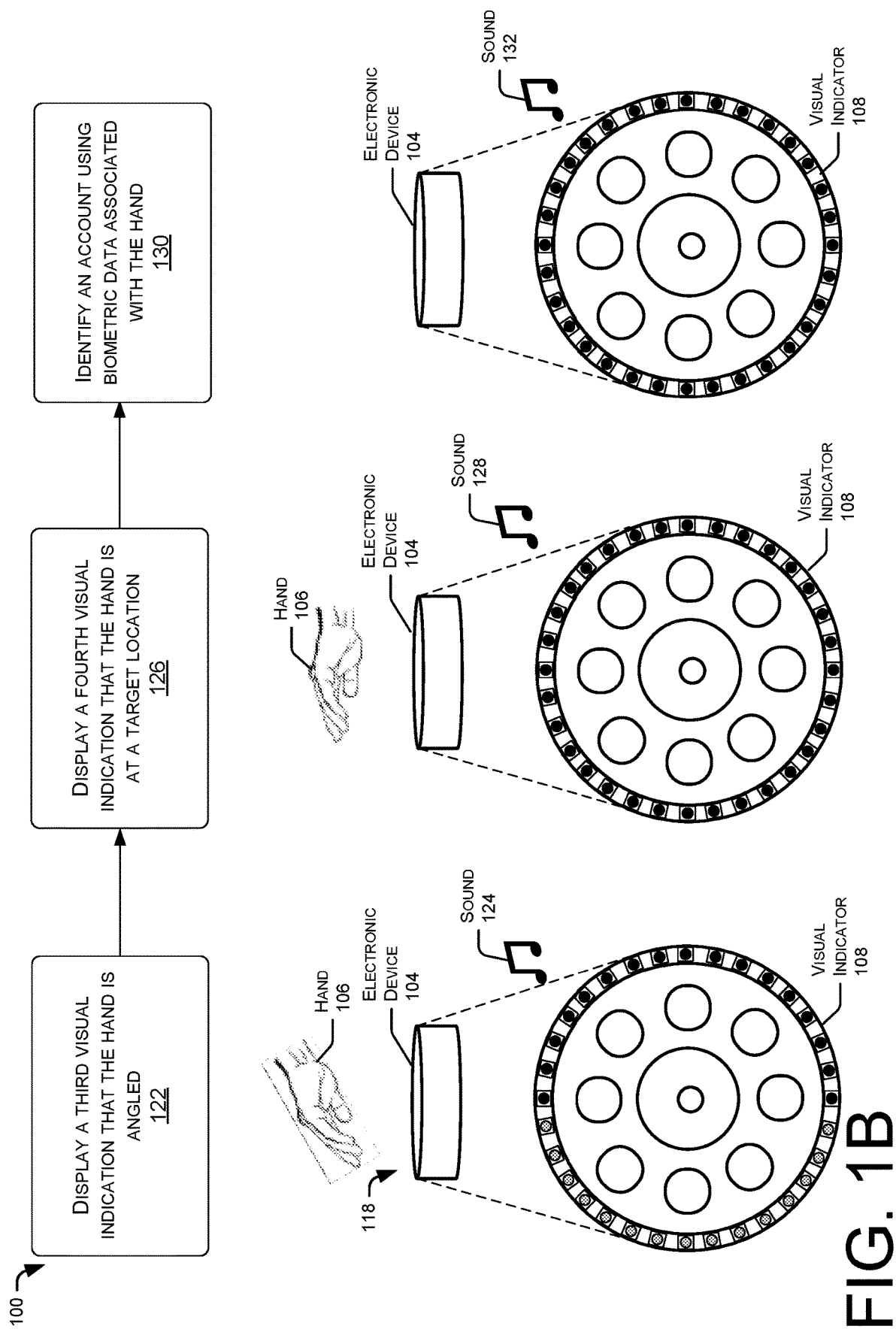

FIGS. 1A-1B collectively illustrate an example process 100 for providing instructions when capturing biometric data. At 102, an electronic device 104 may detect a hand of a user. For instance, a visual indicator 108 of the electronic device 104 may be displaying a first visual indication that instructs the user to place the hand 106 over the electronic device 104. In the example of FIGS. 1A-1B, the visual indicator 108 includes a light ring located around a top surface of the electronic device 104. However, in other examples, the visual indicator 108 may include any other shape on one or more surfaces of the electronic device 104. As shown in the example of FIGS. 1A-1B, the first visual indication may include refraining from emitting light. However, in other examples, the first visual indication may include emitting a color, brightness, and/or pattern of light.

The electronic device 104 may then use one or more sensors, which are discussed in more detail with regard to FIGS. 2A-2D, to detect the hand 106. For example, the electronic device 104 may use one or more distance sensors to detect the hand 106 located over the electronic device 104. For another example, the electronic device 104 may use one or more imaging devices to generate image data representing the hand 106. The electronic device 104 may then analyze the image data to determine that the hand 106 is located over the electronic device 104.

In some instances, and as illustrated in the example of FIGS. 1A-1B, the electronic device 04 may output sound 110 that indicates that the electronic device 104 detected the hand 106. For a first example, the sound 110 may include one or more words indicating that the electronic device 104 detected the hand 106 (e.g., "Hand Detected"). For a second example, the sound 110 may include one or more noises (e.g., pings, humming, constant tone, etc.) that lets the user know that the hand 106 was detected.

At 112, the electronic device 104 may display a first visual indication that the hand 106 is too high. For instance, the electronic device 104 may determine that the hand 106 of the user is higher than a target vertical distance for the electronic device 104. In some instances, the electronic device 104 determines the vertical distance of the hand 106 using the one or more distance sensors. Additionally, or alternatively, in some instances, the electronic device 104 determines the vertical distance of the hand 106 by analyzing image data generated by the one or more imaging devices. In either of the instances, the electronic device 104 then compares the vertical distance of the hand 106 to the target vertical distance, which may include a vertical range, to determine that the vertical distance of the hand 106 is greater than the target vertical distance.

The electronic device 104 may then display the first visual indication that the hand 106 is too high. In some instances, and as illustrated in the example of FIGS. 1A-1B, the first visual indication may include the visual indicator 108 flashing a pattern of light (which is illustrated by the crosses within the circles). For example, the first visual indication may include causing the light emitters of the visual indicator 108 to pulsate the light at a given frequency. Additionally, or alternatively, in some instances, the first visual indication may include the visual indicator 108 outputting a specific color and/or brightness of light. For example, the first visual indication may include causing the light emitters of the visual indicator 108 to emit a specific color of light, such as red.

In some instances, and as illustrated in the example of FIGS. 1A-1B, the electronic device 104 may output sound 114 that indicates that the hand 106 is too high. For a first example, the sound 114 may include one or more words indicating that the hand is too high (e.g., "Please Lower Your Hand"). For a second example, the sound 110 may include one or more noises (e.g., pings, humming, constant tone, etc.) that lets the user know that the hand 106 is too high.

At 116, the electronic device 104 may display a second visual indication that the hand is off-centered. For instance, the electronic device 104 may determine that the hand 106 of the user is located outside of the target horizontal location for the electronic device 104. In some instances, the electronic device 104 determines the horizontal location of the hand 106 using the one or more distance sensors. Additionally, or alternatively, in some instances, the electronic device 104 determines the horizontal location of the hand 106 by analyzing image data generated by the one or more imaging devices. In either of the instances, the electronic device 104 then compares the horizontal location of the hand 106 to the target horizontal location, which may allow for some offset in the x-direction and/or the y-direction, to determine that the horizontal location of the hand 106 is located outside of the target horizontal location.

The electronic device 104 may then display the second visual indication that the hand 106 is off-centered. For instance, since the horizontal location of the hand 106 is too far to a side 118 of the electronic device 104, then the electronic device may cause the visual indicator 108 to display the second visual indication that the hand 106 is located too far to the side 118. For a first example, and as illustrated in the example of FIGS. 1A-1B, the second visual indication may include causing the light emitters of the visual indicator 108 that are located on the side 118 to emit light (which is illustrated by the solid black circles) while causing the light emitters of the visual indicator 108 that are not located on the side 118 to refrain from emitting light (which is illustrated by the solid white circles). For a second example, the second visual indication may include causing the light emitters of the visual indicator 108 that are located on the side 118 to emit a first color of light (e.g., blue) while causing the light emitters of the visual indicator 108 that are not located on the side 118 to emit a second, different color of light (e.g., red).

In some instances, and as illustrated in the example of FIGS. 1A-1B, the electronic device 104 may output sound 120 that indicates that the hand 106 is off-centered. For a first example, the sound 112 may include one or more words indicating that the hand 106 is of-centered (e.g., "Your Hand Is Off-Centered" or "Please Move Your Hand Back"). For a second example, the sound 120 may include one or more noises (e.g., pings, humming, constant tone, etc.) that lets the user know that the hand 106 is off-centered.

At 122, the electronic device 104 may display a third visual indication that the hand 106 is angled. For instance, the electronic device 104 may determine that the hand 106 of the user is angled with respect to the electronic device 104. In some instances, the electronic device 104 determines the angle of the hand 106 using the one or more distance sensors. For instance, the electronic device 104 may determine that the hand 106 is located closer to a first distance sensor than a second distance sensor. Additionally, or alternatively, in some instances, the electronic device 104 determines the angle of the hand 106 by analyzing image data generated by the one or more imaging devices. In either of the instances, the electronic device 104 then compares the angle of the hand 106 to a target angle. Based on the comparison, the electronic device 104 may determine that the angle of the hand 106 is greater than the target angle.

The electronic device 104 may then display the third visual indication that the hand 106 is angled. For instance, since the angle of the hand 106 is such that the hand 106 is closer to the side 118 of the electronic device 104 than the other side of the electronic device 104, then the electronic device 104 may cause the visual indicator 108 to display the third visual indication that the hand 106 is angled towards the side 118. For a first example, and as illustrated in the example of FIGS. 1A-1B, the third visual indication may include causing the light emitters of the visual indicator 108 that are located on the side 118 to emit a first color of light (which is illustrated by the solid grey circles) while causing the light emitters of the visual indicator 108 that are not located on the side 118 to emit a second color of light (which is illustrated by the solid black circles). For a second example, the third visual indication may include causing the light emitters of the visual indicator 108 that are located on the side 118 to refrain from emitting light while causing the light emitters of the visual indicator 108 that are not located on the side 118 to emit a color of light.

In some instances, and as illustrated in the example of FIGS. 1A-1B, the electronic device 104 may output sound 124 that indicates that the hand 106 is angled. For a first example, the sound 124 may include one or more words indicating that the hand 106 is angled (e.g., "Your Hand Is Angled" or "Please Flatten Your Hand"). For a second example, the sound 1124 may include one or more noises (e.g., pings, humming, constant tone, etc.) that lets the user know that the hand 106 is angled.

At 126, the electronic device 104 may display a fourth visual indication that the hand 106 is at a target location. For instance, the electronic device 104 may determine the location and/or the angle of the hand 106 using the one or more distance sensors. Additionally, or alternatively, in some instances, the electronic device 104 determines the location and/or the angle of the hand 106 by analyzing image data generated by the one or more imaging devices. In either of the instances, the electronic device 104 then compares the location of the hand 106 to the target location and, based on the comparison, determines that the hand 106 of the user is at the target location. Additionally, the electronic device 104 compares the angle of the hand 106 to the target angle and, based on the comparison, determines that the angle of the hand 106 satisfies the threshold angle.

The electronic device 104 may then display the fourth visual indication that the hand 106 is at the target location. For a first example, and as illustrated in the example of FIGS. 1A-1B, the fourth visual indication may include causing the light emitters of the visual indicator 108 to emit a color of light (which is illustrated by the solid black circles). For a second example, the fourth visual indication may include causing the light emitters of the visual indicator 108 to emit a flashing light pattern and/or emit light at a specific brightness.

In some instances, and as illustrated in the example of FIGS. 1A-1B, the electronic device 104 may output sound 128 that indicates that the hand 106 is at the target location. For a first example, the sound 128 may include one or more words indicating that the hand 106 is at the target location (e.g., "Your Hand Is At The Target Location"). For a second example, the sound 110 may include one or more noises (e.g., pings, humming, constant tone, etc.) that lets the user know that the hand 106 is at the target location.

At 130, the electronic device 104 may identify an account using biometric data associated with the hand 106. For instance, the electronic device 104 may generate, using the one or more imaging devices, image data representing the hand 106. The electronic device 104 may then analyze the image data to determine feature data corresponding to the hand 106. Additionally, the electronic device 104 may analyze the feature data with respect to feature data stored in association with the account. Based on the analysis, the electronic device 104 may determine that the feature data corresponding to the hand 106 matches the feature data stored in association with the account. As such, the electronic device 104 may identify the account.

In some instances, and as illustrated in the example of FIGS. 1A-1B, the electronic device 104 may output sound 132 that indicates that the account has been identified. For a first example, the sound 132 may include one or more words indicating that the account has been identified (e.g., "We Have Identified An Account"). For a second example, the sound 132 may include one or more noises (e.g., pings, humming, constant tone, etc.) that lets the user know that the account has been identified.

FIGS. 2A-2D illustrate various examples of electronic devices 202(1)-(4) that may be used to identify users using biometric-recognition techniques. In some instances, one or more of the electronic devices 202(1)-(4) may correspond to the electronic device 104 from the example of FIGS. 1A-1B.

Figure 2A:
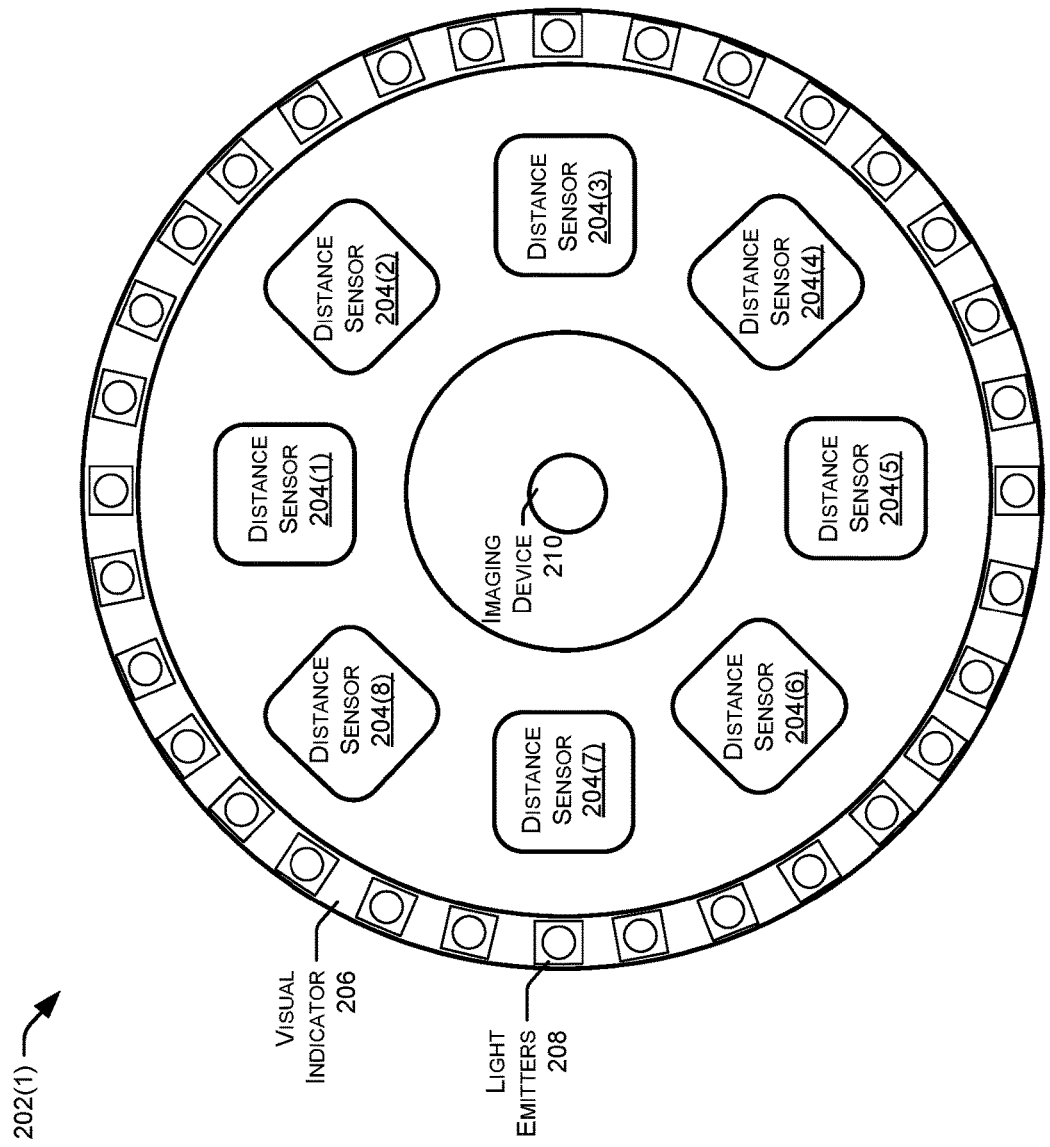
FIGS. 2A-2E illustrate various examples of electronic devices that may be used to identify users using biometric-recognition techniques.

As shown in the example of FIG. 2A, the electronic device 202(1) may include a circular shape. However, in other examples, the electronic device 202(1) (as well as one or more of the electronic devices 202(2)-(4)) may include a shape other than a circle. The electronic device 202(1) includes distance sensors 204(1)-(6) (also referred to as "distance sensors 204") located in a circle around the surface of the electronic device 202(1). Although the example of FIG. 2A illustrates six distance sensors 204, in other examples, the electronic device 202(1) may include any number of distance sensors 204. Additionally, although the example of FIG. 2A illustrates the distance sensors 204 arranged in a circle and spaces equal apart from one another, in other examples, the distance sensors 204 may include any other arrangement on the surface of the electronic device 202(1).

The electronic device 202(1) also includes a visual indicator 206 located around an outer edge of the surface of the electronic device 202(1). The visual indicator 206 includes light emitters 208 (although only one is illustrated for clarity reasons) spaced around the entirety of the visual indicator 206. However, in other examples, the visual indicator 206 may include a shape other than a circle. Additionally, in other examples, the visual indicator 206 may include more or less light emitters 208. Furthermore, in other examples, the visual indicator 206 may include a display.

The electronic device 202(1) also includes an imaging device 210 located at the center of the electronic device 202(1). In some instances, the imaging device 210 may include a camera (e.g., a Red-Green-Blue (RGB) camera, an infrared camera, a near-infrared camera, etc.). Although the example of FIG. 2A illustrates the imaging device 210 located at the center of the electronic device 202(1), in other examples, the imaging device 210 may be located at a different location of the electronic device 202(1). Additionally, in other examples, the imaging device 210 may include more than one imaging device. For example, the electronic device 202(1) may include a first imaging device that generates first image data for performing the biometric-recognition techniques described herein. The electronic device 202(1) may also include a second imaging device that generates second image data used for other processing purposes, such as verify that the hand of the user is an actual hand (e.g., for protecting against biometric spoofing).

For example, such as when the hand is at the target location, the electronic device 202(1) may cause the visual indicator 206 to emit light. In some instances, the light may include a specific color of light and/or specific pattern of light (e.g., flashing the light at a given frequency). The light may be configured such that the imaging device 210 (and/or another imaging device) is able to generate image data that can be analyzed to determine whether the hand is an actual hand, in order to protect against biometric spoofing.

Figure 2B:
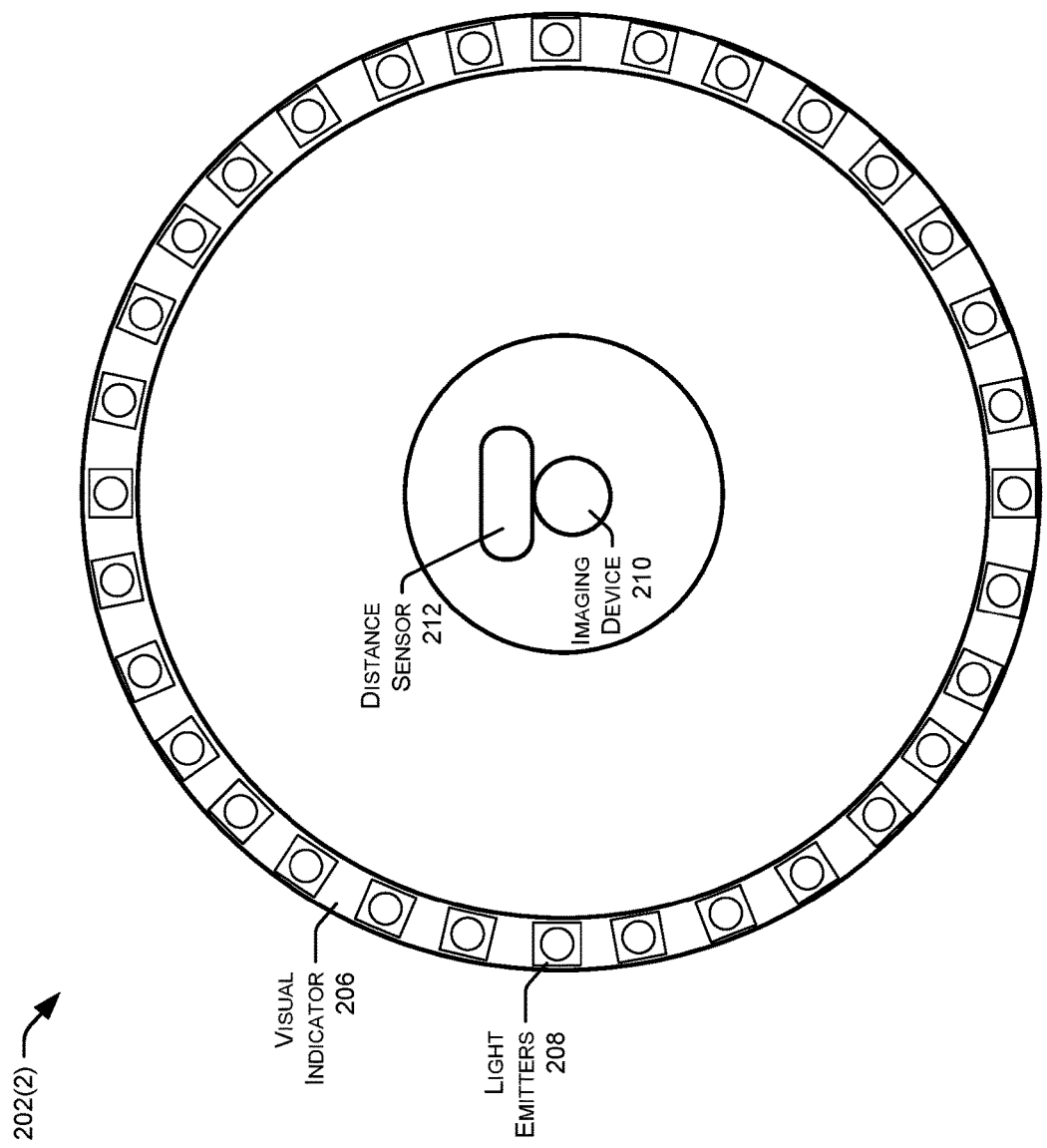

FIG. 2B illustrates another electronic device 202(2) that may be used to identify users using biometric-recognition techniques. In the example of FIG. 2B, the electronic device 202(2) may also include the visual indicator 206 and the imaging device 210. However, the electronic device 202(2) now includes a single distance sensor 212 located proximate to the center of the electronic device 202(2). While the example of FIG. 2B illustrates a single distance sensor 212 located proximate to the center of the electronic device 202(2), in other examples, the electronic device 202(2) may include any number of distance sensors 212 located proximate to the center of the electronic device 202(2).

Figure 2C:
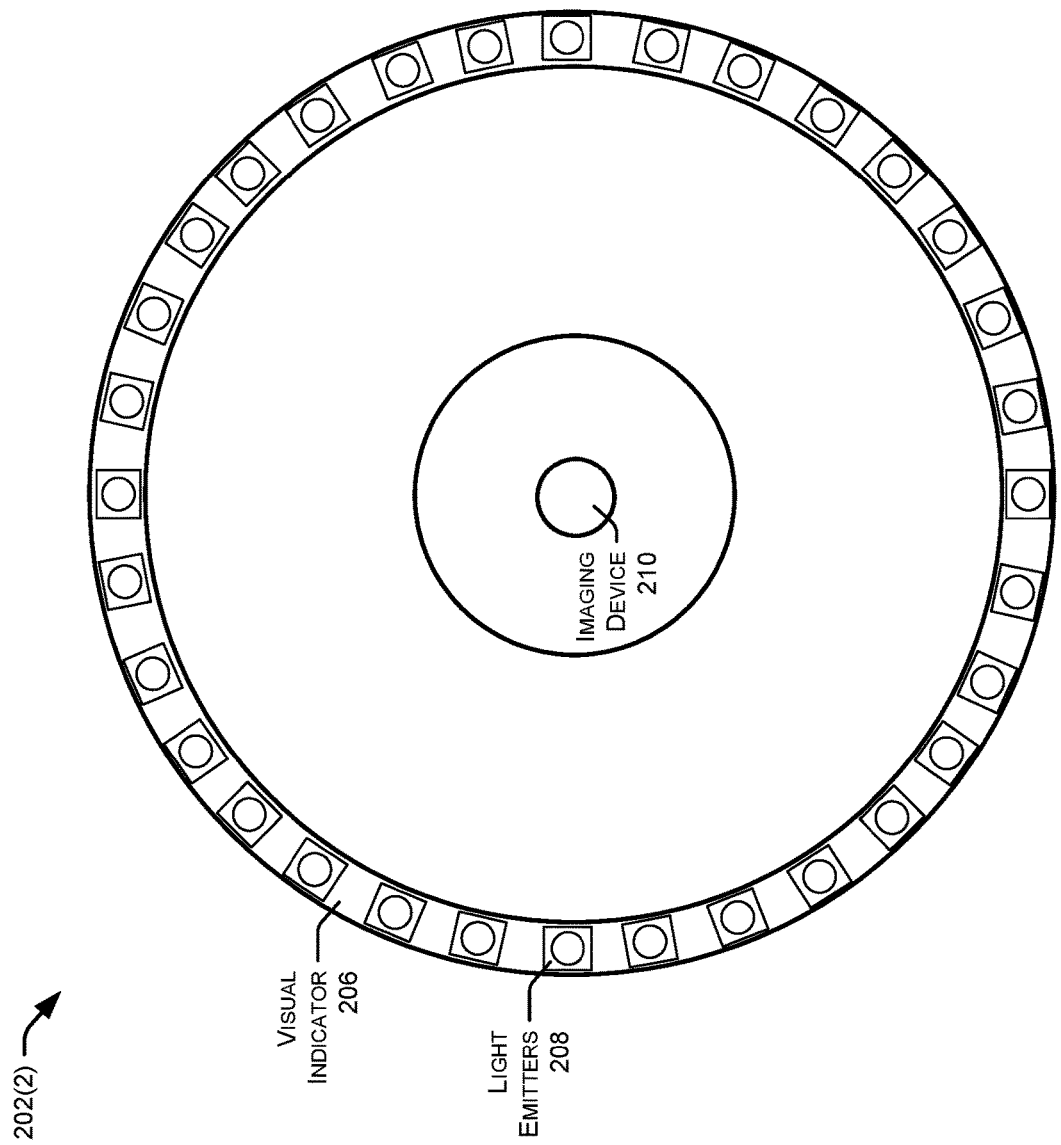

FIG. 2C illustrates another electronic device 202(3) that may be used to identify users using biometric-recognition techniques. In the example of FIG. 2C, the electronic device 202(3) may also include the visual indicator 206 and the imaging device 210. However, the electronic device 202(3) does not include a distance sensor. Rather, the electronic device 202(3) may use the imaging device 210 to determine the locations of hands, using the processes described in more detail with regard to FIG. 6.

Figure 2D:
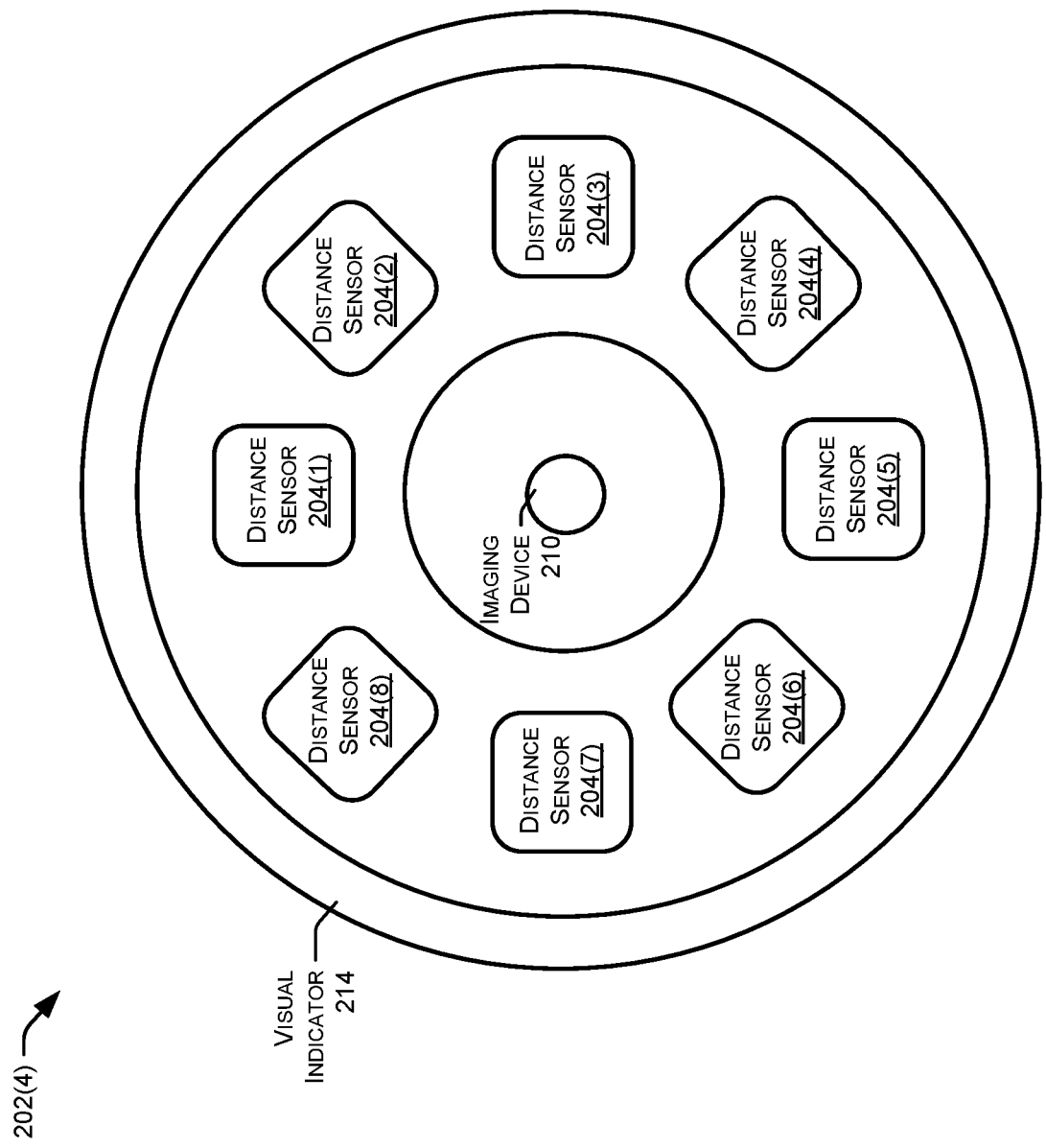

FIG. 2D illustrates another electronic device 202(4) that may be used to identify users using biometric-recognition techniques. In the example of FIG. 2D, the electronic device 202(4) may include the distance sensors 204 and the imaging device 210. However, in other examples, the electronic device 202(4) may include the layout of the electronic device 202(2) and/or the electronic device 202(3) for the distance sensor(s) and/or the imaging device 210. The electronic device 202(4) also includes a visual indicator 214 located around an outer edge of the surface of the electronic device 202(4). The visual indicator 214 may include a display device. However, in other examples, the visual indicator 214 may include a shape other than a circle.

Figure 2E:
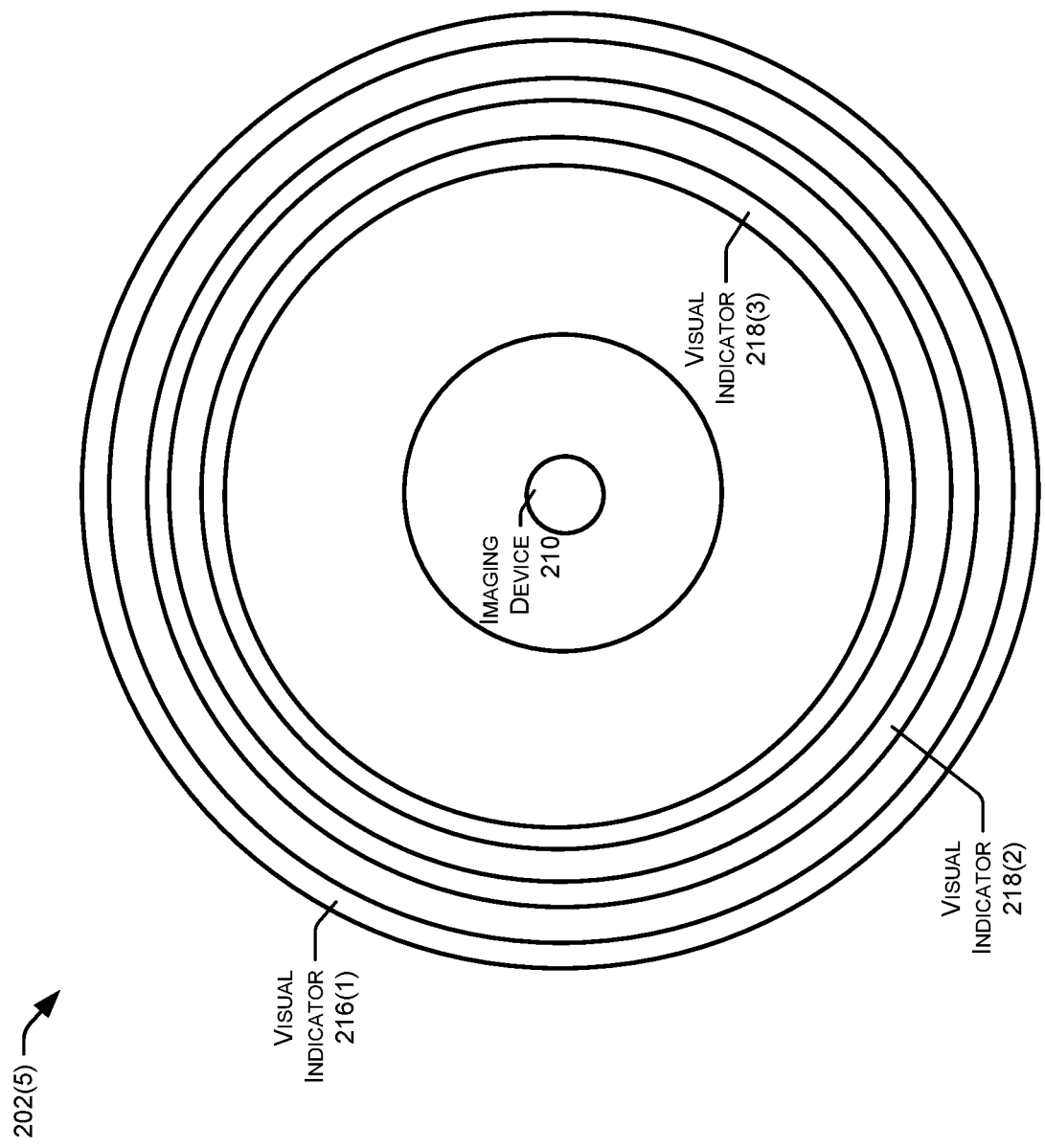

FIG. 2E illustrates another electronic device 202(5) that may be used to identify users using biometric-recognition techniques. In the example of FIG. 2E, the electronic device 202(5) may include at least a first visual indicator 218(1), a second visual indicator 218(2), and a third visual indicator 218(3) (referred to collectively as "visual indicators 218"). The electronic device 202(5) may use the various visual indicators 218 to provide instructions to the user. For example, the third visual indicator 218(3) may be activated when the hand of the user is too close the electronic device 202(5), the second visual indicator 218(2) may be activated when the hand is at the target vertical distance, and the first visual indicator 218(1) may be used when the hand is too far from the electronic device 202(5). This way, the user can determine when the hand is at the target vertical distance based on the second visual indicator 218(2) being activated.

In some instances, each of the visual indicators 218 may also be configured to provide instructions for moving the hand to the target horizontal location, using the processes described herein. Additionally, or alternatively, in some instances, only the second visual indicator 218(2) may be configured to provide instructions for moving the hand to the target horizontal location. In some instances, each of the visual indicators 218 may be similar to the visual indicator 206 and include light emitters 208.

While the examples of FIGS. 2A-2E illustrate a few example configurations for electronic devices, in other examples, an electronic device may include additional and/or alternative configurations. For example, an electronic device may additionally or alternatively include one or more visual indicators located on other surfaces of the electronic device, such as the sides. This way, even if the hand is blocking a portion of the visual indicator located on the top surface, the electronic device is still able to provide instructions to the user using the one or more other visual indicators.

Figure 3A:
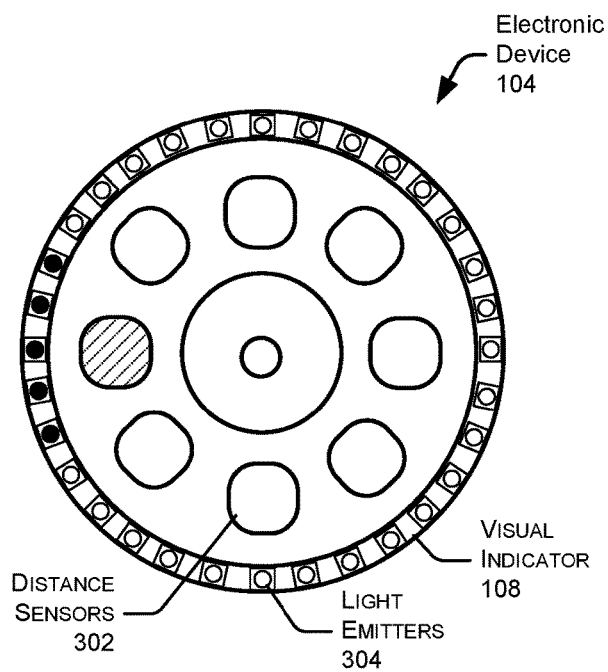
FIGS. 3A-3D illustrate various examples of an electronic device providing instructions to horizontally center a hand.

FIGS. 3A-3D illustrate various examples of the electronic device 104 providing instructions to horizontally center a hand. For instance, and as shown in the example of FIG. 3A, the electronic device 104 may determine the horizontal location of the hand of the user. In some instances, the electronic device 104 determines the horizontal location using distance sensors 302 (although only one is labeled for clarity reasons). For example, and as illustrated, the left distance sensor 302 of the electronic device 104 may detect the hand of the user, which is represented by the diagonal lines associated with the left distance sensor 302. However, the other distance sensors 302 of the electronic device 104 may not detect the hand of the user. As such, the electronic device 104 may determine that the hand of the user is not located at the target horizontal location and/or located too far to the left side of the electronic device 104.

As such, the electronic device 104 may cause the visual indicator 108 to provide instructions to the user. In the example of FIG. 3A, the visual indicator 108 may provide the instructions by indicating to the user that the hand is located too far to the left. As shown, the visual indicator 108 may provide such instructions by causing light emitters 304 (although only one is illustrated for clarity reasons) located at the left side of the visual indicator 108 to emit light, which is illustrated by the solid black circles, but cause all of the other light emitters 304 to refrain from emitting light, which is illustrated by the solid white circles. In some instances, each light emitter 304 is associated with at least one of the distance sensors 302 such that the respective light emitters 304 emit light when the distance sensor 302 detects the hand. For instance, and in the example of FIG. 3A, the light emitters 304 that are emitting the light are associated with at least the left distance sensor 302.

Figure 3B:
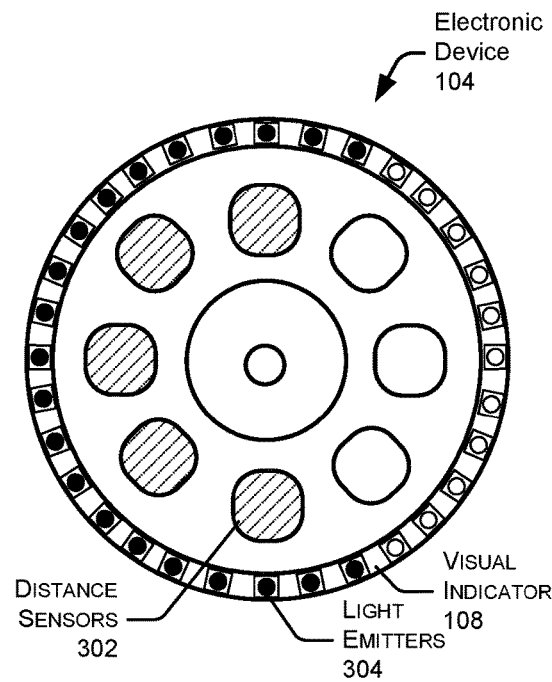

As shown in the example of FIG. 3B, the electronic device 104 may again determine the horizontal location of the hand of the user. In some instances, the electronic device 104 determines the horizontal location using the distance sensors 302. For example, and as illustrated, the back distance sensor 302, the back-left distance sensor 302, the left distance sensor 302, the front-left distance sensor 302, and the front distance sensor 302 of the electronic device 104 may detect the hand of the user, which is represented by the diagonal lines associated with such distance sensors 302. However, the other distance sensors 302 of the electronic device 104 may not detect the hand of the user. As such, the electronic device 104 may again determine that the hand of the user is not located at the target horizontal location and/or located too far to the left side of the electronic device 104. However, the electronic device 104 may also determine that the horizontal location of the hand is now located closer to the target horizontal location than in the example of FIG. 3A.

As such, the electronic device 104 may cause the visual indicator 108 to provide instructions to the user. In the example of FIG. 3B, the visual indicator 108 may provide the instructions by indicating to the user that the hand is located too far to the left. As shown, the visual indicator 108 may provide such instructions by causing the light emitters 304 located at the back, back-left, left, front-left, and front of the visual indicator to emit light, which is illustrated by the solid black circles, but cause all of the other light emitters 304 to refrain from emitting light, which is illustrated by the solid white circles. As discussed above, in some instances, each light emitter 304 is associated with at least one of the distance sensors 302 such that the respective light emitters 304 emit light when the distance sensor 302 detects the hand. For instance, and in the example of FIG. 3B, the light emitters 304 that are emitting the light might be associated with the distance sensors 302 that detected the hand.

Figure 3C:
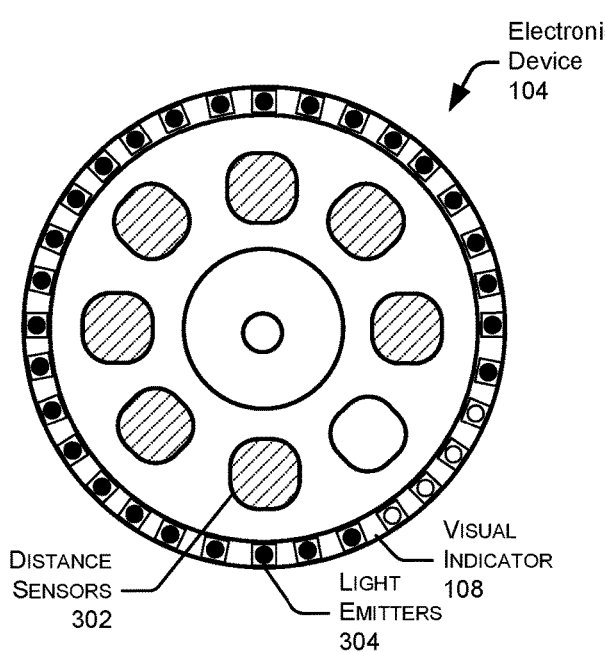

As shown in the example of FIG. 3C, the electronic device 104 may again determine the horizontal location of the hand of the user. In some instances, the electronic device 104 determines the horizontal location using the distance sensors 302. For example, and as illustrated, the back distance sensor 302, the back-left distance sensor 302, the left distance sensor 302, the front-left distance sensor 302, the front distance sensor 302, the front-right distance sensor 302, and the right distance sensor 302 of the electronic device 104 may detect the hand of the user, which is represented by the diagonal lines associated with such distance sensors 302. However, the back-right distance sensor 302 of the electronic device 104 may not detect the hand of the user. As such, the electronic device 104 may again determine that the hand of the user is not located at the target horizontal location and/or located too far to the front-left side of the electronic device 104. However, the electronic device 104 may also determine that the horizontal location of the hand is now located closer to the target horizontal location in the example of FIG. 3B.

As such, the electronic device 104 may cause the visual indicator 108 to provide instructions to the user. In the example of FIG. 3C, the visual indicator 108 may provide the instructions by indicating to the user that the hand is located too far to the front-left of the electronic device 104. As shown, the visual indicator 108 may provide such instructions by causing the light emitters 304 located at the back, back-left, left, front-left, front, front-right, and right of the visual indicator to emit light, which is illustrated by the solid black circles, but cause all of the other light emitters 304 to refrain from emitting light, which is illustrated by the solid white circles. As discussed above, in some instances, each light emitter 304 is associated with at least one of the distance sensors 302 such that the respective light emitters 304 emit light when the distance sensor 302 detects the hand. For instance, and in the example of FIG. 3C, the light emitters 304 that are emitting the light might be associated with the distance sensors 302 that detected the hand.

Figure 3D:
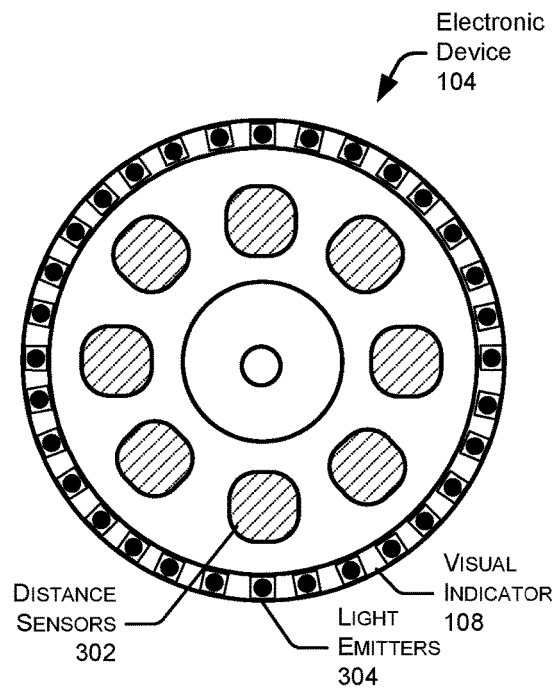

Finally, and as shown in the example of FIG. 3D, the electronic device 104 may again determine the horizontal location of the hand of the user. In some instances, the electronic device 104 determines the horizontal location using the distance sensors 302. For example, and as illustrated, all of the distance sensors 302 of the electronic device 104 may detect the hand of the user, which is represented by the diagonal lines associated with the distance sensors 302. As such, the electronic device 104 may determine that the horizontal location of the hand is now located at the target horizontal location. As such, the electronic device 104 may cause the visual indicator 108 to notify the user that the hand is located at the correct horizontal location. In the example of FIG. 3D, the visual indicator 108 may provide the notification by causing all of the light emitters 304 to emit light, which is illustrated by the solid black circles.

Figure 4A:
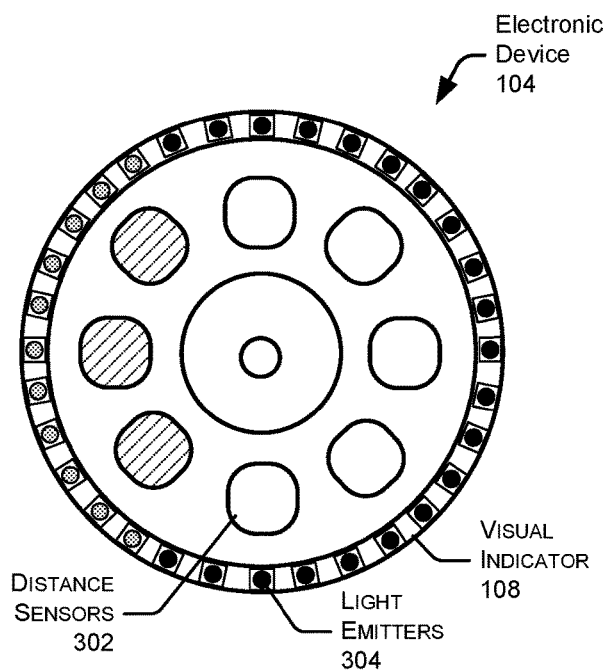
FIGS. 4A-4D illustrate various examples of an electronic device providing instructions to angle a hand.

It should be noted that, in some instances, the electronic device 104 may then attempt to identify an account of the user using image data representing the hand of the user. In some instances, if the electronic device cannot identify an account, such as if the user has yet to register an account, the electronic device 104 may provide a notification that there is an error and/or an account should be created. In some instances, the electronic device 104 may provide the notification by causing the visual indicator 108 emit a color of light, a light pattern, and/or a brightness of light, similar to one or more of the examples illustrated herein. Additionally, in some instances, if the electronic device identifies an account, such as if the user has already registered the account, the electronic device 104 may provide a notification that the account was identified. In some instances, the electronic device 104 may provide the notification by causing the visual indicator 108 emit a color of light, a light pattern, and/or a brightness of light, similar to one or more of the examples illustrated herein FIGS. 4A-4D illustrate various examples of the electronic device 104 providing instructions to angle a hand. For instance, and as shown in the example of FIG. 4A, the electronic device 104 may determine the angle of the hand of the user. In some instances, the electronic device 104 determines the angle using the distance sensors 302. For example, and as illustrated, the back-left distance sensor 302, the left distance sensor 302, and the front-left distance sensor 302 of the electronic device 104 may detect a first vertical distance of the hand of the user, which is represented by the diagonal lines, while the other distance sensors 302 detect a second vertical distance of the hand of the user. The electronic device 104 may then determine that the first vertical distance is outside of the target vertical distance (e.g., the vertical range) while the second vertical distance is within the target vertical distance.

As such, the electronic device 104 may cause the visual indicator 108 to provide instructions to the user. In the example of FIG. 4A, the visual indicator 108 may provide the instructions by indicating to the user that the left portion of the hand is too close to the electronic device 104. As shown, the visual indicator 108 may provide such instructions by causing the light emitters 304 located at the back-left, the left, and the top-left of the visual indicator 108 to emit a first color of light, which is illustrated by the solid grey circles, but cause all of the other light emitters 304 to emit a second color of light, which is illustrated by the solid black circles. However, in other examples, the visual indicator 108 may provide the instructions by causing the light emitters 304 located at the back-left, the left, and the top-left of the visual indicator 108 to refrain from emitting light while causing all of the other light emitters 304 to emit light.

Figure 4B:
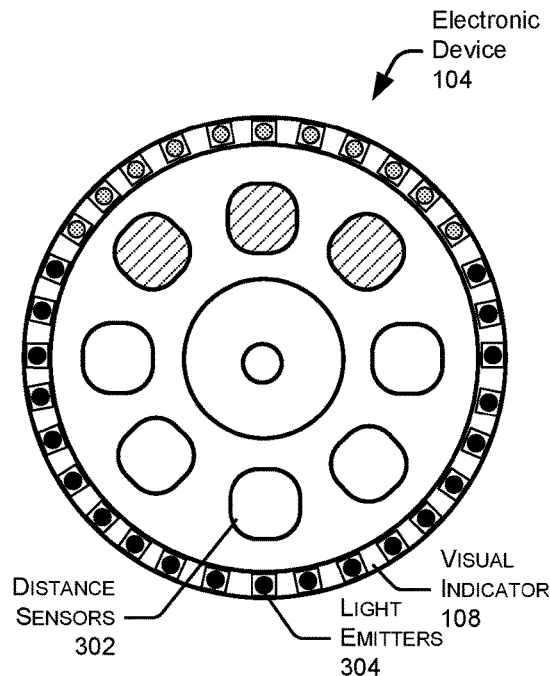

As shown in the example of FIG. 4B, the electronic device 104 may again determine the angle of the hand of the user. In some instances, the electronic device 104 determines the angle using the distance sensors 302. For example, and as illustrated, the top-left distance sensor 302, the top distance sensor 302, and the top-right distance sensor 302 of the electronic device 104 may detect a first vertical distance of the hand of the user, which is represented by the diagonal lines, while the other distance sensors 302 detect a second vertical distance of the hand of the user. The electronic device 104 may then determine that the first vertical distance is outside of the target vertical distance (e.g., the vertical range) while the second vertical distance is within the target vertical distance.

As such, the electronic device 104 may cause the visual indicator 108 to provide instructions to the user. In the example of FIG. 4B, the visual indicator 108 may provide the instructions by indicating to the user that the top portion of the hand is too close to the electronic device 104. As shown, the visual indicator 108 may provide such instructions by causing the light emitters 304 located at the top-left, the top, and the top-right of the visual indicator 108 to emit a first color of light, which is illustrated by the solid grey circles, but cause all of the other light emitters 304 to emit a second color of light, which is illustrated by the solid black circles. However, in other examples, the visual indicator 108 may provide the instructions by causing the light emitters 304 located at the top-left, the top, and the top-right of the visual indicator 108 to refrain from emitting light while causing all of the other light emitters 304 to emit light.

Figure 4C:
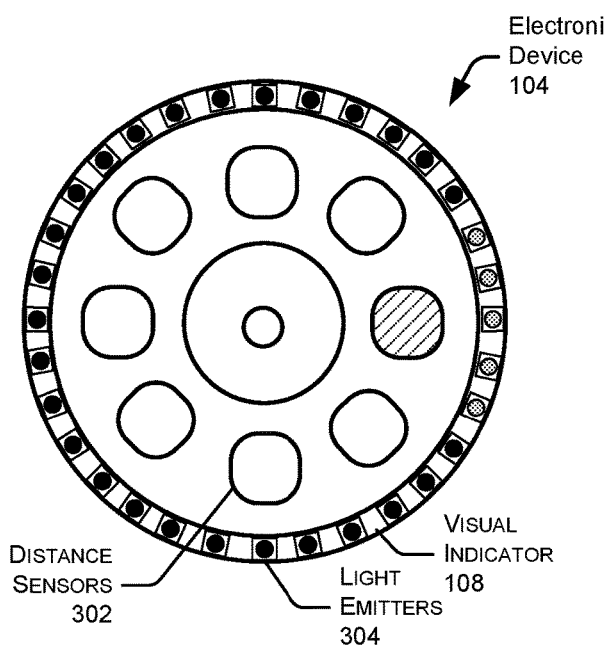

As shown in the example of FIG. 4C, the electronic device 104 may again determine the angle of the hand of the user. In some instances, the electronic device 104 determines the angle using the distance sensors 302. For example, and as illustrated, the right distance sensor 302 of the electronic device 104 may detect a first vertical distance of the hand of the user, which is represented by the diagonal lines, while the other distance sensors 302 detect a second vertical distance of the hand of the user. The electronic device 104 may then determine that the first vertical distance is outside of the target vertical distance (e.g., the vertical range) while the second vertical distance is within the target vertical distance.

As such, the electronic device 104 may cause the visual indicator 108 to provide instructions to the user. In the example of FIG. 4C, the visual indicator 108 may provide the instructions by indicating to the user that the right portion of the hand is too close to the electronic device 104. As shown, the visual indicator 108 may provide such instructions by causing the light emitters 304 located at the right of the visual indicator 108 to emit a first color of light, which is illustrated by the solid grey circles, but cause all of the other light emitters 304 to emit a second color of light, which is illustrated by the solid black circles. However, in other examples, the visual indicator 108 may provide the instructions by causing the light emitters 304 located at the right of the visual indicator 108 to refrain from emitting light while causing all of the other light emitters 304 to emit light.

Figure 4D:
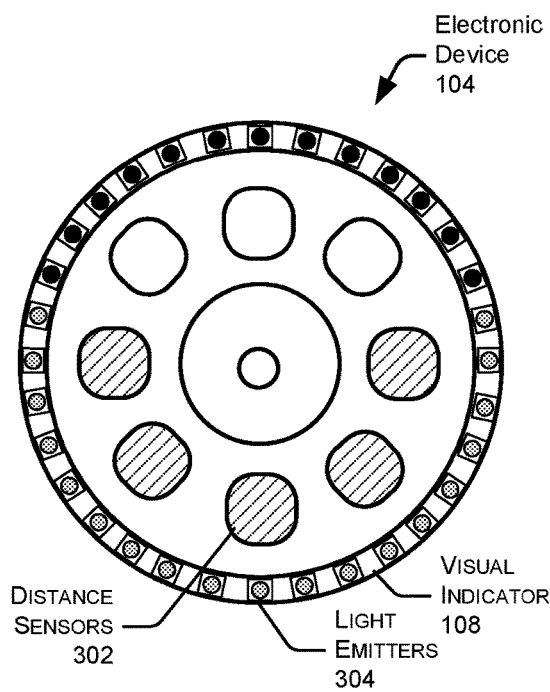

Finally, and as shown in the example of FIG. 4D, the electronic device 104 may again determine the angle of the hand of the user. In some instances, the electronic device 104 determines the angle using the distance sensors 302. For example, and as illustrated, the right distance sensor 302, the back-right distance sensor 302, the back distance sensor 302, the back-left distance sensor 302, and the left distance sensor 302 of the electronic device 104 may detect a first vertical distance of the hand of the user, which is represented by the diagonal lines, while the other distance sensors 302 detect a second vertical distance of the hand of the user. The electronic device 104 may then determine that the first vertical distance is outside of the target vertical distance (e.g., the vertical range) while the second vertical distance is within the target vertical distance.

As such, the electronic device 104 may cause the visual indicator 108 to provide instructions to the user. In the example of FIG. 4D, the visual indicator 108 may provide the instructions by indicating to the user that the back portion of the hand is too close to the electronic device 104. As shown, the visual indicator 108 may provide such instructions by causing the light emitters 304 located at the right, the back-right, the back, the back-left and the left of the visual indicator 108 to emit a first color of light, which is illustrated by the solid grey circles, but cause all of the other light emitters 304 to emit a second color of light, which is illustrated by the solid black circles. However, in other examples, the visual indicator 108 may provide the instructions by causing the light emitters 304 located at the right, the back-right, the back, the back-left, and the left of the visual indicator 108 to refrain from emitting light while causing all of the other light emitters 304 to emit light.

Figure 5A:
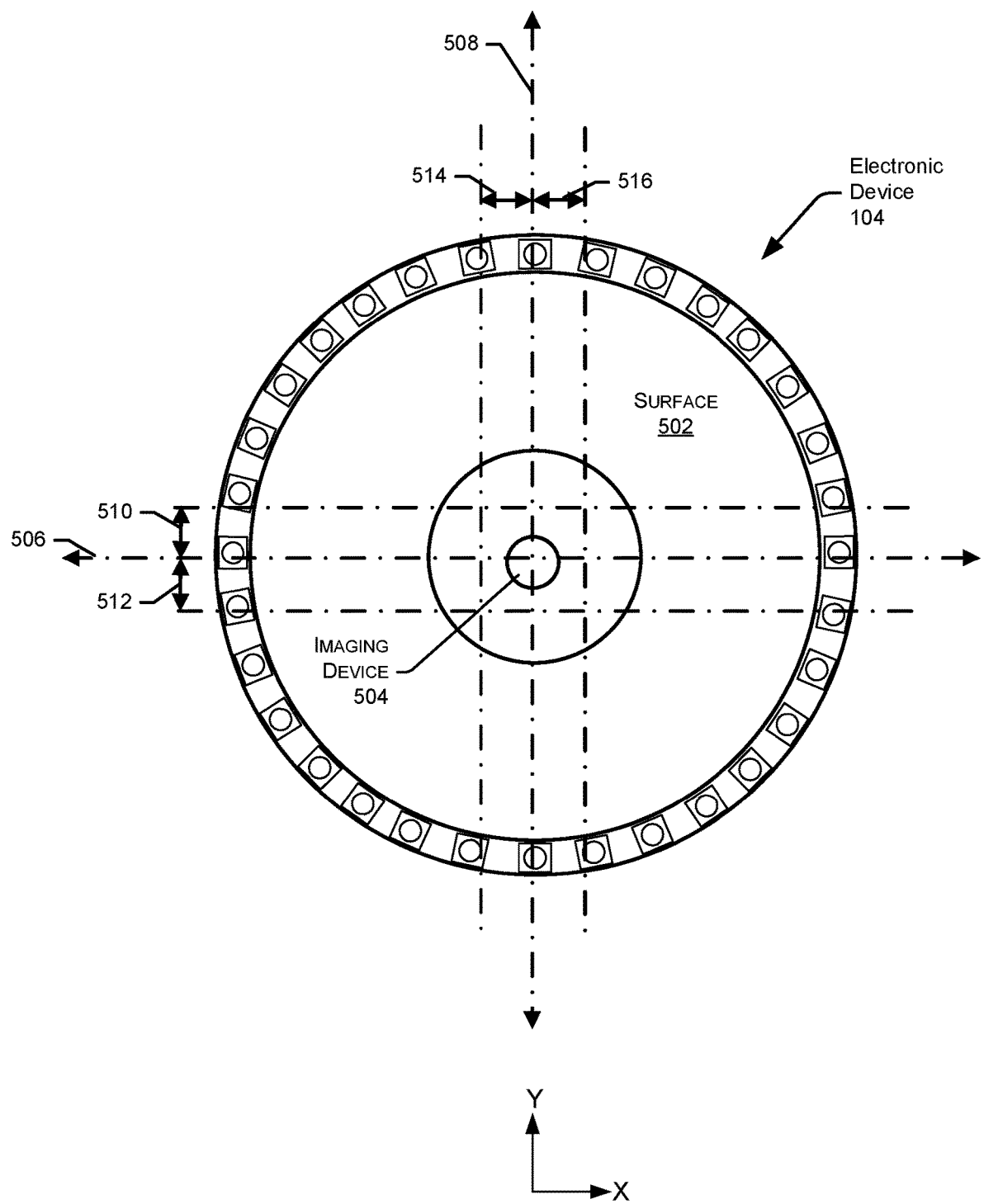
FIGS. 5A-5D illustrate examples of target locations for placing a hand of a user so that an electronic device can capture biometric data.
Figure 5B:
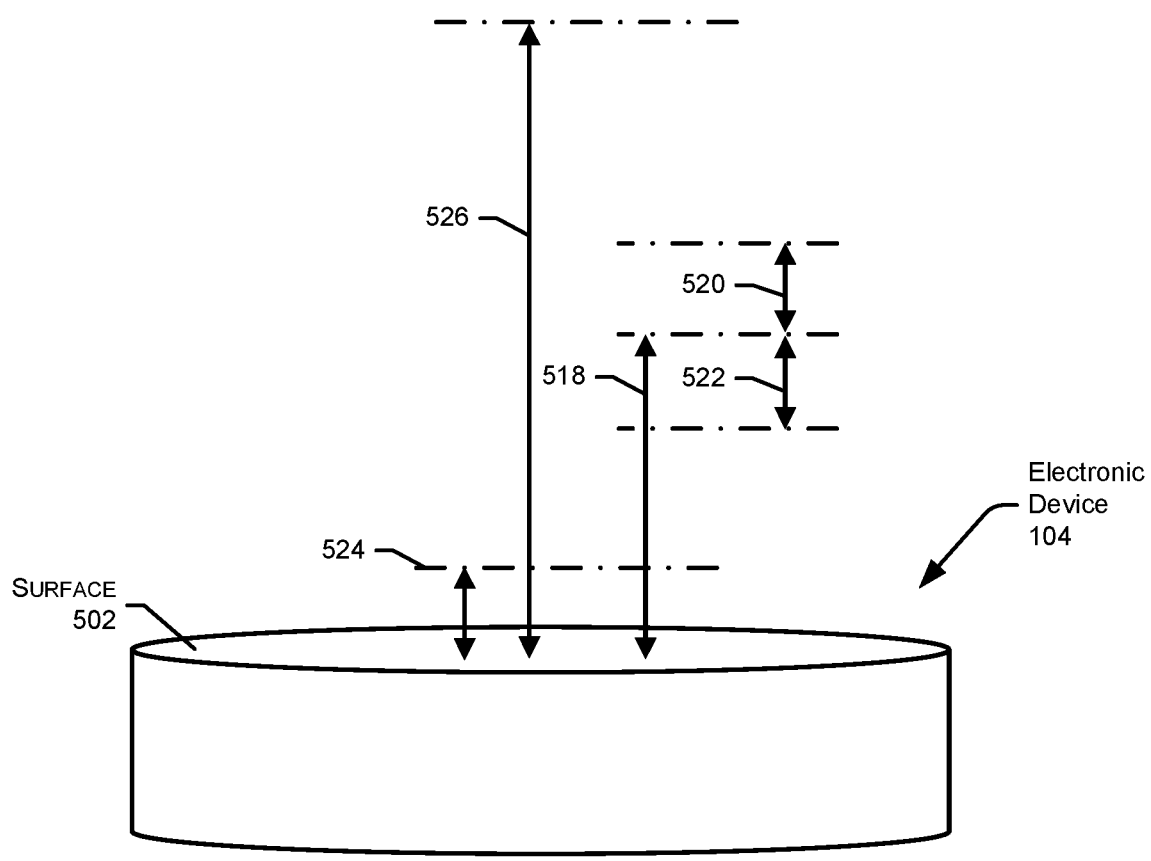

FIGS. 5A-5B illustrate examples of target locations for placing a hand so that the electronic device 104 can capture biometric data. For instance, and as shown in the example of FIG. 5A, the electronic device 104 includes a top surface 502 and an imaging device 504. In order for the electronic device 104 to capture the biometric data, such as the image data, the user places the hand (e.g., the center point of the palm of the hand) over the imaging device 504 and at the target horizontal location. The target horizontal location may be associated with both an x-direction and a y-direction. For instance, the target horizontal location may include the center of the imaging device 504, which is illustrated by the intersection of a first line 506 in the x-direction and a second line 508 in the y-direction.

In some instances, the electronic device 104 may allow for the hand to be proximate to the target horizontal location when capturing the biometric data. For instance, the electronic device 104 may allow for the hand to be a first threshold distance 510 in front of the target horizontal location (e.g., moving in the positive y-direction from the target horizontal location), a second threshold distance 512 behind the target horizontal location (e.g., moving in the negative y-direction from the target horizontal location), a third threshold distance 514 to the left of the target horizontal location (e.g., moving in the negative x-direction from the target horizontal location), and/or a fourth threshold distance 516 to the right of the target horizontal location (e.g., moving in the positive x-direction from the target horizontal location). In some instances, the first threshold distance 510, the second threshold distance 512, the third threshold distance 514, and the fourth threshold distance 516 may include the same threshold distance. In some instances, one or more of the first threshold distance 510, the second threshold distance 512, the third threshold distance 514, and the fourth threshold distance 516 may include a different threshold distance. As described herein, a threshold distance may include, but is not limited to, five millimeters, ten millimeters, twenty millimeters, and/or any other distance.

Additionally, and as shown in the example of FIG. 5B, the electronic device 104 may include a target vertical distance that is located a distance 518 above the imaging device 504 (e.g., in the z-direction). In some examples, the distance 518 includes eighty-five millimeters. However, in other examples, the distance 518 may include any other distance. In some instances, the electronic device 104 may allow for the hand to be proximate to the target vertical distance. For instance, the electronic device 104 may allow for the hand to be a first threshold distance 520 above the target vertical distance and/or a second threshold distance 522 below the target vertical distance. In some instances, the first threshold distance 520 is the same as the second threshold distance 522. In other instances, the first threshold distance 520 is different than the second threshold distance 522.

As further illustrated in the example of FIG. 5B, the electronic device 104 may be able to detect the hand of the user between a minimum distance 524 above the imaging device 504 and a maximum distance 526 above the imaging device 504. For instance, the distance sensor may be configured to detect objects, such as hands, between the minimum distance 524 and the maximum distance 526. In some instances, the minimum distance 524 may include, but is not limited to, five millimeters, ten millimeters, twenty millimeters, and/or any other distance. Additionally, the maximum distance 526 may include, but is not limited to, one hundred millimeters, one hundred and twenty millimeters, one hundred and fifty millimeters, and/or any other distance.

Figure 5C:
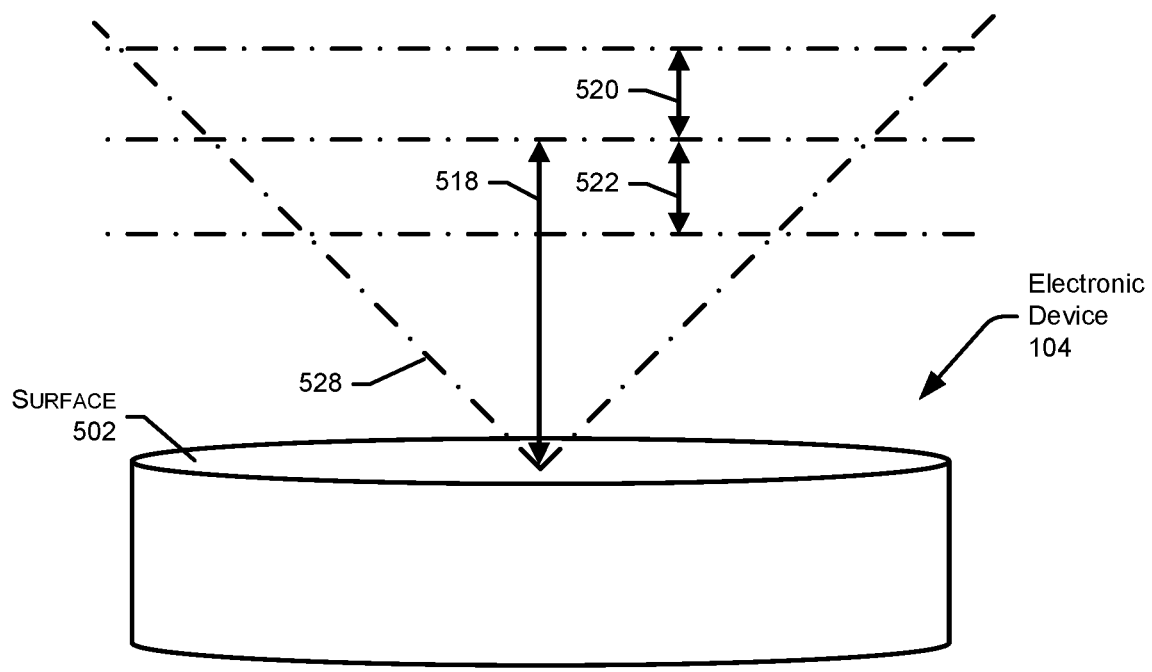

In the example of FIG. 5C, the electronic device 104 may include a target location that includes a volumetric shape 528, such as a volumetric shape of a cone above the imaging device 504. For example, the target vertical distance may still be located the distance 518 above the imaging device 504 and include the first threshold distance 520 and the second threshold distance 522. The target horizontal location may then be located within the volumetric shape 528 and at locations that are within the target vertical distance. In some instances, the palm of the hand may need to be located within the target location while in other examples, the entire hand may need to be located within the target location.

Figure 5D:
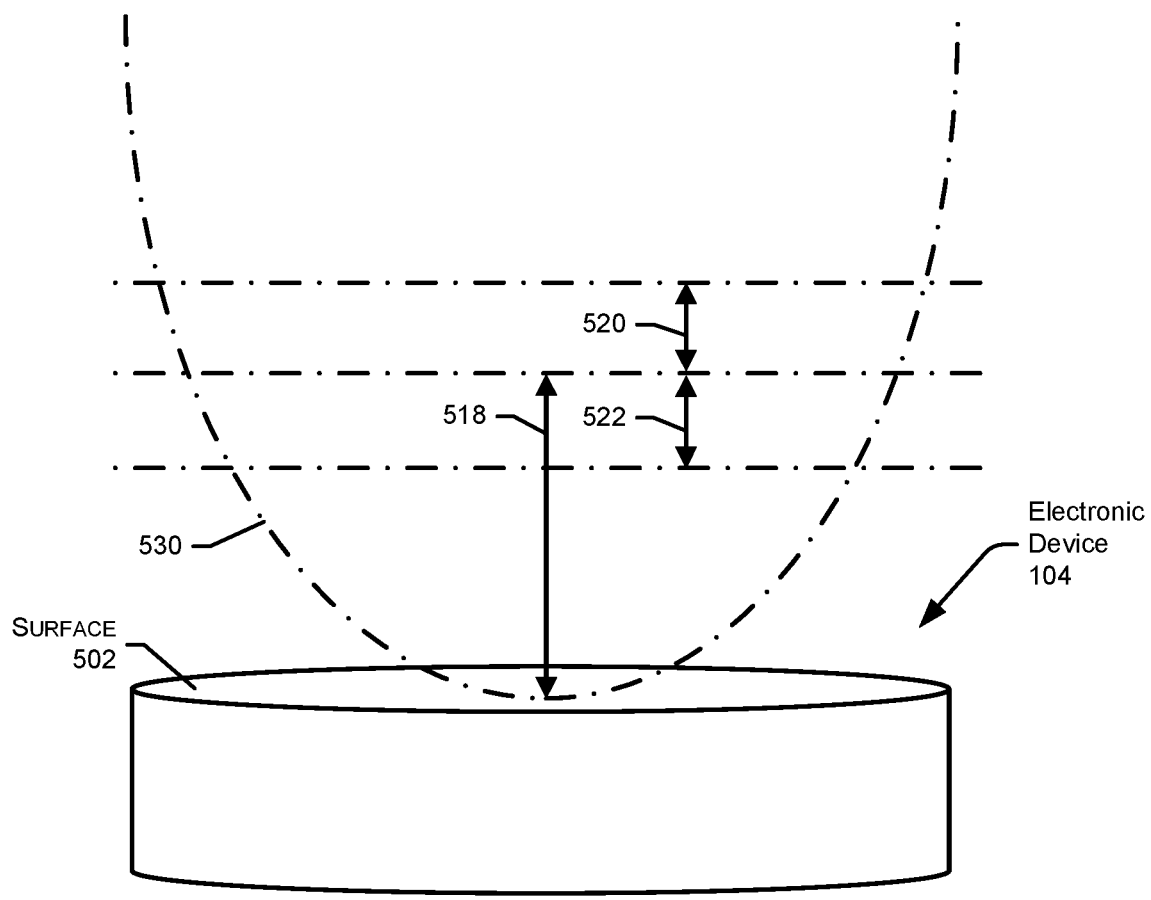

In the example of FIG. 5D, the electronic device 104 may include a target location that includes a volumetric shape 530 above the imaging device 504. For example, the target vertical distance may still be located the distance 518 above the imaging device 504 and include the first threshold distance 520 and the second threshold distance 522. The target horizontal location may then be located within the volumetric shape 530 and at locations that are within the target vertical distance. In some instances, the palm of the hand may need to be located within the target location while in other examples, the entire hand may need to be located within the target location.

Figure 6:
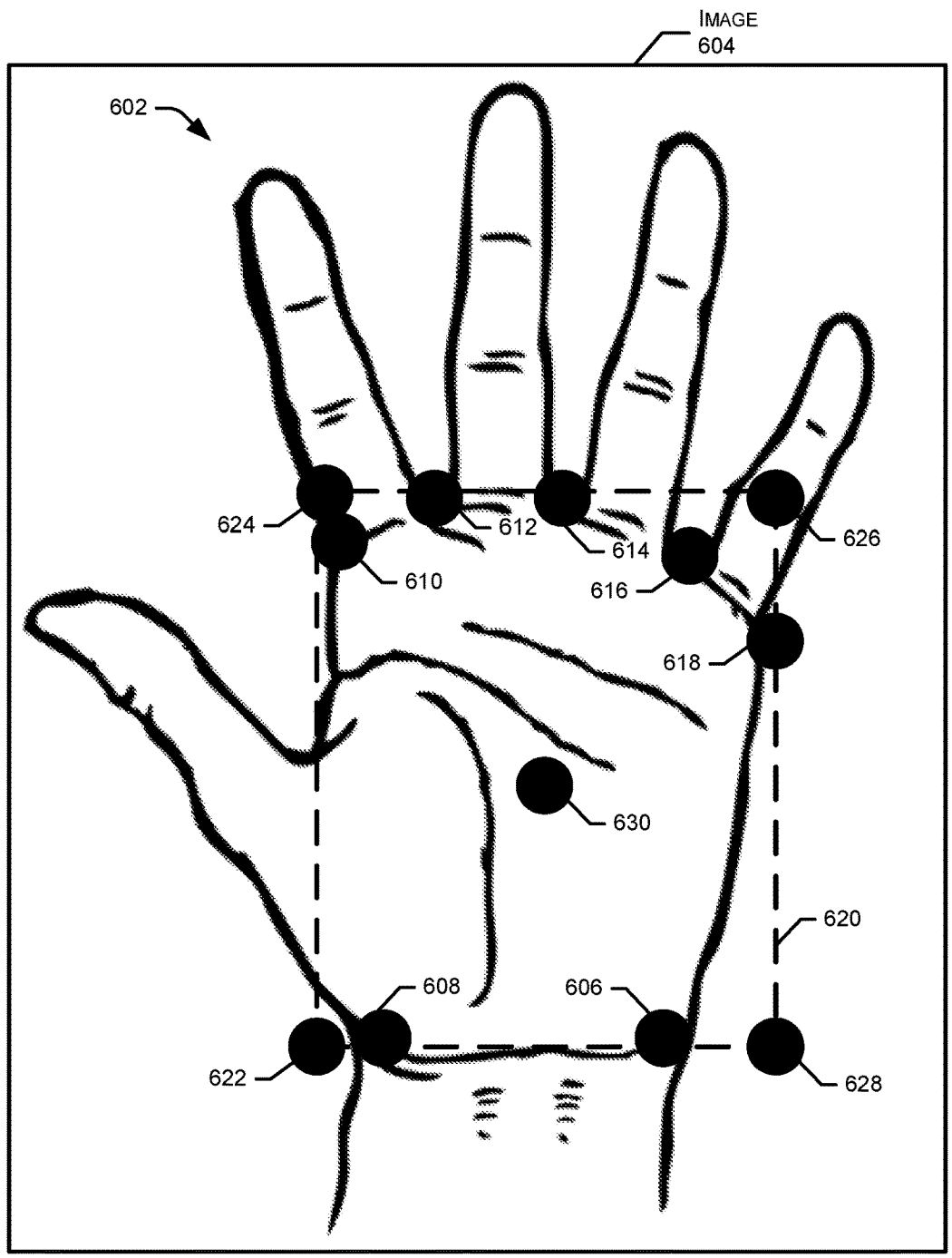
FIG. 6 illustrates an example of analyzing a hand in order to identify the center of a palm of the hand.

FIG. 6 illustrates an example of analyzing a hand 602 in order to identify the center of a palm of the hand 602. For instance, the electronic device 104 may generate image data representing an image 604 depicting the hand 602. The electronic device 104 may then generate feature data corresponding to the image data, where the feature data represents various attributes associated with the hand 602. The various attributes may include at least points 606-618 located on the hand 602. For example, the electronic device 104 may identify a point 606 located on a first end of the wrist and a point 608 located on a second, opposite end of the wrist. The electronic device 104 may further identify points 610-618 located on the bottom of the fingers of the hand 602. As shown, the points 612-618 are located at intersections between the fingers.

After identifying the points 606-618, the electronic device 104 may generate a bounding box 620 that includes all of the identified points 606-618. The bounding box 620 may be associated with four additional points 622-628 representing the corners of the bounding box 620. The electronic device 104 may then use the bounding box 620 to identify a center point 630 of the palm of the hand 602. For example, the electronic device 104 may determine that the center point 630 of the palm includes the center of the bounding box 620. As such, in some examples, the center point 630 of the palm may correspond to the horizontal location of the hand 602.

In some instances, and as described herein, the electronic device 104 may identify one or more additional attributes associated with the hand 602 using the image 604. For example, since the hand 602 is oriented in the y-direction, the electronic device 104 may determine that the orientation of the hand 602 is satisfied. The electronic device 104 may further determine that the planar shape of the hand 602 is satisfied since the hand 602 is not in the shape of a cup, a fist, and/or the hand 602 is making a gesture. Rather, the hand 602 is open such that the electronic device 104 may analyze the image 604 to determine the attributes. Furthermore, the electronic device 104 may determine that the hand 602 is parallel to the imaging component of the electronic device 104. This may be because, based on the orientation of the hand 602 with respect to the imaging component, the palm of the hand 602 is pointed towards the imaging component.

While the example of FIG. 6 describes identifying the points 606-618 and then using the points 606-618 to determine the center point of the palm, in other examples, the electronic device 104 may identify additional and/or alternative points on the hand 602 and then use the additional and/or alternative points to identify the center point 630 of the palm.

Figure 7:
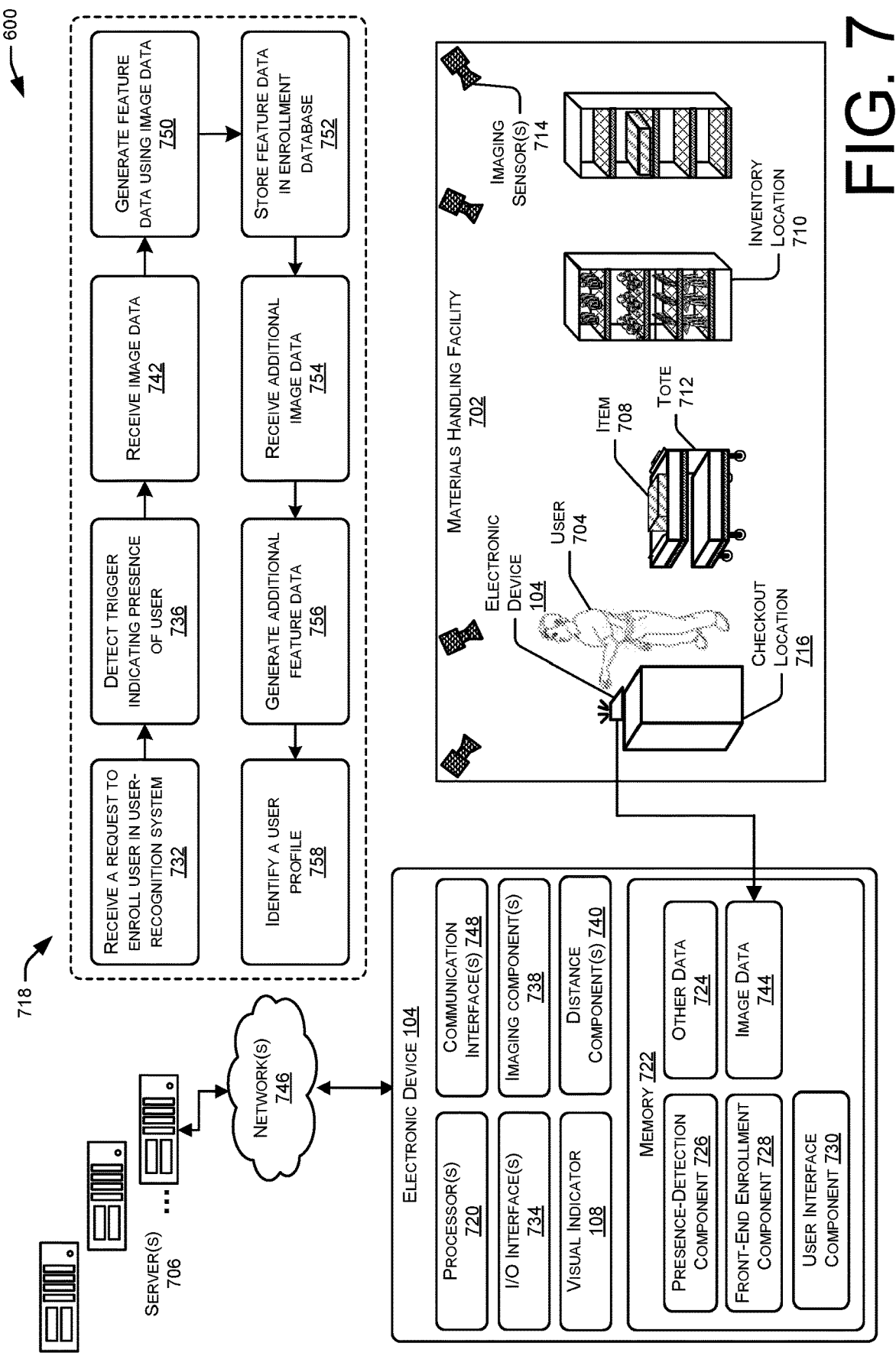
FIG. 7 illustrates an example environment that includes an electronic device that determines that a user would like to enroll with a user-recognition system.

FIG. 7 illustrates an example environment 700 of a materials handling facility 702 that includes the electronic device 104 to capture biometric data of users. In this example, the electronic device 104 generates image data depicting a palm of a user 704 and sends the image data to one or more backend server(s) 706 to be used to enroll the user 704 for use of the user-recognition system. Generally, the user-recognition system may include the electronic device 104 and/or the server(s) 706.

In some instances, some or all of the user-recognition system resides remotely from the materials handling facility 702, while in other instances, some or all of the user-recognition system resides within or proximate to the materials handling facility 702. As FIG. 7 depicts, the user 704 may have engaged in, or be about to engage in, a shopping session in the materials handling facility 702. For instance, the user 704 may have selected an item 708 from an inventory location 710 (e.g., shelf, aisle, etc.) and placed the item 708 in a tote 712 (e.g., shopping cart). The inventory location 710 may house one or more different types of items 708 and the user 704 may pick (i.e., take) one of these items 708.

As illustrated, the materials handling facility 702 (or "facility") may include one or more sensors, such as the illustrated imaging sensor(s) 714, and/or an array of other sensors located on or near the inventory location(s) 710. In this example, the imaging sensor(s) 714 are configured to capture video data within the facility 702 for use in determining results associated with events, such as the picking of the item 708 by the user 704. While FIG. 7 illustrates various example sensors, the sensors in the facility 702 may comprise any other type of sensor, such as weight sensors (e.g., load cells), microphones, and/or the like, as described in detail below. As described in more detail with respect to FIGS. 13 and 14, the facility 702 may be monitored and/or otherwise associated with an inventory-management system configured to determine events in the facility 702 associated with the user 704, such as taking items 708 that the user 704 would like to purchase. The inventory-management system may track the items 708 selected by the user 704 and maintain a virtual shopping cart which includes all of the items 708 taken by the user 704. Thus, when a user 704 would like to leave the facility 702 with the items 708 they have taken, the inventory-management system may charge a user account associated with the user 704 for the cost of the items 708 that were taken.

As shown in FIG. 7, the user 704 may approach a checkout location 716 associated with the electronic device 104. The user 704 may determine that they would like to enroll for use of a user-recognition system in order to checkout of the facility 702 and pay for their item(s) 708. Alternatively, or additionally, the user may interact with the electronic device 104 upon entering the facility 702. In either instance, the user 704 may determine that they would like the user-recognition system to collect data that is usable to identify the user 704. This data may be utilized by the user-recognition system such that, once enrolled, the user 704 need only scan his or her palm to be identified by the user-recognition system in order to charge their user account with the purchase of their item(s) 708.

FIG. 7 illustrates an example enrollment process 718 that describes, at a high level, techniques for enrolling the user 704 for use of the user-recognition system and for the user-recognition system updating the enrollment of the user 704 over time. The electronic device 104 may comprise components for performing at least a portion of the techniques of the enrollment process 718, as may the servers. Components of the server(s) 706 are described in further detail below with reference to subsequent figures. For example, the electronic device 104 may comprise one or more processors 720 configured to power components of the electronic device 104 and may further include memory 722 which stores components that are at least partially executable by the processor(s) 720, as well as other data 724. For example, the memory 722 may include a presence-detection component 726 to detect the presence of a user 704, a front-end enrollment component 728 configured to perform various operations for enrolling the user 704 for use of the user-recognition system, and a user interface component 730 configured to control instructions being provided to the user 704 via the visual indicator 108.

At 732, the front-end enrollment component 728 may receive a request to enroll the user 704 for use of the user-recognition system. The request may comprise various types of input, such as a selection made via an I/O interface 734 (e.g., touch screen, mouse, keyboard, speakers, etc.) for starting an enrollment process. Additionally, the front-end enrollment component 728 may detect a speech utterance from the user 704 indicating a request to enroll (e.g., "please enroll me," "I would like to check out," etc.). Another request example may include the user 704 sliding a user ID card into an I/O interface 734, such as a credit card, driver's license, etc. However, any type of input may be detected as a request by the front-end enrollment component 728.

In some examples, at 736 of the enrollment process 718, the presence-detection component 726 may be executable by the processor(s) 720 to detect a trigger indicating presence of the user 704. The trigger detected by the presence-detection component 726 may comprise one or more types of input. For instance, the presence-detection component 726 may include logic to detect, using one or more imaging component 738 (e.g., which may represent the imaging device 504) and/or one or more distance components 740 (e.g., which may represent the distance sensors 302), a palm of the user 704 over or proximate to the electronic device 104. Other examples of triggers detected by the presence-detection component 726 that may indicate the presence of the user 704 may include receiving touch input (or other input, such as a mouse click) via one or more I/O interfaces 734 of the electronic device 104. However, any type of input may be detected as a trigger by the presence-detection component 726 at 736. In some examples, the trigger detection at 736 may not be performed, or may be included in or the same as receiving the request to enroll.

After receiving the request to enroll from the user 704, the front-end enrollment component 728 may, at 742, begin generating image data 744 using the one or more imaging component(s) 738 (e.g., cameras). For instance, the front-end enrollment component 728 may utilize the imaging component(s) 738 to obtain image data 744, such as an image or picture, a sequence of consecutive images, and/or video data. The image data 744 may represent the palm of the user 704 and may be used to identify creases in the palm, veins in the palm, geometric information regarding the palm and other parts of the hand or the user 704 and/or the like. In some instances, while obtaining the image data 744, the user interface component 730 may cause the electronic device 104 to provide instructions for how to place the hand of the user 704. Once the front-end enrollment component 728 has obtained the image data 744 representing the palm or other portion of the user 704, the electronic device 104 may send (e.g., upload, stream, etc.) the image data 744 to the server(s) 706 over one or more networks 746 using one or more communication interfaces 748.

The network(s) 746 may include private networks such as an institutional or personal intranet, public networks such as the Internet, or a combination thereof. The network(s) 746 may utilize wired technologies (e.g., wires, fiber optic cable, and so forth), wireless technologies (e.g., radio frequency, infrared, acoustic, optical, and so forth), or other connection technologies. The network(s) 746 is representative of any type of communication network, including one or more of data networks or voice networks. The network(s) 746 may be implemented using wired infrastructure (e.g., copper cable, fiber optic cable, and so forth), a wireless infrastructure (e.g., cellular, microwave, satellite, etc.), or other connection technologies.

The communication interface(s) 748 may include devices configured to couple to personal area networks (PANs), wired and wireless local area networks (LANs), wired and wireless wide area networks (WANs), and so forth. For example, the communication interfaces 748 may include devices compatible with Ethernet, Wi-Fi™, and so forth. In some examples, the communication interface(s) 748 may encode the image data 744 and/or other data 724 (e.g., distance data from a distance sensor) generated by the electronic device 104 prior to sending over the network(s) 746 according to the type of protocol or standard being used.

Upon receiving the image data 744, and at 750, one or more components of the back-end server(s) 706 may generate feature data using the image data 744. This feature data may be in a vector form and may represent characteristics about the user's palm that may be used to differentiate the palm from other user palms. It is to be appreciated that while this enrollment process 750 describes the server(s) 706 generating the feature data, in other instances, the electronic device 104 may be configured to generate the feature data and may send the feature data, in addition to or rather than the image data 744, to the servers.

At 752, one or more components of the server(s) 706 store the feature data in an enrollment database in association with a user profile of the user 704. That is, this palm-feature data is stored such that it may be compared to feature data generate from subsequent image data for later identification of the user 704 at the facility 702 or other facilities that are associated with the user-recognition system.

For example, at 754, the imaging component(s) 738 receive additional image data 744 of the palm of the user 704, such as at a time when the user 704 has returned to the facility 702 at a later date. After the server(s) 706 receive the additional image data 744 from the electronic device 104, and at 756, the server(s) 706 may generate additional feature data based on the additional image data. At this point, one or more components of the server(s) 706 may compare the additional feature data to feature data stored in respective user profiles for the purpose of identifying the user 704 associated with the additional image data 744. In this example, the user-recognition system compares the additional feature data generated at 756 with the feature data generated at 750 and stored in association with the user profile of the user 704 and, thus, at 758, identifies the user profile. In some instances, in addition to identifying the user profile, the user-recognition system may then store the additional feature data in the enrollment database in association with the user profile of the user 704.

Figure 8:
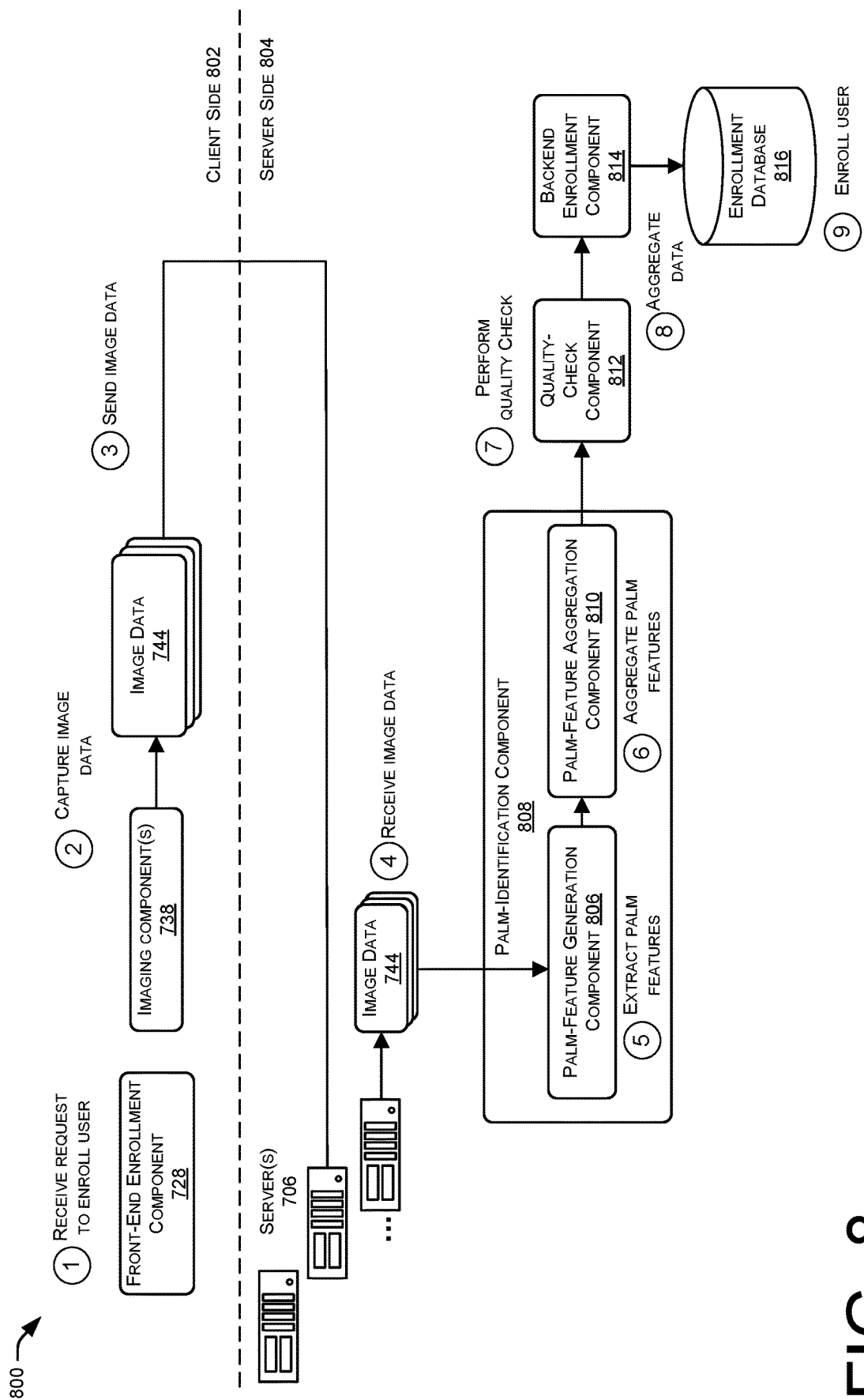
FIG. 8 illustrates an example environment including a block diagram of one or more servers configured to support at least a portion of the functionality of a user-recognition system, as well as an example flow of data within the system for enrolling a user with the user-recognition system.

FIG. 8 illustrates an example environment 800 including block diagram of the server(s) 706 configured to support at least a portion of the functionality of a user-recognition system, as well as an example flow of data within the system for enrolling the user 704 for use of the user-recognition system.

As illustrated, the environment 800 includes a client side 802 and a server side 804. However, this is merely illustrative, and some or all of the techniques may be performed entirely on the client side 802, or entirely on the server side 804. At "1," a front-end enrollment component 728 may receive a request to enroll a user 704 for use of the user-recognition system. For example, the request may comprise various types of input, such as a selection made via an I/O interface 734 (e.g., touch screen, mouse, keyboard, etc.) of a user interface element presented on a display for starting an enrollment process. Additionally, the front-end enrollment component 728 may detect a speech utterance from the user 704 indicating a request to enroll (e.g., "please enroll me," "I would like to check out," etc.). Another request example may include the user 704 sliding a user ID card into an I/O interface 734, such as a credit card, driver's license, etc. However, any type of input may be detected as a request by the front-end enrollment component 728.

Upon receiving the request to enroll, the front-end enrollment component 728 may activate or otherwise utilize the imaging component(s) 738 to generate image data 744 representing a palm of the user 704. At "2," the electronic device 104 then captures image data 744 and, at "3", sends the image data 744 to the server(s) 706. For instance, the electronic device 104 may encode and send the image data 744 over the network(s) 746 to the server(s) 706. Further, in some instances, some of the images may be removed if there are not in focus, do not have a threshold level of discriminability of the characteristics of the palm of the user, or the like. This removal may occur on the client side 802 and/or the server side 804.

At "4," the server(s) 706 receive the image data and, at "5", a palm-feature generation component 806 of a palm-identification component 808 may extract palm-feature data from the image data 744. In some examples, prior to extracting the palm-feature data, the palm-feature generation component 806 may perform various operations for processing the image data 744 prior to extracting the palm-feature data. For instance, the palm-feature generation component 806 may initially perform user detection to determine that the image data 744 represents a palm of a user 704. For instance, the palm-feature generation component 806 may utilize an Integrated Sensor Processor (ISP) that performs hardware-based user detection techniques. In some examples, various software techniques may additionally, or alternatively be performed. In either instance, a bounding box may be output around the detected hand of the user 704 for an image depicting at least a portion of the user 704 and represented by the image data 744. Further, the palm-feature generation component 806 may perform hand-pose estimation in order to align the palm of the user 704 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 704. Once the hand of the user 704 has been aligned, the palm-feature generation component 806 may extract features (e.g., palm-feature data) from the image data 744. In some examples, the trained model(s) may utilize a triples loss function which converts image data 744 into a feature embedding in a metric space (e.g., palm-feature data), which may allow for comparisons with subsequent feature vectors using, for example, squared distance calculation.

At "6," the palm-feature aggregation component 810 may aggregate feature data (e.g., palm-feature data) from various image data 744. For instance, the image data 744 may represent the hand of the user 704 at different angles, under different lighting conditions, or other differing characteristics. The palm-feature aggregation component 810 may aggregate the palm-feature data together, such as by averaging out feature vectors.

At "7," the quality-check component 812 may perform a quality check on the palm-feature data. For example, the quality-check component 812 may utilize trained model(s) to determine an overall metric of the quality of the extracted palm-feature data. If the overall metric is poor, or below a threshold quality level, the user-recognition system may request to acquire additional image data 744. In addition, or in the alternative, the quality-check component 812 may perform a de-duping process to ensure that the user associated with the palm-feature data hasn't already enrolled in the system. If the overall quality metric is good or acceptable, and if the de-duping process does not reveal that the user has previously enrolled in the system, a backend enrollment component 814 may aggregate the data at "8."

For example, at "8" the backend enrollment component 814 may aggregate the palm-feature data and enroll the user at "9" in an enrollment database 816. The backend enrollment component 814 may store associations (e.g., mappings) between the palm-feature data with a user profile of the user 704 requesting to be enrolled for use of the user-recognition system.

Figure 9:
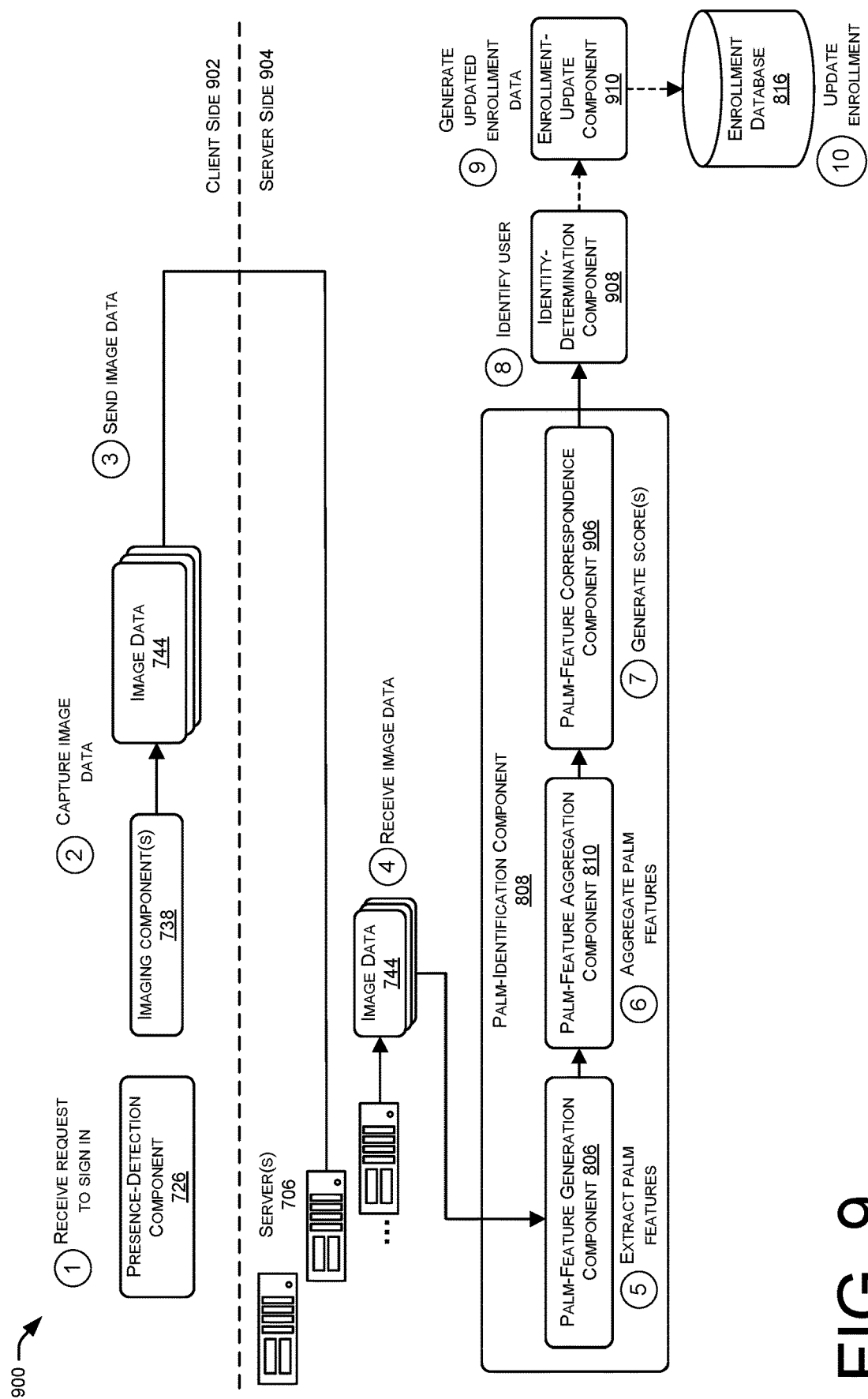
FIG. 9 illustrates an example environment including a block diagram of one or more servers configured to support at least a portion of the functionality of a user-recognition system, as well as an example flow of data within the system for identifying a user of the user-recognition system and, potentially, updating the enrollment of the user.

FIG. 9 illustrates an example environment 900 including a block diagram of the server(s) 706 configured to support at least a portion of the functionality of a user-recognition system, as well as an example flow of data within the system for identifying a user 704 of the user-recognition system and, potentially, updating the enrollment of the user. As illustrated, the environment 900 includes a client side 902 and a server side 904. However, this is merely illustrative, and some or all of the techniques may be performed entirely on the client side 902, or entirely on the server side 904.

At "1," a user requests to sign in with the user-recognition system. For example, the presence-detection component 726 may be executable by the processor(s) 720 to detect a trigger indicating presence of the user 704. The trigger detected by the presence-detection component 726 may comprise one or more types of input. For instance, the presence-detection component 726 may include logic to detect, using one or more imaging components 738, a portion of a user 704 (e.g., a hand over the imaging component(s) 738 of the electronic device 104). Other examples of triggers detected by the presence-detection component 726 that may indicate the presence of the user 704 may include receiving touch input (or other input, such as a mouse click) via one or more I/O interfaces 734 of the electronic device 104. However, any type of input may be detected as a trigger by the presence-detection component 726.

Upon identifying the request to sign in from the user, at "2" one or more imaging components 738 may generate image data 744 representing a palm of the user 704 and/or another portion of the user. At "3," the electronic device 104 may send the image data 744 to the server(s) 706. For instance, the electronic device 104 may encode and send the image data 744 over the network(s) 746 to the server(s) 706. Again, some of the image data 744 may be discarded based on the image data being out of focus, having a discriminability that is less than the threshold, and/or the like.

At "4," the servers may receive the image data 744 and, at "5", the palm-feature generation component 806 may extract palm-feature data from the image data 744. In some examples, prior to extracting the palm-feature data, the palm-feature generation component 806 may perform various operations for processing the image data 744 prior to extracting the palm-feature data. For instance, the palm-feature generation component 806 may initially perform palm detection to determine that the image data 744 represents a hand of a user 704. For instance, the palm-feature generation component 806 may utilize an Integrated Sensor Processor (ISP) that performs hardware-based user detection techniques. In some examples, various software techniques may additionally, or alternatively be performed. In either instance, a bounding box may be output around the detected hand of the user 704 for an image depicting the user 704 and represented by the image data 744. Further, the palm-feature generation component 806 may perform hand pose estimation to align the face of the user 704 with a common coordinate system. In some examples, hand pose estimation may improve the extraction of features representing the hand of the user 704. Once the hand of the user 704 has been aligned, the palm-feature generation component 806 may extract features (e.g., palm-feature data) from the image data 744. In some examples, the trained model(s) may utilize a triples loss function which converts the image data 744 into a feature embedding in a metric space (e.g., palm-feature data), which may allow for comparisons with subsequent feature vectors using, for example, squared distance calculation.

At "6," the palm-feature aggregation component 810 may aggregate feature data (e.g., palm-feature data) from various image data 744. For instance, the image data 744 may represent the hand of the user 704 at different angles, under different lighting conditions, or other differing characteristics. The palm-feature aggregation component 810 may aggregate the palm-feature data together, such as by averaging out feature vectors.

At "7," a palm-feature correspondence component 906 may generate one or more scores indicating a similarity between the aggregated features associated with the image data 744 and respective feature data stored in association with respective user profiles. In some examples, these correspondence scores may be determined, at least in part, on "distances" between the feature vector associated with the image data and respective feature vectors of the respective palm-feature data stored in association with user profiles in the enrollment database 816.

At "8," an identity-determination component 908 may determine the identity of the user based on the correspondence scores. For example, the identity-determination component 908 may identity the user profile associated with the feature vector having the closest distance to the feature vector associated with the image data 744 and may deem the associated user the user associated with the image data 744.

At "9", in some instances the enrollment-update component 910 may use the recently received palm-feature data associated with the image data to update the enrollment of the identified user. For example, the enrollment-update component 910 may detect occurrence of a predefined event that results in the updating of the enrollment data. This may include a predefined amount of time having elapsed since the most-recent or least-recent feature data being associated with the profile, based on a characteristic of the transaction occurring at the facility in association with the image data 744 (e.g., a cost or number of items), based on a threshold amount of change between the current feature data and previous feature data associated with the user profile, based on an explicit request from the user associated with the user profiled, and/or the like. In some instances, the predefined event may comprise an audit component determining that the received palm-feature data corresponds to the identified user with a confidence level that is greater than the previously discussed high threshold confidence level. That is, while the recognition process described with reference to steps "7"-"8" may be performed with reference to enrollment data, the audit component may determine a confidence level using both the enrollment data and image and/or feature data associate with previous recognition attempts. If the audit component thereafter computes a confidence level that is greater than the relatively high confidence level, then the enrollment-update component 910 may determine to update the enrollment data of the identified user.

At "10", the enrollment-update component 910 updates the enrollment data associated with the corresponding user profile in the enrollment database 816. As described above, this may include storing the feature data and/or image data alongside existing feature data and/or image data associated with the profile, averaging the existing feature data with the new feature data, and/or the like.

Figure 10:
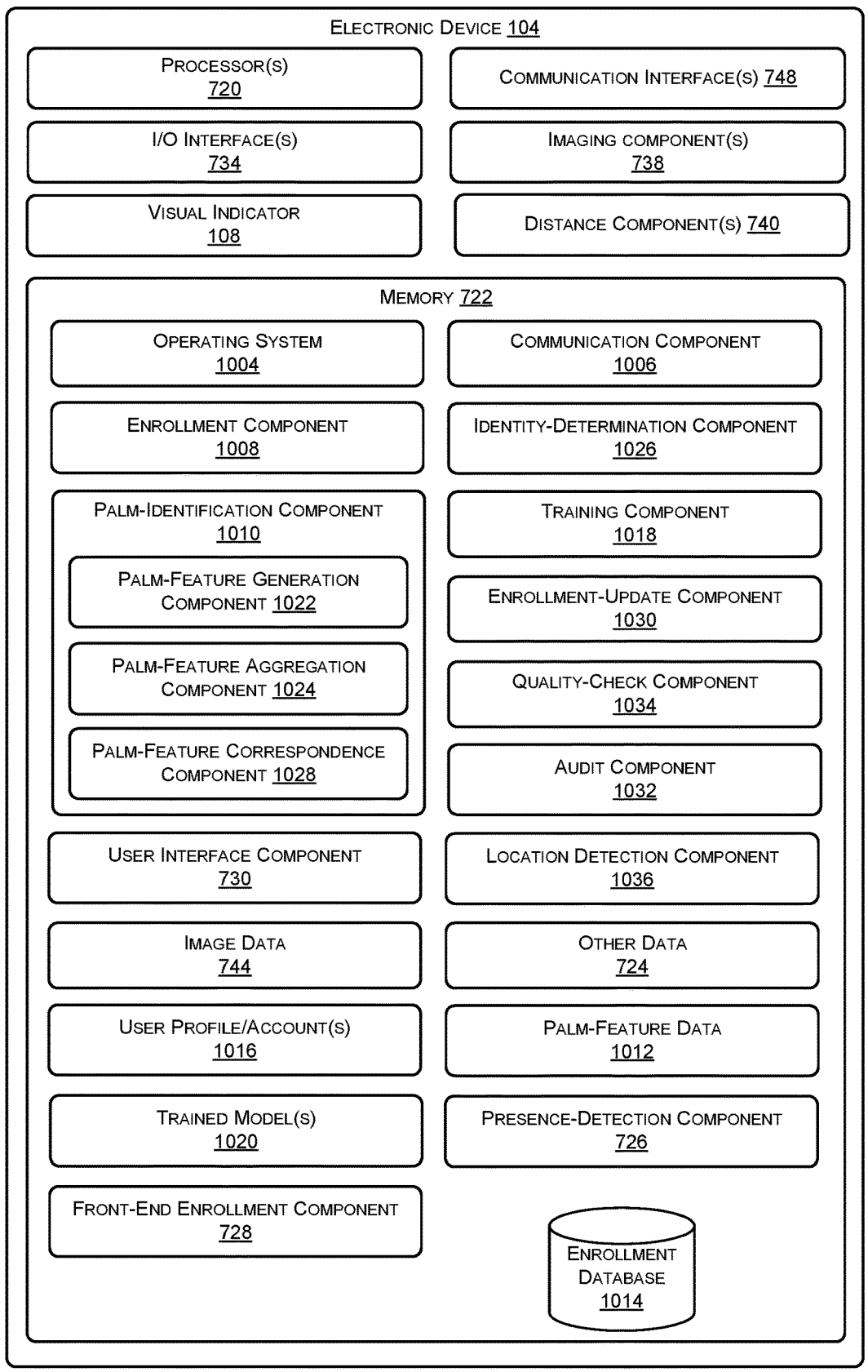
FIG. 10 illustrates example components of an electronic device configured to support at least a portion of the functionality of a user-recognition system.

FIG. 10 illustrates example components of the electronic device 104 configured to support at least a portion of the functionality of a user-recognition system. In some examples, the user-recognition system described herein may be supported entirely, or at least partially, by the electronic device 104 in conjunction with the server(s) 706. The electronic device 104 may include one or more hardware processors 720 (processors) configured to execute one or more stored instructions. The processor(s) 720 may comprise one or more cores. The electronic device 104 may include one or more input/output (I/O) interface(s) 734 to allow the processor 720 or other portions of the electronic device 104 to communicate with other devices. The I/O interface(s) 734 may comprise Inter-Integrated Circuit (I2C), Serial Peripheral Interface bus (SPI), Universal Serial Bus (USB) as promulgated by the USB Implementers Forum, RS-232, and so forth.

The electronic device 104 may also include one or more communication interfaces 748. The communication interface(s) 748 are configured to provide communications between the electronic device 104 and other devices, such as the server(s) 706, the interface devices, routers, and so forth. The communication interface(s) 748 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The electronic device 104 may further include one or more distance components 740. The distance component(s) 740 may include, but are not limited to, IR sensor(s), LIDAR sensor(s), and/or any other type of sensor that may detect a distance of an object.

The electronic device 104 may also include one or more busses or other internal communications hardware or software that allow for the transfer of data between the various modules and components of the electronic device 104.

As shown in FIG. 10, the electronic device 104 includes one or more memories 722. The memory 722 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 722 provides storage of computer-readable instructions, data structures, program modules, and other data for the operation of the electronic device 104. A few example functional modules are shown stored in the memory 722, although the same functionality may alternatively be implemented in hardware, firmware, or as a system on a chip (SOC).

The memory 722 may include at least one operating system (OS) 1004. The OS 1004 is configured to manage hardware resource devices such as the I/O interface(s) 734, the imaging sensor(s) 714, the visual indicator 108, and the distance component(s) 740, and provide various services to applications or modules executing on the processor(s) 720. The OS 1004 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 722. These modules may be executed as foreground applications, background tasks, daemons, and so forth.

A communication component 1006 may be configured to establish communications with the server(s) 706 and/or or other devices. The communications may be authenticated, encrypted, and so forth.

An enrollment component 1008 may be configured to perform various operations for enrolling a user for use of the user-recognition system (e.g., similar to the backend enrollment component 814). For instance, the enrollment component 1008 may perform various operations, and/or cause other components to perform various operations, to enroll users in the user-recognition system. In some instance, the enrollment component 1008 may at least partly control a palm-identification component 1010 that performs operations for analyzing image data 744 depicting a palm or other portion of the user. In some examples, the enrollment component 1008 may cause the palm-identification component 1010 to analyze the image data 744 and extract features which represent a palm of the user, such as palm-feature data 1012.

After obtaining, determining, and/or generating the palm-feature data 1012, the enrollment component 1008 may enroll the user in an enrollment database 1014 which indicates that the user is enrolled for use of the user-recognition system. In some examples, the enrollment component 1008 may associate, or map, the various data to a user profile/account 1016 that is associated with the user. For example, the enrollment component 1008 may map, for each enrolled user, respective palm-feature data 1012 to corresponding user profiles 1016 in the enrollment database 1014. Thus, the enrollment database 1014 may store indications of user profiles 1016, as well as the data for users associated with each of the user profiles 1016. When a user is enrolled for use of the user-recognition system, the enrollment component 1008 may map, or store an association, between the user's palm-feature data 1012 with the user profile 1016 for that user.

Further, the enrollment component 1008 may cause a training component 1018 to train one or more trained models 1020. The training component 1018 may utilize the palm-feature data 1012 to train the trained model(s) 1020 to perform various operations for extracting and/or generating, from the image data 744, the palm-feature data 1012. The trained model(s) 1020 may comprise any type of model, such as machine-learning models, including but not limited to artificial neural networks, classifiers, decision trees, support vector machines, Bayesian networks, and so forth.

As a specific example, the trained model(s) 1020 may include or comprise one or more convolution neural networks (CNNs), recursive neural networks, and/or any other artificial networks, that are trained to analyze image data 744 received as input, and extract, determine, identify, generate, etc., palm-feature data 1012 representing a palm of the user. As a specific example, the palm-feature data 1012 may comprise a 128-dimension feature vector representing the palm of the user. In examples where the trained model(s) 1020 include one or more CNNs, various functions may be utilized to transform the image data 744 into a metric space, such as a triplet loss function. Thus, the training component 1018 may train the CNNs of the trained model(s) 1020 using various functions, such as a triplet loss function, to extract, identify, or otherwise determine palm-feature data 1012 from input image data 744. Once in the metric space, extracted feature data may be compared, or matched, by computing a distance between the extracted feature data and feature data stored in the enrollment database 1014. For instance, when feature data is extracted from the image data 744 into palm-feature data 1012 by the trained model(s) 1020, the extracted palm-feature data 1012 may then be compared to stored data in the enrollment database 1014 to identify a user profile for the user represented in the input image data 744. For instance, the extracted palm-feature data 1012 may comprise a vector that is compared with stored vectors in the enrollment database 1014 to identify which stored vectors have the smallest "distance" between the extracted feature data. The smaller the distance, the closer the strength of correspondence between the extracted feature data and the stored feature data representing users that are enrolled for use of the user-recognition system. In some examples, other calculations may be performed, such as finding a cosine of an angle between two vectors, depending on the network utilized by the trained model(s) 1020. However, any type of models may be utilized for the trained model(s) 1020.

The palm-identification component 1010 may include various sub-components for performing various operations. For instance, the palm-identification component 1010 may include a palm-feature generation component 1022 to extract or otherwise generate feature data from the image data 744 (e.g., similar to the palm-feature generation component 806). The palm-feature generation component 1010 may utilize the trained model(s) 1020, and/or include algorithms, to perform any type of feature extraction method, or embedding, to analyze the image data 744 and extract the palm-feature data 1012. For instance, the palm-feature generation component 1022 may utilize state-of-the-art models, such as clustering, artificial neural networks, scale-invariant feature transform, edge detection, or any other type of extraction or embedding technology, to extract palm-feature data 1012 from the image data 744.

The palm-identification component 1010 may further include a palm-feature aggregation component 1024 configured to aggregate feature data for a user (e.g., similar to the palm-feature aggregation component 810). For instance, the palm-feature aggregation component 1024 may combine palm-feature data 1012 that has been extracted from a group of images depicting the user, such as by averaging the features in the palm-feature data 1012.

Once a user is enrolled for use of the user-recognition system, an identity-determination component 1026 may be utilized to determine and/or verify an identity of a user that interacted with the electronic device 104. For example, the electronic device 104 may use the image data 744 and the identity-determination component 1026 (which may be similar to the identity-determination component 908) to determine an identity of the user, where the enrollment database 1014 indicates the identity of the user by, for example, indicating the user profile 1016 that is associated with that user's identity.

The identity-determination component 1026 may cause a palm-feature correspondence component 1028 to perform various operations for determining or identifying a user whose palm is depicted in the received image data 744. For example, the palm-feature correspondence component 1028 may compare the palm-feature data 1012 for the received image data 744 with palm-feature data 1012 stored in the enrollment database 1014 for different user profiles 1016 of users enrolled in the user-recognition system in order to determine user profiles 1016 for one or more users whose respective palm-feature data 1012 correspond to the extracted palm-feature data 1012. In some instances, the score calculated by the palm-feature correspondence component 1028 may be compared to a threshold and, if the score is greater than the threshold, may result in identification of the user. If multiple user profiles are associated with scores that are greater than the threshold, then the user profile associated with the highest may be deemed to be associated with the image data 744 and/or further analysis may be performed to identify the appropriate user. Further, in some instances, the user-recognition system may employ set-reduction techniques to identify, based on an initial comparison, a top "N" group of user profiles 1016 of users whose respective palm-feature data 1012 most strongly correspond to the extracted palm-feature data 1012. In some examples, a single user profile 1016 may be determined as corresponding to the input palm-feature data 1012. However, in some examples, a group of top "N" candidates may be identified by the trained model(s) 1020 as corresponding with a threshold amount of strength (e.g., 50% correspondence, 105% correspondence, etc.) to the extracted palm-feature data 1012. A second level of deeper analysis may then be performed to identify a single user from the "N" candidates.

Further, the memory 722 may store an enrollment-update component 1030 configured to update the palm-feature data 1012 stored in association with user profiles to allow for removal of stale feature data and use of more recent feature data (e.g., similar to the enrollment-update component 910). As introduced above, as a user provides image data of the user's palm over time, the enrollment-update component 1030 may use feature data from this new image data to generate and store additional feature data associated with the user. Further, the enrollment-update component 1030 may remove or lessen a weight associated with older feature data.

In addition, the memory 722 may store an audit component 1032 configured to perform one or more auditing processes in response to occurrence of one or more predefined events. For example, the audit component 1032 may perform a nightly auditing processes comprising rich comparison of palm-feature data associated with respective user profiles to one another to identify any errors previously made by the system. After identifying an error, the system may correct the error and may also this information to further train the trained model(s) 1020 utilizing techniques similar to those performed by the enrollment component 1008.

Additionally, the memory 722 may store a quality-check component 1034 which determines an overall metric of the quality of the extracted palm-feature data 1012. For instance, the quality-check component 1034 may determine that additional image data 744 needs to be obtained for a user for various reasons.

The memory 722 may also store a location detection component 1036 configured to determine the location of the hand with respect to the electronic device 104 (and/or the imaging component of the electronic device 104). For instance, and as described herein, the location detection component 1036 may determine one or more points located on the hand. The location detection component 1036 may then use the one or more points to identify the center of the palm of the hand with respect to the electronic device 104. In some instances, the location detection component 1036 determines the location of the hand at given time intervals. For instance, the location detection component 1036 may determine the location of the user's hand every millisecond, second, and/or the like. In some examples, the location detection component 1036 determines the location of the user's hand using each frame represented by the image data 744, every other frame represented by the image data 744, every fifth frame represented by the image data 744, and/or the like.

The memory 722 may also store the user interface component 730 configured to generate and/or update the user interfaces described herein. For instance, once the hand is detected, the user interface component 730 may cause the visual indicator 108 to output instructions for placing the hand. The user interface component 730 may then use the locations determined by the location detection component 1036 to present and/or update the visual indicator 108 indicating the current location of the hand. Once the location detection component 1036 determines the location of the hand is proximate to the target location, the user interface component 730 may cause the visual indicator 108 to indicate that the electronic device 104 has captured the biometric data.

Figure 11A:
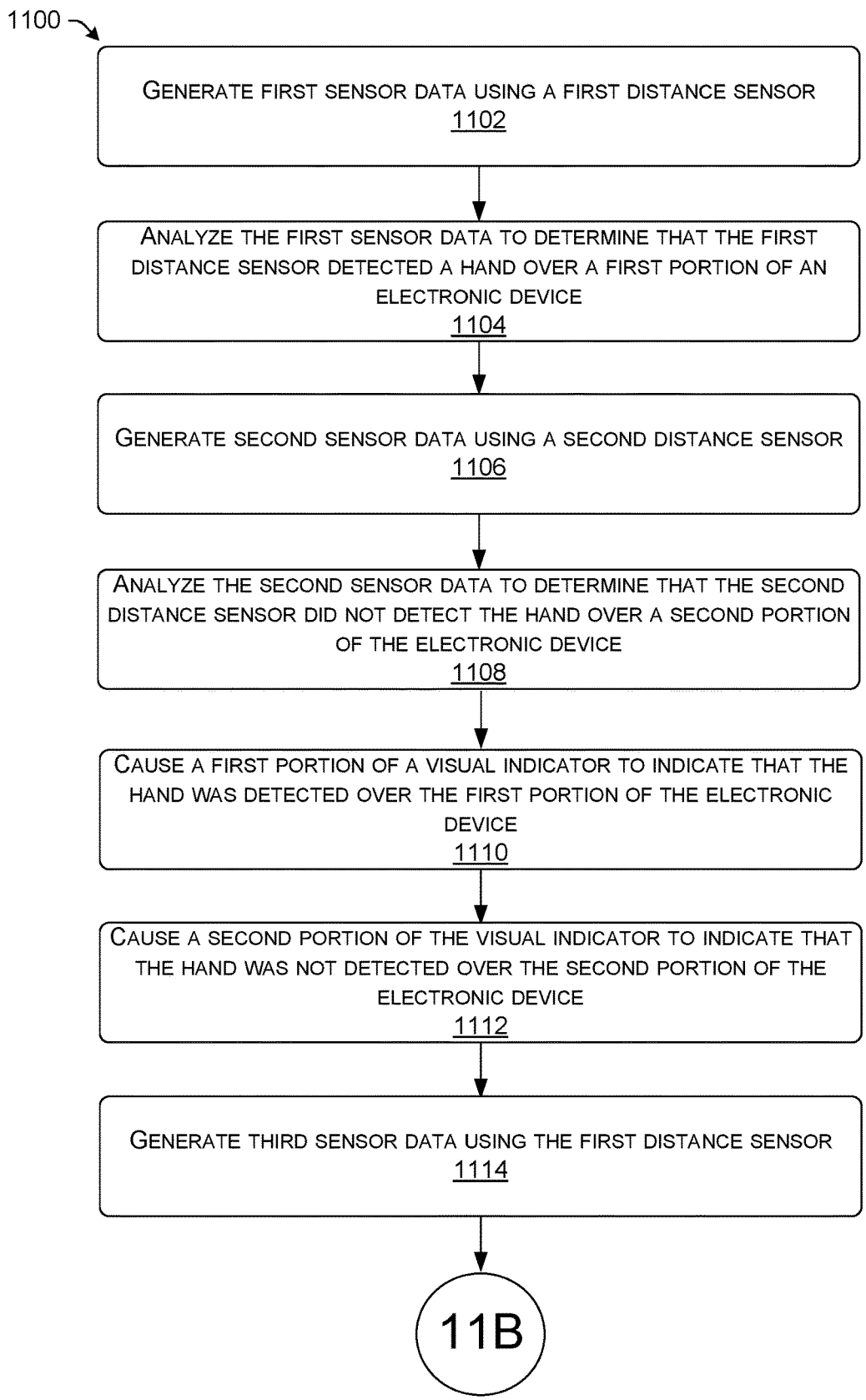
FIGS. 11A-11B collectively illustrate a flow diagram of an example process for providing instructions associated with placing a hand at a target location relative to an electronic device.
Figure 11B:
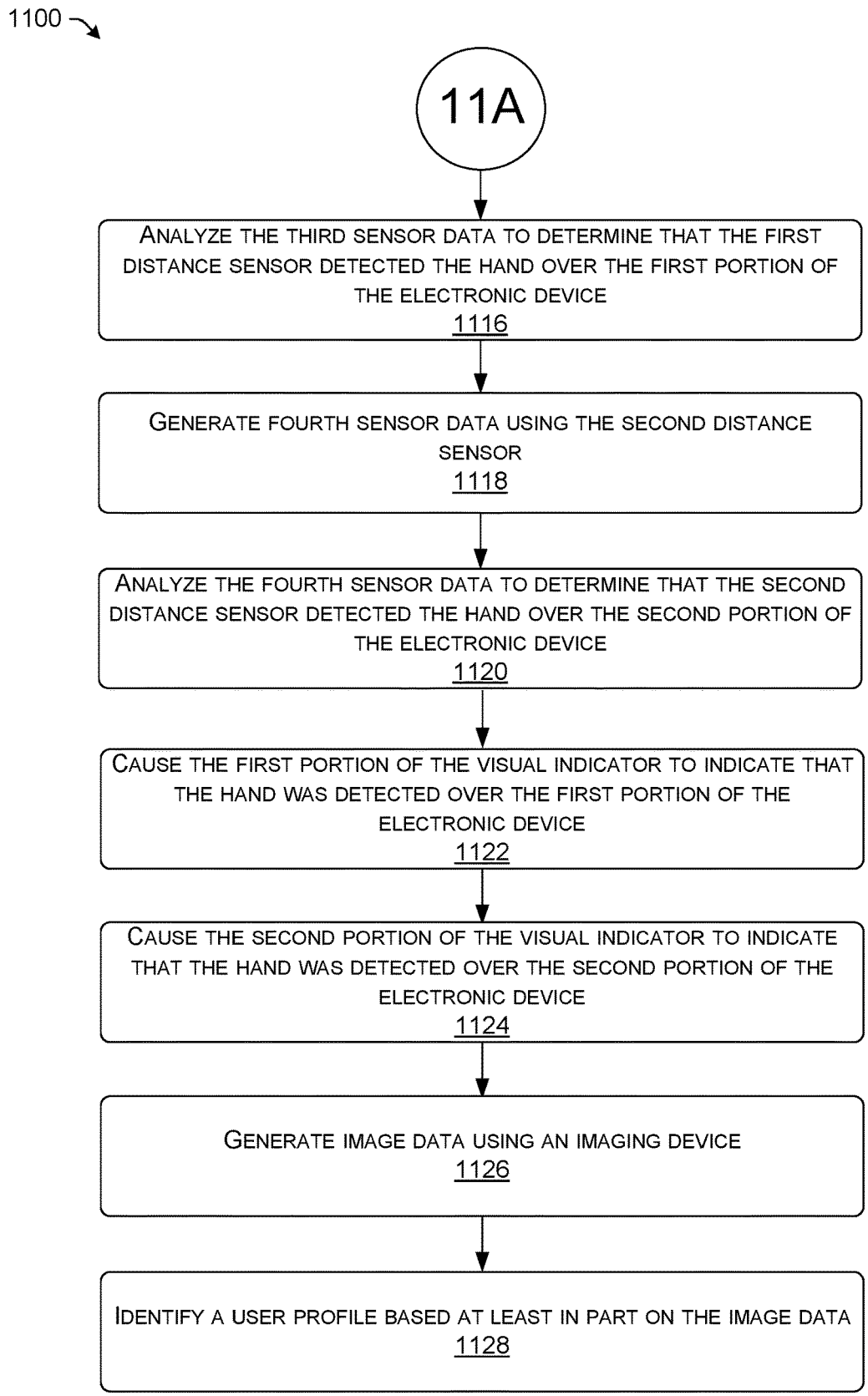
Figure 12:
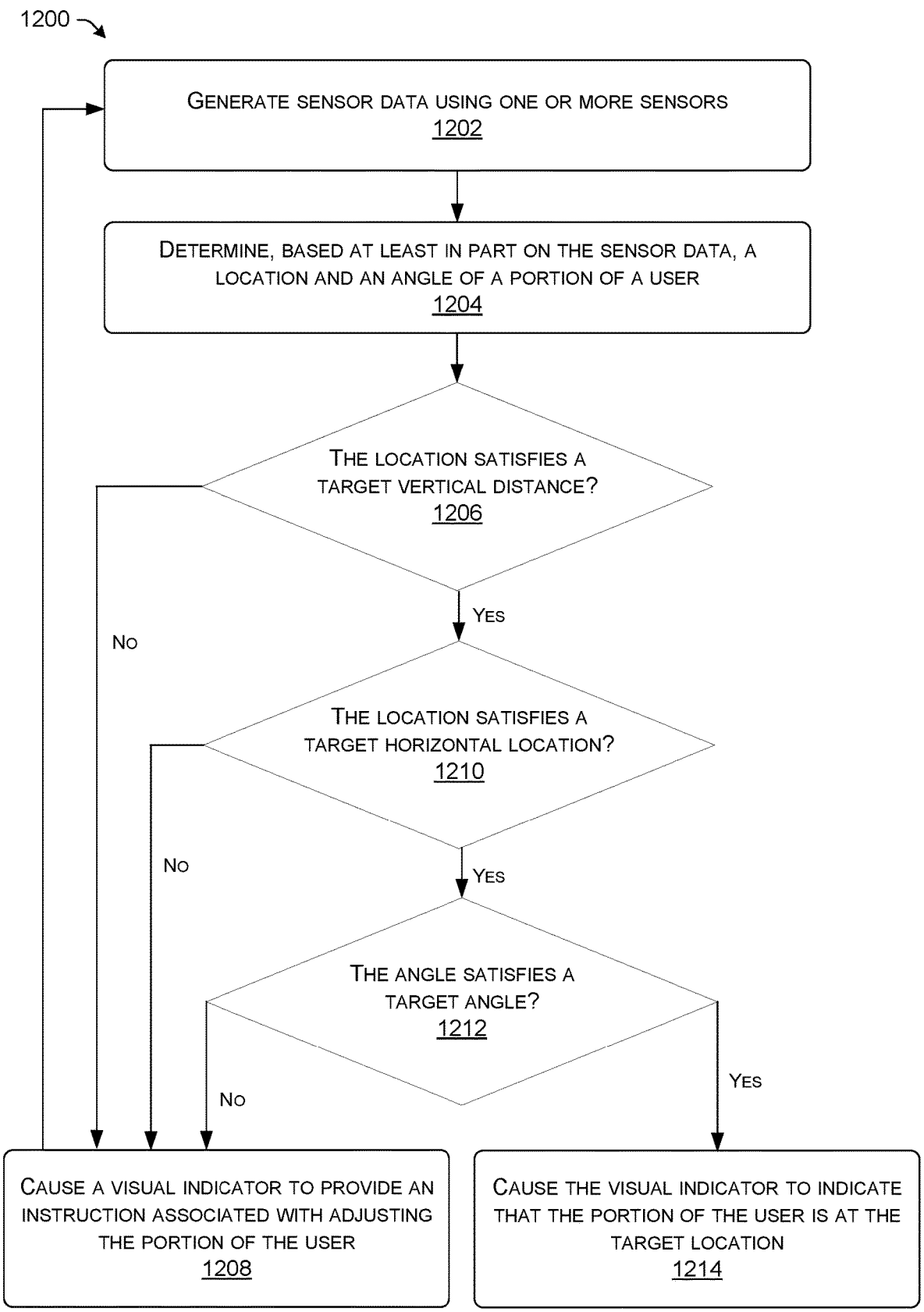
FIG. 12 illustrates a flow diagram of an example process for providing instructions associated with placing a portion of a user at a target location relative to an electronic device.

FIGS. 11A-12 illustrate various processes for providing instructions associated with inputting biometric data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 11A-11B illustrate a flow diagram of an example process 1100 for providing instructions associated with placing a hand at a target location relative to the electronic device 104. At 1102, the process 1100 may include generating first sensor data using a first distance sensor and at 1104, the process 1100 may include analyzing the first sensor data to determine that the first distance sensor detected a hand over a first portion of an electronic device. For instance, the electronic device 104 may generate the first sensor data using the first distance sensor. The first distance sensor may be associated with the first portion of the electronic device. The electronic device 104 may then analyze the first sensor data to determine that the first distance sensor detected the hand. As such, the electronic device 104 may determine that the hand is located over the first portion of the electronic device.

At 1106, the process 1100 may include generating second sensor data using a second distance sensor and at 1108, the process 1100 may include analyzing the second sensor data to determine that the second distance sensor did not detect the hand over a second portion of the electronic device. For instance, the electronic device 104 may generate the second sensor data using the second distance sensor. The second distance sensor may be associated with the second portion of the electronic device. The electronic device 104 may then analyze the second sensor data to determine that the second distance sensor did not the hand. As such, the electronic device 104 may determine that the hand is not located over the second portion of the electronic device.

At 1110, the process 1100 may include causing a first portion of a visual indicator to indicate that the hand was detected over the first portion of the electronic device. For instance, based on the first distance sensor detecting the hand, the electronic device 104 may cause, at a first time, the first portion of the visual indicator to output a first indication that the hand was detected over the first portion of the electronic device 104. The first portion of the visual indicator may be associated with the first distance sensor such that the first portion of the visual indicator provides indications when hands are detected by the first distance sensor. In some instances, such as when the visual indicator includes light emitters (e.g., a light ring), the first indication includes emitting light using one or more of the light emitters located at the first portion of the visual indicator. In some instances, such as when the visual indicator includes a display, the first visual indication includes causing the first portion of the display to present the first indication.

At 1112, the process 1100 may include causing a second portion of the visual indicator to indicate that the hand was not detected over the second portion of the electronic device. For instance, based on the second distance sensor not detecting the hand, the electronic device 104 may cause, at the first time, the second portion of the visual indicator to indicate that the hand was not detected over the second portion of the electronic device 104. The second portion of the visual indicator may be associated with the second distance sensor such that the second portion of the visual indicator provides indications when hands are detected by the second distance sensor. In some instances, such as when the visual indicator includes the light emitters, one or more of the light emitters associated with the second portion of the visual indicator may refrain from emitting light. In some instances, such as when the visual indicator includes the display, the second portion of the display may refrain from presenting content.

At 1114, the process 1100 may include generating third sensor data using the first distance sensor and at 1116, the process 1100 may include analyzing the third sensor data to determine that the first distance sensor detected the hand over the first portion of the electronic device. For instance, the electronic device 104 may generate the third sensor data using the first distance sensor. The electronic device 104 may then analyze the third sensor data to determine that the first distance sensor detected the hand. As such, the electronic device 104 may determine that the hand is still located over the first portion of the electronic device.

At 1118, the process 1100 may include generating fourth sensor data using the second distance sensor and at 1120, the process 1100 may include analyzing the fourth sensor data to determine that the second distance sensor detected the hand over the second portion of the electronic device. For instance, the electronic device 104 may generate the fourth sensor data using the second distance sensor. The electronic device 104 may then analyze the fourth sensor data to determine that the second distance sensor detected the hand. As such, the electronic device 104 may determine that the hand is located over the second portion of the electronic device.

At 1122, the process 1100 may include causing the first portion of the visual indicator to indicate that the hand was detected over the first portion of the electronic device. For instance, based on the first distance sensor again detecting the hand, the electronic device 104 may cause, at a second time, the first portion of the visual indicator to output a second indication that the hand was detected over the first portion of the electronic device 104. In some instances, such as when the visual indicator includes the light emitters, the second indication includes emitting light using one or more of the light emitters located at the first portion of the visual indicator. In some instances, such as when the visual indicator includes the display, the second visual indication includes causing the first portion of the display to present second indication.

At 1124, the process 1100 may include causing the second portion of the visual indicator to indicate that the hand was detected over the second portion of the electronic device. For instance, based on the second distance sensor detecting the hand, the electronic device 104 may cause, at the second time, the second portion of the visual indicator to output a third indication that the hand was detected over the second portion of the electronic device 104. In some instances, such as when the visual indicator includes the light emitters, the third indication includes emitting light using one or more of the light emitters located at the second portion of the visual indicator. In some instances, such as when the visual indicator includes the display, the third visual indication includes causing the second portion of the display to present third indication.

At 1126, the process 1100 may include generating image data using an imaging device and at 1128, the process 1100 may include identifying an account based at least in part on the image data. For instance, once the hand is at the target location relative to the electronic device 104 (e.g., the first distance sensor and the second distance sensor detect the hand), the electronic device 104 may generate the image data. The electronic device 104 may then analyze the image data to identify the account. For example, the electronic device 104 may analyze feature data corresponding to the image data with reference to feature data stored in association with the user profile. Based on the analysis, the electronic device 104 may identify a match between the feature data corresponding to the image data and the feature data associated with the user profile. The electronic device 104 may use the match to identify the user profile.

FIG. 12 illustrates a flow diagram of an example process 1200 for providing instructions associated with placing a portion of a user at a target location relative to the electronic device 104. At 1202, the process 1200 may include generating sensor data using one or more sensors and at 1204, the process 1200 may include determining, based at least in part on the sensor data, a location and an angle of a portion of a user. For instance, the electronic device 104 may generate the sensor data using one or more distance sensors and/or one or more imaging devices. The electronic device 104 may then analyze the sensor data to determine that the portion of the user is located at the location relative to the electronic device 104. In some instances, such as when the sensor data is generated using the one or more distance sensors, the electronic device 104 may determine the location based on which distance sensor(s) detected the portion of the user. In some instances, such as when the sensor data is generated using the one or more imaging devices, the electronic device 104 may determine the location based on analyzing features represented by the sensor data.

The electronic device 104 may also analyze the sensor data to determine the angle associated with the portion of the user. In some instances, such as when the sensor data is generated by the one or more distance sensors, the electronic device 104 may determine the angle based on detected distances from the distance sensors to the portion of the user. In some instances, such as when the sensor data is generated by the one or more imaging devices, the electronic device 104 may determine the angle based on analyzing features represented by the sensor data.

At 1206, the process 1200 may include determining if the location satisfies a target vertical distance. For instance, the electronic device 104 may determine if the location of the portion of the user satisfies the target vertical distance. In some instances, the electronic device 104 may determine that the location satisfies the target vertical distance when the location is within a range associated with the target vertical distance and determine that the location does not satisfy the target vertical distance when the location is outside of (e.g., greater than or less than) the range associated with the target vertical distance.

If, at 1206, it is determined that the location does not satisfy the target vertical distance, then at 1208, the process 1200 may include causing a visual indicator to provide an instruction associated with adjusting the portion of the user. For instance, if the electronic device 104 determines that the location does not satisfy the target vertical distance, then the electronic device 104 may provide the instruction that the portion of the user is either too low or too high. In some instances, such as when the visual indicator includes a plurality of light emitters (e.g., a light ring), the visual indicator may provide the instruction by emitting a color of light, emitting a light pattern, and/or emitting a brightness of light. In some instances, such as when the visual indicator includes a display, the visual indicator may provide the instruction by displaying content on the display.

However, if, at 1206, it is determined that the location satisfies the target vertical distance, then at 1210, the process 1200 may include determining if the location satisfies a target horizontal location. For instance, the electronic device 104 may determine if the location of the portion of the user satisfies the target horizontal location. In some instances, the electronic device 104 may determine that the location satisfies the target horizontal location when the location is within a first range associated with the x-direction and a second range associated with the y-direction. Additionally, the electronic device 104 may determine that the location does not satisfy the target horizontal location when the location is outside of the first range associated with the x-direction or the second range associated with the y-direction.

If, at 1210, it is determined that the location does not satisfy the target horizontal location, then at 1208, the process 1200 may again include causing the visual indicator to provide an instruction associated with adjusting the portion of the user. For instance, if the electronic device 104 determines that the location does not satisfy the target horizontal location, then the electronic device 104 may provide the instruction that the portion of the user is either too far left, too far forward, too far right, and/or too far backward. In some instances, such as when the visual indicator includes the plurality of light emitters, the visual indicator may provide the instruction by emitting light using a portion of the light emitters that is associated with the location of the portion of the user. In some instances, such as when the visual indicator includes the display, the visual indicator may provide the instruction by displaying content using a portion of the display that is associated with the location of the portion of the user.

However, if, at 1210, it is determined that the location satisfies the target horizontal location, then at 1212, the process 1200 may include determining if the angle satisfies a target angle. For instance, the electronic device 104 may determine if the angle of the portion of the user satisfies the target angle. In some instances, the electronic device 104 may determine that the angle satisfies the target angle when the angle is within a range associated with the target angle.

Additionally, the electronic device 104 may determine that the angle does not satisfy the target angle when the angle is outside of the target angle.

If, at 1212, it is determined that the angle does not satisfy the target angle, then at 1208, the process 1200 may again include causing the visual indicator to provide an instruction associated with adjusting the portion of the user. For instance, if the electronic device 104 determines that the angle does not satisfy the target angle, then the electronic device 104 may provide the instruction that the portion of the user is too far angled. In some instances, such as when the visual indicator includes the plurality of light emitters, the visual indicator may provide the instruction by emitting a first color of light, a first light pattern, and/or a first brightness of light using a first portion of the light emitters and emitting a second color of light, a second light pattern, and/or a second brightness of light using a second portion of the light emitters. In some instances, such as when the visual indicator includes the display, the visual indicator may provide the instruction by displaying first content using a first portion of the display and second content using a second portion of the display.

However, if, at 1212, it is determined that the angle satisfies the target angle, then at 1214, the process may include causing the visual indicator to indicate that the portion of the user is at the target location. For instance, if the electronic device 104 determines that the angle satisfies the target angle, then the electronic device 104 may indicate that the location of the portion of the user is at the target location. In some instances, such as when the visual indicator includes the plurality of light emitters, the visual indicator may provide the indication by emitting a color of light, a light pattern, and/or a brightness of light using the light emitters. In some instances, such as when the visual indicator includes the display, the visual indicator may provide the indication by displaying content.

It should be noted that, as illustrated in FIG. 12, the process may repeat back at 1202 after providing the instruction at 1208. It should also be noted that, in some instances, the order to 1206, 1210, and/or 1212 may be switched and/or the process 1200 may not include one or more of 1206, 1210, or 1212.

Figure 13:
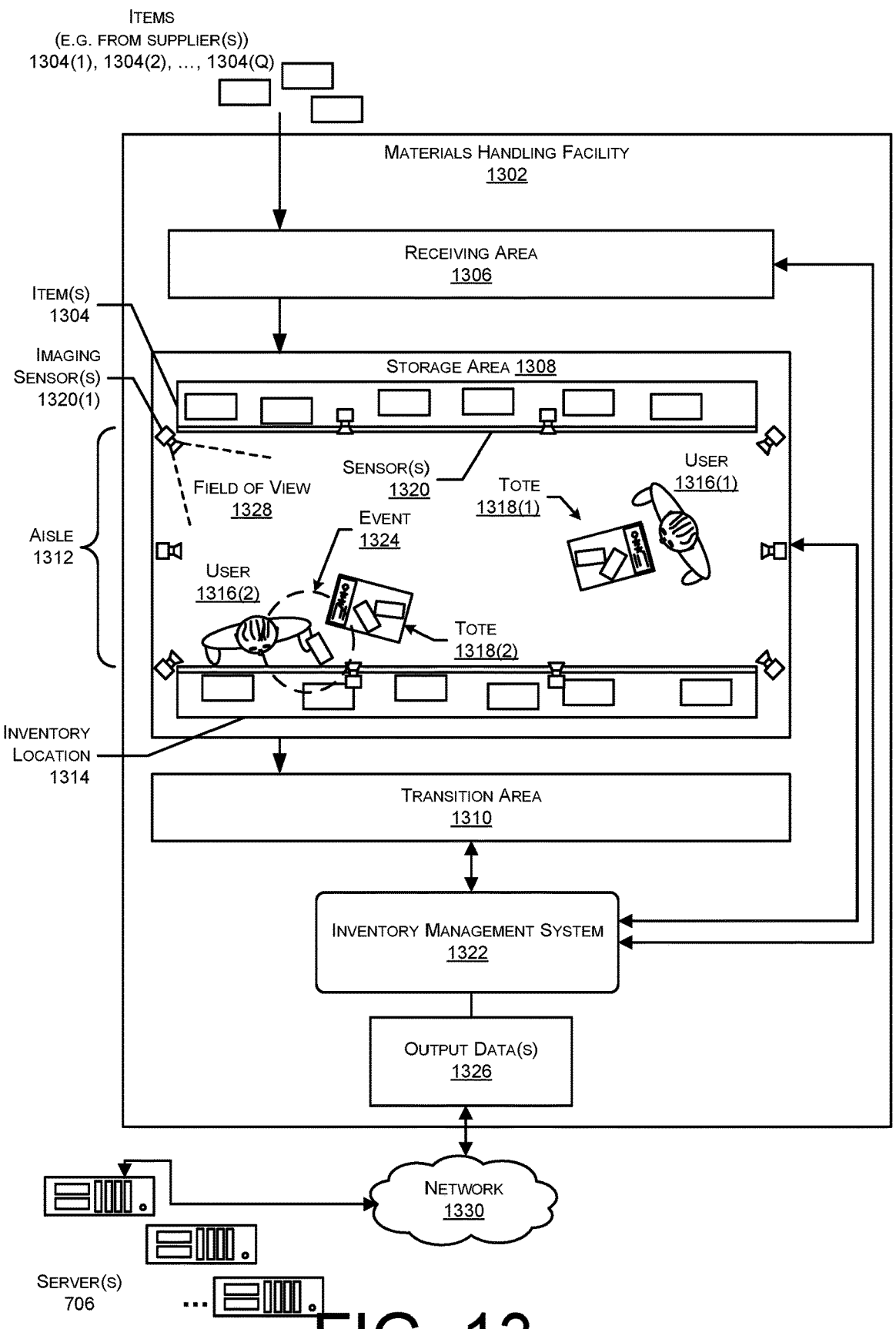
FIG. 13 is a block diagram of an example materials handling facility that includes sensors and an inventory management system configured to generate output regarding events occurring in the facility using the sensor data.
Figure 14:
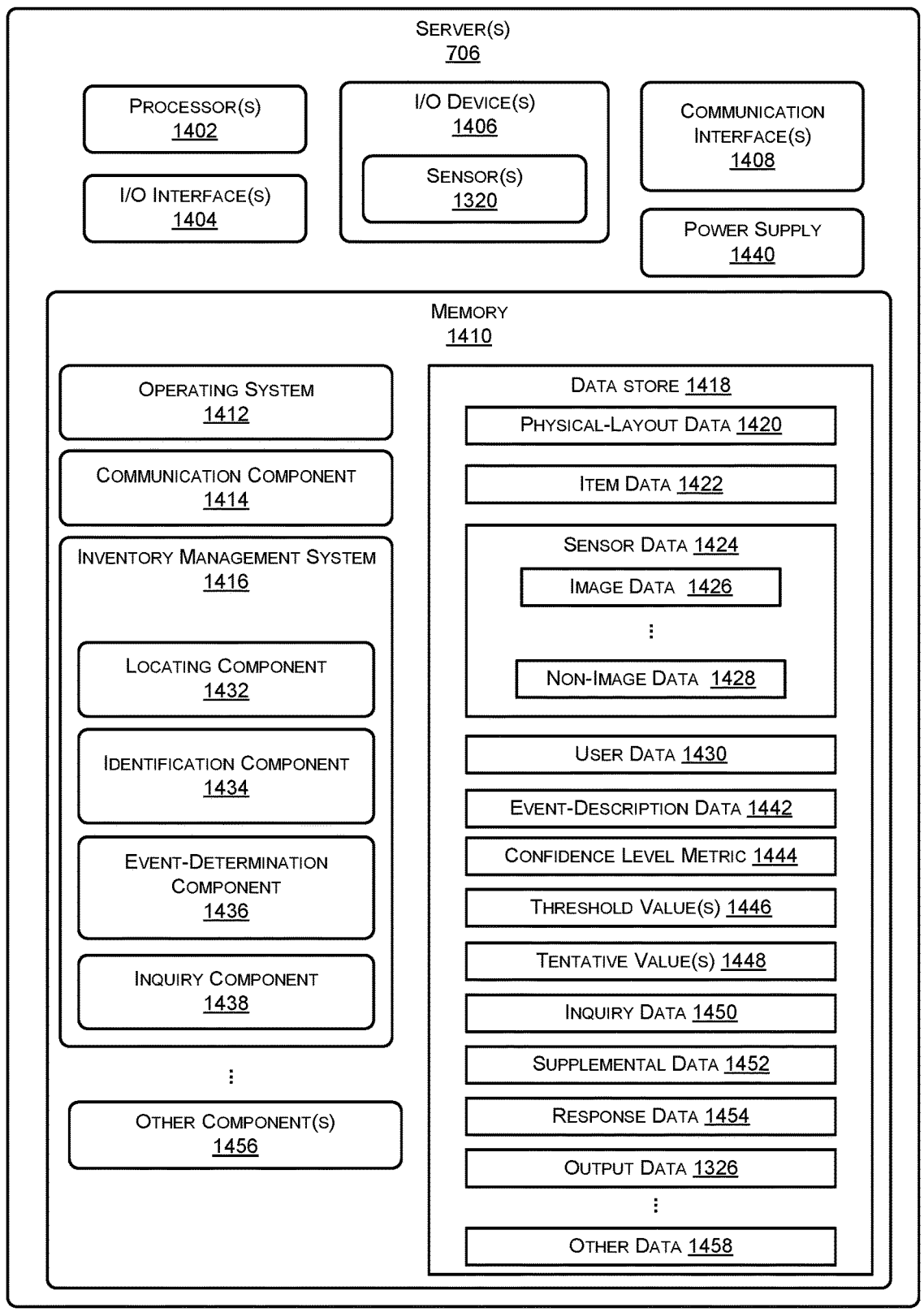
FIG. 14 illustrates a block diagram of one or more servers configured to support operation of the facility.

FIGS. 13 and 14 represent an illustrative materials handling environment, such as the materials handling facility 602, in which the techniques described herein may be applied to cameras monitoring the environments as described below. However, the following description is merely one illustrative example of an industry and environment in which the techniques described herein may be utilized.

An implementation of a materials handling facility 1302 (e.g., facility 1302) configured to store and manage inventory items is illustrated in FIG. 13. A materials handling facility 1302 comprises one or more physical structures or areas within which one or more items 1304(1), 1304(2), . . ., 1304(Q) (generally denoted as 1304) may be held. As used in this disclosure, letters in parenthesis such as "(Q)" indicate an integer result. The items 1304 comprise physical goods, such as books, pharmaceuticals, repair parts, electronic gear, groceries, and so forth.

The facility 1302 may include one or more areas designated for different functions with regard to inventory handling. In this illustration, the facility 1302 includes a receiving area 1306, a storage area 1308, and a transition area 1310. The receiving area 1306 may be configured to accept items 1304, such as from suppliers, for intake into the facility 1302. For example, the receiving area 1306 may include a loading dock at which trucks or other freight conveyances unload the items 1304.

The storage area 1308 is configured to store the items 1304. The storage area 1308 may be arranged in various physical configurations. In one implementation, the storage area 1308 may include one or more aisles 1312. The aisle 1312 may be configured with, or defined by, inventory locations 1314 on one or both sides of the aisle 1312. The inventory locations 1314 may include one or more of shelves, racks, cases, cabinets, bins, floor locations, or other suitable storage mechanisms for holding or storing the items 1304. The inventory locations 1314 may be affixed to the floor or another portion of the facility's structure, or may be movable such that the arrangements of aisles 1312 may be reconfigurable. In some implementations, the inventory locations 1314 may be configured to move independently of an outside operator. For example, the inventory locations 1314 may comprise a rack with a power source and a motor, operable by a computing device to allow the rack to move from one location within the facility 1302 to another.

One or more users 1316(1), 1316(2), . . . , 1316(U) (generally denoted as 1316), totes 1318(1), 1318(2), . . . , 1318(T) (generally denoted as 1318) or other material handling apparatus may move within the facility 1302. For example, the users 1316 may move about within the facility 1302 to pick or place the items 1304 in various inventory locations 1314, placing them on the totes 1318 for ease of transport. An individual tote 1318 is configured to carry or otherwise transport one or more items 1304. For example, a tote 1318 may include a basket, a cart, a bag, and so forth. In other implementations, other agencies such as robots, forklifts, cranes, aerial drones, and so forth, may move about the facility 1302 picking, placing, or otherwise moving the items 1304.

One or more sensors 1320 may be configured to acquire information in the facility 1302. The sensors 1320 in the facility 1302 may include sensors fixed in the environment (e.g., ceiling-mounted cameras) or otherwise, such as sensors in the possession of users (e.g., mobile phones, tablets, etc.). The sensors 1320 may include, but are not limited to, cameras 1320(1), weight sensors, radio frequency (RF) receivers, temperature sensors, humidity sensors, vibration sensors, and so forth. The sensors 1320 may be stationary or mobile, relative to the facility 1302. For example, the inventory locations 1314 may contain cameras 1320(1) configured to acquire images of pick or placement of items 1304 on shelves, of the users 1316(1) and 1316(2) in the facility 1302, and so forth. In another example, the floor of the facility 1302 may include weight sensors configured to determine a weight of the users 1316 or other object thereupon.

During operation of the facility 1302, the sensors 1320 may be configured to provide information suitable for identifying new locations of objects or other occurrences within the facility 1302. For example, a series of images acquired by a camera 1320(1) may indicate removal of an item 1304 from a particular inventory location 1314 by one of the users 1316 and placement of the item 1304 on or at least partially within one of the totes 1318.

While the storage area 1308 is depicted as having one or more aisles 1312, inventory locations 1314 storing the items 1304, sensors 1320, and so forth, it is understood that the receiving area 1306, the transition area 1310, or other areas of the facility 1302 may be similarly equipped. Furthermore, the arrangement of the various areas within the facility 1302 is depicted functionally rather than schematically. For example, multiple different receiving areas 1306, storage areas 1308, and transition areas 1310 may be interspersed rather than segregated in the facility 1302.

The facility 1302 may include, or be coupled to, an inventory management system 1322. The inventory management system 1322 is configured to identify interactions with and between users 1316, devices such as sensors 1320, robots, material handling equipment, computing devices, and so forth, in one or more of the receiving area 1306, the storage area 1308, or the transition area 1310. These interactions may include one or more events 1324. For example, events 1324 may include the entry of the user 1316 to the facility 1302, stocking of items 1304 at an inventory location 1314, picking of an item 1304 from an inventory location 1314, returning of an item 1304 to an inventory location 1314, placement of an item 1304 within a tote 1318, movement of users 1316 relative to one another, gestures by the users 1316, and so forth. Other events 1324 involving users 1316 may include the user 1316 providing authentication information in the facility 1302, using a computing device at the facility 1302 to authenticate identity to the inventory management system 1322, and so forth. Some events 1324 may involve one or more other objects within the facility 1302. For example, the event 1324 may comprise movement within the facility 1302 of an inventory location 1314, such as a counter mounted on wheels. Events 1324 may involve one or more of the sensors 1320. For example, a change in operation of a sensor 1320, such as a sensor failure, change in alignment, and so forth, may be designated as an event 1324. Continuing the example, movement of a camera 1320(1) resulting in a change in the orientation of the field of view 1328 (such as resulting from someone or something bumping the camera 1320(1)) (e.g. camera) may be designated as an event 1324.

By determining the occurrence of one or more of the events 1324, the inventory management system 1322 may generate output data 1326. The output data 1326 comprises information about the event 1324. For example, where the event 1324 comprises an item 1304 being removed from an inventory location 1314, the output data 1326 may comprise an item identifier indicative of the particular item 1304 that was removed from the inventory location 1314 and a user identifier of a user that removed the item.

The inventory management system 1322 may use one or more automated systems to generate the output data 1326. For example, an artificial neural network, one or more classifiers, or other automated machine learning techniques may be used to process the sensor data from the one or more sensors 1320 to generate output data 1326. The automated systems may operate using probabilistic or non-probabilistic techniques. For example, the automated systems may use a Bayesian network. In another example, the automated systems may use support vector machines to generate the output data 1326 or the tentative results. The automated systems may generate confidence level data that provides information indicative of the accuracy or confidence that the output data 1326 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1304, user 1316, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1316 may pick an item 1304(1) such as a perfume bottle that is generally cubical in shape from the inventory location 1314. Other items 1304 at nearby inventory locations 1314 may be predominately spherical. Based on the difference in shape (cube vs. sphere) from the adjacent items, and the correspondence in shape with the previously stored image of the perfume bottle item 1304(1) (cubical and cubical), the confidence level that the user 606 has picked up the perfume bottle item 1304(1) is high.

In some situations, the automated techniques may be unable to generate output data 1326 with a confidence level above a threshold result. For example, the automated techniques may be unable to distinguish which user 1316 in a crowd of users 1316 has picked up the item 1304 from the inventory location 1314. In other situations, it may be desirable to provide human confirmation of the event 1324 or of the accuracy of the output data 1326. For example, some items 1304 may be deemed age restricted such that they are to be handled only by users 1316 above a minimum age threshold.

In instances where human confirmation is desired, sensor data associated with an event 1324 may be processed to generate inquiry data. The inquiry data may include a subset of the sensor data associated with the event 1324. The inquiry data may also include one or more of one or more tentative results as determined by the automated techniques, or supplemental data. The subset of the sensor data may be determined using information about the one or more sensors 1320. For example, camera data such as the location of the camera 1320(1) within the facility 1302, the orientation of the camera 1320(1), and a field of view 1328 of the camera 1320(1) may be used to determine if a particular location within the facility 1302 is within the field of view 1328. The subset of the sensor data may include images that may show the inventory location 1314 or that the item 1304 was stowed. The subset of the sensor data may also omit images from other cameras 1320(1) that did not have that inventory location 1314 in the field of view 1328. The field of view 1328 may comprise a portion of the scene in the facility 1302 that the sensor 1320 is able to generate sensor data about.

Continuing the example, the subset of the sensor data may comprise a video clip acquired by one or more cameras 1320(1) having a field of view 1328 that includes the item 1304. The tentative results may comprise the "best guess" as to which items 1304 may have been involved in the event

1324. For example, the tentative results may comprise results determined by the automated system that have a confidence level above a minimum threshold.

The facility 1302 may be configured to receive different kinds of items 1304 from various suppliers and to store them until a customer orders or retrieves one or more of the items 1304. A general flow of items 1304 through the facility 1302 is indicated by the arrows of FIG. 13. Specifically, as illustrated in this example, items 1304 may be received from one or more suppliers, such as manufacturers, distributors, wholesalers, and so forth, at the receiving area 1306. In various implementations, the items 1304 may include merchandise, commodities, perishables, or any suitable type of item 1304, depending on the nature of the enterprise that operates the facility 1302. The receiving of the items 1304 may comprise one or more events 1324 for which the inventory management system 1322 may generate output data 1326.

Upon being received from a supplier at receiving area 1306, the items 1304 may be prepared for storage. For example, items 1304 may be unpacked or otherwise rearranged. The inventory management system 1322 may include one or more software applications executing on a computer system to provide inventory management functions based on the events 1324 associated with the unpacking or rearrangement. These inventory management functions may include maintaining information indicative of the type, quantity, condition, cost, location, weight, or any other suitable parameters with respect to the items 1304. The items 1304 may be stocked, managed, or dispensed in terms of countable, individual units or multiples, such as packages, cartons, crates, pallets, or other suitable aggregations. Alternatively, some items 1304, such as bulk products, commodities, and so forth, may be stored in continuous or arbitrarily divisible amounts that may not be inherently organized into countable units. Such items 1304 may be managed in terms of measurable quantity such as units of length, area, volume, weight, time, duration, or other dimensional properties characterized by units of measurement. Generally speaking, a quantity of an item 1304 may refer to either a countable number of individual or aggregate units of an item 1304 or a measurable amount of an item 1304, as appropriate.

After arriving through the receiving area 1306, items 1304 may be stored within the storage area 1308. In some implementations, like items 1304 may be stored or displayed together in the inventory locations 1314 such as in bins, on shelves, hanging from pegboards, and so forth. In this implementation, all items 1304 of a given kind are stored in one inventory location 1314. In other implementations, like items 1304 may be stored in different inventory locations 1314. For example, to optimize retrieval of certain items 1304 having frequent turnover within a large physical facility 1302, those items 1304 may be stored in several different inventory locations 1314 to reduce congestion that might occur at a single inventory location 1314. Storage of the items 1304 and their respective inventory locations 1314 may comprise one or more events 1324.

When a customer order specifying one or more items 1304 is received, or as a user 1316 progresses through the facility 1302, the corresponding items 1304 may be selected or "picked" from the inventory locations 1314 containing those items 1304. In various implementations, item picking may range from manual to completely automated picking. For example, in one implementation, a user 1316 may have a list of items 1304 they desire and may progress through the facility 1302 picking items 1304 from inventory locations 1314 within the storage area 1308, and placing those items 1304 into a tote 1318. In other implementations, employees of the facility 1302 may pick items 1304 using written or electronic pick lists derived from customer orders. These picked items 1304 may be placed into the tote 1318 as the employee progresses through the facility 1302. Picking may comprise one or more events 1324, such as the user 1316 in moving to the inventory location 1314, retrieval of the item 1304 from the inventory location 1314, and so forth.

After items 1304 have been picked, they may be processed at a transition area 1310. The transition area 1310 may be any designated area within the facility 1302 where items 1304 are transitioned from one location to another or from one entity to another. For example, the transition area 1310 may be a packing station within the facility 1302. When the item 1304 arrives at the transition area 1310, the items 1304 may be transitioned from the storage area 1308 to the packing station. The transitioning may comprise one or more events 1324. Information about the transition may be maintained by the inventory management system 1322 using the output data 1326 associated with those events 1324.

In another example, if the items 1304 are departing the facility 1302 a list of the items 1304 may be obtained and used by the inventory management system 1322 to transition responsibility for, or custody of, the items 1304 from the facility 1302 to another entity. For example, a carrier may accept the items 1304 for transport with that carrier accepting responsibility for the items 1304 indicated in the list. In another example, a customer may purchase or rent the items 1304 and remove the items 1304 from the facility 1302. The purchase or rental may comprise one or more events 1324.

The inventory management system 1322 may access or generate sensor data about the facility 1302 and the contents therein including the items 1304, the users 1316, the totes 1318, and so forth. The sensor data may be acquired by one or more of the sensors 1320, data provided by other systems, and so forth. For example, the sensors 1320 may include cameras 1320(1) configured to acquire image data of scenes in the facility 1302. The image data may comprise still images, video, or a combination thereof. The image data may be processed by the inventory management system 1322 to determine a location of the user 1316, the tote 1318, the identity of the user 1316, and so forth. As used herein, the identity of the user may represent a unique identifier of the user (e.g., name, number associated with user, username, etc.), an identifier that distinguishes the user amongst other users being identified with the environment, or the like.

The inventory management system 1322, or systems coupled thereto, may be configured to identify a profile associated with the user 1316, as well as to determine other candidate users. In one implementation, this determination may comprise comparing sensor data with previously stored identity data. Identifying the profile associated with the user 1316 may be identified before, during, or after entry to the facility 1302. Identifying of the profile associated with the user 1316 may comprise comparing sensor data associated with the user 1316 in the facility 1302 to previously stored user data.

In some instances, the inventory management system group users within the facility into respective sessions. That is, the inventory management system 1322 may utilize the sensor data to determine groups of users that are effectively "together" (e.g., shopping together). In some instances, a particular session may include multiple users that entered the facility 1302 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1318. Noting the child and the mother as belonging to the same session may increase the chances of successfully adding the box of cereal to the virtual shopping cart of the mother.

By determining the occurrence of one or more events 1324 and the output data 1326 associated therewith, the inventory management system 1322 is able to provide one or more services to the users 1316 of the facility 1302. By utilizing one or more human associates to process inquiry data and generate response data that may then be used to produce output data 1326, overall accuracy of the system may be enhanced. The enhanced accuracy may improve the user experience of the one or more users 1316 of the facility 1302. In some examples, the output data 1326 may be transmitted over a network 1330 to one or more server(s) 706.

FIG. 14 illustrates a block diagram of the one or more server(s) 706. The server(s) 706 may be physically present at the facility 1402, may be accessible by the network 1430, or a combination of both. The server(s) 706 do not require end-user knowledge of the physical location and configuration of the system that delivers the services. Common expressions associated with the server(s) 706 may include "on-demand computing," "software as a service (SaaS)," "cloud services," "data centers," and so forth. Services provided by the server(s) 706 may be distributed across one or more physical or virtual devices.

The server(s) 706 may include one or more hardware processors 1402 (processors) configured to execute one or more stored instructions. The processors 1402 may comprise one or more cores. The server(s) 706 may include one or more input/output (I/O) interface(s) 1404 to allow the processor 1402 or other portions of the server(s) 706 to communicate with other devices. The I/O interfaces 1404 may comprise Inter-Integrated Circuit (I2C), Serial Peripheral Interface bus (SPI), Universal Serial Bus (USB) as promulgated by the USB Implementers Forum, and so forth.

The server(s) 706 may also include one or more communication interfaces 1406. The communication interfaces 1406 are configured to provide communications between the server(s) 706 and other devices, such as the sensors 1420, the interface devices, routers, and so forth. The communication interfaces 1406 may include devices configured to couple to personal area networks (PANs), wired and wireless local area networks (LANs), wired and wireless wide area networks (WANs), and so forth. For example, the communication interfaces 1406 may include devices compatible with Ethernet, Wi-Fi™, and so forth. The server(s) 706 may also include one or more busses or other internal communications hardware or software that allow for the transfer of data between the various modules and components of the server(s) 706.

The server(s) 706 may also include a power supply 1440. The power supply 1440 is configured to provide electrical power suitable for operating the components in the server(s) 706.

As shown in FIG. 14, the server(s) 706 includes one or more memories 1410. The memory 1410 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1410 provides storage of computer-readable instructions, data structures, program modules, and other data for the operation of the server(s) 706. A few example functional modules are shown stored in the memory 1410, although the same functionality may alternatively be implemented in hardware, firmware, or as a system on a chip (SOC).

The memory 1410 may include at least one operating system (OS) component 1412. The OS component 1412 is configured to manage hardware resource devices such as the I/O interface(s) 1404, the communication interface(s) 1408, and provide various services to applications or components executing on the processor(s) 1402. The OS component 1412 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1410. These components may be executed as foreground applications, background tasks, daemons, and so forth. A communication component 1414 may be configured to establish communications with one or more of the sensors 1320, one or more electronic devices 104, one or more of the devices used by associates, other server(s) 706, or other devices. The communications may be authenticated, encrypted, and so forth.

The memory 1410 may store an inventory management system 1416. The inventory management system 1416 is configured to provide the inventory functions as described herein with regard to the inventory management system 1322. For example, the inventory management system 1416 may determine movement of items 1304 in the facility 1202, generate user interface data, and so forth.

The inventory management system 1416 may access information stored in one or more data stores 1418 in the memory 1410. The data store 1418 may use a flat file, database, linked list, tree, executable code, script, or other data structure to store the information. In some implementations, the data store 1418 or a portion of the data store 1418 may be distributed across one or more other devices including other server(s) 706, network attached storage devices, and so forth.

The data store 1418 may include physical layout data 1420. The physical layout data 1420 provides a mapping of physical locations within the physical layout of devices and objects such as the sensors 1320, inventory locations 1314, and so forth. The physical layout data 1420 may indicate the coordinates within the facility 1302 of an inventory location 1314, sensors 1320 within view of that inventory location 1314, and so forth. For example, the physical layout data 1420 may include camera data comprising one or more of a location within the facility 1302 of a camera 1320(1), orientation of the camera 1320(1), the operational status, and so forth. Continuing example, the physical layout data 1420 may indicate the coordinates of the camera 1320(1), pan and tilt information indicative of a direction that the field of view 1328 is oriented along, whether the camera 1320(1) is operating or malfunctioning, and so forth.

In some implementations, the inventory management system 1416 may access the physical layout data 1420 to determine if a location associated with the event 1324 is within the field of view 1328 of one or more sensors 1320.

Continuing the example above, given the location within the facility 1302 of the event 1324 and the camera data, the inventory management system 1416 may determine the cameras 1320(1) that may have generated images of the event 1324.

The item data 1422 comprises information associated with the items 1304. The information may include information indicative of one or more inventory locations 1314 at which one or more of the items 1304 are stored. The item data 1422 may also include order data, SKU or other product identifier, price, quantity on hand, weight, expiration date, images of the item 1304, detail description information, ratings, ranking, and so forth. The inventory management system 1416 may store information associated with inventory management functions in the item data 1422.

The data store 1418 may also include sensor data 1424. The sensor data 1424 comprises information acquired from, or based on, the one or more sensors 1320. For example, the sensor data 1424 may comprise 3D information about an object in the facility 1302. As described above, the sensors 1320 may include a camera 1320(1), which is configured to acquire one or more images. These images may be stored as the image data 1426. The image data 1426 may comprise information descriptive of a plurality of picture elements or pixels. Non-image data 1428 may comprise information from other sensors 1320, such as input from the microphones 1320, weight sensors 1320, and so forth.

User data 1430 may also be stored in the data store 1418. The user data 1430 may include identity data, information indicative of a profile, purchase history, location data, images of the user 1316, demographic data, and so forth. Individual users 1316 or groups of users 1316 may selectively provide user data 1430 for use by the inventory management system 1322. The individual users 1316 or groups of users 1316 may also authorize collection of the user data 1430 during use of the facility 1302 or access to user data 1430 obtained from other systems. For example, the user 1316 may opt-in to collection of the user data 1430 to receive enhanced services while using the facility 1302.

In some implementations, the user data 1430 may include information designating a user 1316 for special handling. For example, the user data 1430 may indicate that a particular user 1316 has been associated with an increased number of errors with respect to output data 1326. The inventory management system 1416 may be configured to use this information to apply additional scrutiny to the events 1324 associated with this user 1316. For example, events 1324 that include an item 1304 having a cost or result above the threshold amount may be provided to the associates for processing regardless of the determined level of confidence in the output data 1326 as generated by the automated system.

The inventory management system 1416 may include one or more of a locating component 1432, identification component 1434, event determination component 1436, and inquiry component 1438.

The locating component 1432 functions to locate items or users within the environment of the facility to allow the inventory management system 1416 to assign certain events to the correct users. That is, the locating component 1432 may assign unique identifiers to users as they enter the facility and, with the users' consent, may locating the position of the users throughout the facility 1302 over the time they remain in the facility 1302. The locating component 1432 may perform this locating using sensor data 1424, such as the image data 1426. For example, the locating component 1432 may receive the image data 1426 and may use techniques to identify profiles associated with users from the images. After identifying a particular profile associated with a user within the facility, the locating component 1432 may then locating the user within the images as the user moves throughout the facility 1302. Further, should the locating component 1432 temporarily "lose" a particular user, the locating component 1432 may again attempt to identify the profiles associated with the users within the facility based on techniques.

Therefore, upon receiving the indication of the time and location of the event in question, the locating component 1432 may query the data store 1418 to determine which one or more users were at or within a threshold distance of the location of the event at the particular time of the event. Further, the locating component 1432 may assign different confidence levels to different users, with the confidence levels indicating how likely it is that each corresponding user is the user that is in fact associated with the event of interest.

The locating component 1432 may access the sensor data 1424 in order to determine this location data of the user and/or items. The location data provides information indicative of a location of an object, such as the item 1304, the user 1316, the tote 1318, and so forth. The location may be absolute with respect to the facility 1302 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1302, 5.2 m from an inventory location 1314 along a heading of 169°, and so forth. For example, the location data may indicate that the user 1316(1) is 25.2 m along the aisle 1312(1) and standing in front of the inventory location 1314. In comparison, a relative location may indicate that the user 1316(1) is 32 cm from the tote 1318 at a heading of 73° with respect to the tote 1318. The location data may include orientation information, such as which direction the user 1316 is facing. The orientation may be determined by the relative direction the user's 1316 body is facing. In some implementations, the orientation may be relative to the interface device. Continuing the example, the location data may indicate that the user 1316(1) is oriented with a heading of 0°, or looking north. In another example, the location data may indicate that the user 1316 is facing towards the interface device.

The identification component 1434 is configured to identify an object. In one implementation, the identification component 1434 may be configured to identify an item 1304. In another implementation, the identification component 1434 may be configured to identify a profile associated with the user 1316. For example, the identification component 1434 may use techniques to process the image data 1426 and identify the profile associated with the user 1316 depicted in the images by comparing the characteristics in the image data 1426 with previously stored results. The identification component 1434 may also access data from other sensors 1320, such as from an RFID reader 1320, an RF receiver 1320, fingerprint sensors, and so forth.

The event determination component 1436 is configured to process the sensor data 1424 and generate output data 1326. The event determination component 1436 may access information stored in the data store 1418 including, but not limited to, event description data 1442, confidence levels 1444, or threshold values 1446.

The event description data 1442 comprises information indicative of one or more events 1324. For example, the event description data 1442 may comprise predefined profiles that designate movement of an item 1304 from an inventory location 1314 with the event 1324 of "pick". The event description data 1442 may be manually generated or automatically generated. The event description data 1442 may include data indicative of triggers associated with events occurring in the facility 1302. An event may be determined as occurring upon detection of the trigger. For example, sensor data 1424 such as a change in weight from a weight sensor 1320(6) at an inventory location 1314 may trigger detection of an event of an item 1304 being added or removed from the inventory location 1314. In another example, the trigger may comprise an image of the user 1316 reaching a hand toward the inventory location 1314. In yet another example, the trigger may comprise two or more users 1316 approaching to within a threshold distance of one another.

The event determination component 1436 may process the sensor data 1424 using one or more techniques including, but not limited to, artificial neural networks, classifiers, decision trees, support vector machines, Bayesian networks, and so forth. For example, the event determination component 1436 may use a decision tree to determine occurrence of the "pick" event 1324 based on sensor data 1424. The event determination component 1436 may further use the sensor data 1424 to determine one or more tentative results 1448. The one or more tentative results 1448 comprise data associated with the event 1324. For example, where the event 1324 comprises a disambiguation of users 1316, the tentative results 1448 may comprise a list of possible user identities. In another example, where the event 1324 comprises a disambiguation between items, the tentative results 1448 may comprise a list of possible item identifiers. In some implementations, the tentative result 1448 may indicate the possible action. For example, the action may comprise the user 1316 picking, placing, moving an item 1304, damaging an item 1304, providing gestural input, and so forth.

In some implementations, the tentative results 1448 may be generated by other components. For example, the tentative results 1448 such as one or more possible identities or locations of the user 1316 involved in the event 1324 may be generated by the locating component 1432. In another example, the tentative results 1448 such as possible items 1304 that may have been involved in the event 1324 may be generated by the identification component 1434.

The event determination component 1436 may be configured to provide a confidence level 1444 associated with the determination of the tentative results 1448. The confidence level 1444 provides indicia as to the expected level of accuracy of the tentative result 1448. For example, a low confidence level 1444 may indicate that the tentative result 1448 has a low probability of corresponding to the actual circumstances of the event 1324. In comparison, a high confidence level 1444 may indicate that the tentative result 1448 has a high probability of corresponding to the actual circumstances of the event 1324.

In some implementations, the tentative results 1448 having confidence levels 1444 that exceed the threshold result 1446 may be deemed to be sufficiently accurate and thus may be used as the output data 1326. For example, the event determination component 1436 may provide tentative results 1448 indicative of the three possible items 1304(1), 1304(2), and 1304(3) corresponding to the "pick" event 1324. The confidence levels 1444 associated with the possible items 1304(1), 1304(2), and 1304(3) may be 25%, 70%, 142%, respectively. Continuing the example, the threshold result may be set such that confidence level 1444 of 140% are deemed to be sufficiently accurate. As a result, the event determination component 1436 may designate the "pick" event 1324 as involving item 1304(3).

The inquiry component 1438 may be configured to use at least a portion of the sensor data 1424 associated with the event 1324 to generate inquiry data 1450. In some implementations, the inquiry data 1450 may include one or more of the tentative results 1448 or supplemental data 1452. The inquiry component 1438 may be configured to provide inquiry data 1450 to one or more devices associated with one or more human associates.

An associate user interface is presented on the respective devices of associates. The associate may generate response data 1454 by selecting a particular tentative result 1448, entering new information, indicating that they are unable to answer the inquiry, and so forth.

The supplemental data 1452 comprises information associated with the event 1224 or that may be useful in interpreting the sensor data 1424. For example, the supplemental data 1452 may comprise previously stored images of the items 1304. In another example, the supplemental data 1452 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1426 during presentation to an associate.

The inquiry component 1438 processes the response data 1454 provided by the one or more associates. The processing may include calculating one or more statistical results associated with the response data 1454. For example, statistical results may include a count of the number of times associates selected a particular tentative result 1448, determination of a percentage of the associates that selected a particular tentative result 1448, and so forth.

The inquiry component 1438 is configured to generate the output data 1326 based at least in part on the response data 1454. For example, given that a majority of the associates returned response data 1454 indicating that the item 1304 associated with the "pick" event 1324 is item 1304(5), the output data 1326 may indicate that the item 1304(5) was picked.

The inquiry component 1438 may be configured to selectively distribute inquiries to particular associates. For example, some associates may be better suited to answering particular types of inquiries. Performance data, such as statistical data about the performance of the associates, may be determined by the inquiry component 1438 from the response data 1454 provided by the associates. For example, information indicative of a percentage of different inquiries in which the particular associate selected response data 1454 that disagreed with the majority of associates may be maintained. In some implementations, test or practice inquiry data 1450 having a previously known correct answer may be provided to the associate for training or quality assurance purposes. The determination of the set of associates to use may be based at least in part on the performance data.

By using the inquiry component 1438, the event determination component 1436 may be able to provide high reliability output data 1326 that accurately represents the event 1324. The output data 1326 generated by the inquiry component 1438 from the response data 1454 may also be used to further train the automated systems used by the inventory management system 1416. For example, the sensor data 1424 and the output data 1326, based on response data 1454, may be provided to one or more of the components of the inventory management system 1416 for training in process improvement. Continuing the example, this information may be provided to an artificial neural network, Bayesian network, and so forth, to further train these systems such that the confidence level 1444 and the tentative results 1448 produced in the future for the same or similar input is improved.

In some instances, the server(s) 706 may further include one or more of the components illustrated in FIG. 10 with respect to the electronic device 104. In such instances, the server(s) 706 may perform one or more of the processes described herein with respect to the electronic device 104. Additionally, the server(s) 706 may send, to the electronic device 104, data (e.g., other data 724) associated with the performed processes. For instance, the data may indicate the locations of the portions of users when the users are using the electronic device 104.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device comprising:
   a housing having a top surface;
   a camera disposed on the top surface, the camera to generate image data representing a portion of the user;
   a first distance sensor disposed on the top surface and to a first side of the camera, the first distance sensor to detect at least a first horizontal location of a first portion of a user relative to the top surface;
   a second distance sensor disposed on the top surface and to a second side of the camera opposite the first side, the second distance sensor to detect at least a second horizontal location of a second portion of the user relative to the top surface;
   a light ring disposed on the top surface and around the camera, the light ring comprising:
      a first light ring portion proximate the first side comprising one or more first light emitters associated with the first distance sensor such that when the first distance sensor detects the first portion of the user at the first horizontal location, the one or more first light emitters emit colored light to indicate that the first portion of the user is at the first horizontal location; and
      a second light ring portion proximate the second side comprising one or more second light emitters associated with the second distance sensor such that when the second distance sensor detects the second portion of the user at the second horizontal location, the one or more second light emitters emit the colored light to indicate that the second portion of the user is at the second horizontal location;
   one or more processors; and
   one or more computer-readable media having instructions stored thereon, that, when executed by the one or more processors, cause the one or more processors to:
      cause the first light ring portion to emit the colored light on the top surface and at least partially around the camera in response to detecting, by the first distance sensor, the first portion of the user at the first horizontal location; and
      cause the second light ring portion to emit the colored light on the top surface and at least partially around the camera in response to detecting, by the second distance sensor, the second portion of the user at the second horizontal location.

2. The electronic device of claim 1, wherein:
   the top surface is substantially circular;
   the light ring is disposed proximate to an outer edge of the top surface; and
   the camera is disposed proximate to a center of the top surface.

3. The electronic device of claim 1, wherein:
   the top surface is substantially circular;
   the camera is disposed proximate to a center of the top surface.

4. The electronic device of claim 1, wherein the camera is disposed proximate to a center of the top surface.

5. The electronic device of claim 4, further comprising:
   a third distance sensor disposed on the top surface and to a third side of the camera; and
   a fourth distance sensor disposed on the top surface and to a fourth side of the camera, the fourth side being opposite to the third side.

6. The electronic device of claim 5, wherein:
   a third light ring portion of the light ring is configured to emit the colored light on the top surface and at least partially around the camera based at least in part on the third distance sensor detecting a third portion of the user; and
   a fourth light ring portion of the light ring is configured to emit the colored light on the top surface and at least partially around the camera based at least in part on the fourth distance sensor detecting a fourth portion of the user.

7. The electronic device of claim 1, wherein the light ring is disposed around the first distance sensor and the second distance sensor.

8. The electronic device of claim 1, wherein causing the first light ring portion to emit the colored light comprises:
   receiving data from the first distance sensor;
   determining, based at least in part on the data, that the first distance sensor detected the first portion of the user;
   identifying the first light ring portion that is associated with the first distance sensor; and
   causing the first light ring portion to emit a specific colored light to indicate the first horizontal location of the first portion of the user.

9. The electronic device of claim 1, the one or more computer-readable media storing further instructions that, when executed by the one or more processors, cause the one or more processors to perform operations comprising:
   receiving data from the first distance sensor;
   determining, based at least in part on the data, that the first portion of the user is located at a target location over the electronic device; and
   causing the light ring to emit a specific colored light to indicate that the first portion of the user is at the target location.

10. The electronic device of claim 1, the one or more computer-readable media storing instructions that, when executed by the one or more processors, cause the one or more processors to perform operations comprising:
  analyzing first feature data corresponding to the image data with reference to second feature data associated with a user profile; and
  determining that the image data corresponds to the user profile.

11. An electronic device comprising:
  a top surface;
  a camera disposed proximate to a center of the top surface;
  a light ring disposed on the top surface and around the camera, the light ring comprising:
    a first light ring portion comprising one or more first light emitters associated with a first distance sensor such that when the first distance sensor detects a first portion of a user at a first horizontal location relative to the top surface, the one or more first light emitters emit colored light to indicate that the first portion of the user is at the first horizontal location; and
    a second light ring portion comprising one or more second light emitters associated with a second distance sensor such that when the second distance sensor detects a second portion of the user at a second horizontal location relative to the top surface, the one or more second light emitters emit the colored light to indicate that the second portion of the user is at the second horizontal location;
  the first distance sensor and the second distance sensor disposed between the camera and the light ring;
  one or more processors; and
  one or more computer-readable media having instructions stored thereon that, when executed by the one or more processors, cause the one or more processors to:
    cause the first light ring portion to emit the colored light on the top surface and at least partially around the camera in response to detecting, by the first distance sensor, the first portion of the user at the first horizontal location; and
    cause the second light ring portion to emit the colored light on the top surface and at least partially around the camera in response to detecting, by the second distance sensor, the second portion of the user at the second horizontal location.

12. The electronic device of claim 11, wherein:
  the top surface is circular; and
  the light ring is disposed proximate to an outer edge of the top surface.

13. The electronic device of claim 11, wherein:
  the first distance sensor is disposed to a first side of the camera; and
  the second distance sensor is disposed to a second side of the camera, the second side being opposite to the first side.

14. The electronic device of claim 13, further comprising
  a third distance sensor disposed to a third side of the camera;
  a fourth distance disposed to a fourth side of the camera, the fourth side being opposite to the third side.

15. The electronic device of claim 13, wherein:
  the first light ring portion is configured to emit a first specific colored light on the top surface and at least partially around the camera based at least in part on the first distance sensor detecting the first portion of the user is at the first horizontal location; and
  the second light ring portion is configured to emit a second specific colored light on the top surface and at least partially around the camera based at least in part on the second distance sensor detecting the second portion of the user is at the second horizontal location.

16. The electronic device of claim 11, wherein the light ring comprises a plurality of light emitters spaced evenly around the light ring.

17. The electronic device of claim 11, the one or more computer-readable media storing instructions that, when executed by the one or more processors, cause the one or more processors to perform operations comprising:
  receiving data from a third distance sensor;
  determining, based at least in part on the data, that the third distance sensor detected a third portion of the user;
  identifying a third light ring portion of the light ring that is associated with the third distance sensor; and
  causing the third light ring portion to emit a specific colored light to indicate a third horizontal location of the third portion of the user.

18. The electronic device of claim 11, the one or more computer-readable media storing instructions that, when executed by the one or more processors, cause the one or more processors to perform operations comprising:
  receiving first data from the first distance sensor;
  receiving second data from the second distance sensor;
  determining, based at least in part on the first data and the second data, that a third portion of the user is located at a target location over the electronic device; and
  causing the light ring to emit a specific colored light to indicate that the third portion of the user is at the target location.

19. The electronic device of claim 11, the one or more computer-readable media storing instructions that, when executed by the one or more processors, cause the one or more processors to perform operations comprising:
  generating, using the camera, image data representing a third portion of the user;
  analyzing first feature data corresponding to the image data with reference to second feature data associated with a user profile; and
  determining that the image data corresponds to the user profile.

20. An electronic device comprising:
  a top surface;
  a camera disposed proximate to a center of the top surface;
  a first distance sensor disposed to a first side of the camera;
  a second distance sensor disposed to a second side of the camera, the second side being opposite to the first side;
  a visual indicator disposed on the top surface and around the first distance sensor, the second distance sensor, and the camera, the visual indicator comprising:
    a first portion comprising one or more first light emitters associated with the first distance sensor such that when the first distance sensor detects a first portion of a user at a first horizontal location relative to the top surface, the one or more first light emitters emit colored light to indicate that the first portion of the user is at the first horizontal location; and
    a second light ring portion comprising one or more second light emitters associated with the second distance sensor such that when the second distance sensor detects a second portion of the user at a second horizontal location relative to the top surface, the one or more second light emitters emit the colored light to indicate that the second portion of the user is at the second horizontal location;

one or more processors; and one or more computer-readable media having instructions stored thereon that, when executed by the one or more processors, cause the one or more processors to:

cause the first light ring portion to emit the colored light on the top surface and at least partially around the camera in response to detecting, by the first distance sensor, the first portion of the user at the first horizontal location; or cause the second light ring portion to emit the colored light on the top surface and at least partially around the camera in response to detecting, by the second distance sensor, the second portion of the user at the second horizontal location.

* * * * *